(12) United States Patent
Han et al.

(10) Patent No.: US 10,196,465 B2
(45) Date of Patent: Feb. 5, 2019

(54) CATIONIC POLYMERS AND POROUS MATERIALS

(71) Applicants: Saudi Arabian Oil Company, Dhahran (SA); King Abdullah University of Science and Technology, Thuwal (SA)

(72) Inventors: Yu Han, Thuwal (SA); Qiwei Tian, Thuwal (SA); Xinglong Dong, Thuwal (SA); Zhaohui Liu, Thuwal (SA); Jean-Marie Basset, Thuwal (SA); Youssef Saih, Thuwal (SA); Miao Sun, Thuwal (SA); Wei Xu, Thuwal (SA); Sohel Shaikh, Dhahran (SA)

(73) Assignees: Saudi Arabian Oil Company, Dhahran (SA); King Abdullah University of Science and Technology, Thuwal (SA)

( * ) Notice: Subject to any disclaimer, the term of this patent is extended or adjusted under 35 U.S.C. 154(b) by 0 days.

(21) Appl. No.: 16/043,791

(22) Filed: Jul. 24, 2018

(65) Prior Publication Data
US 2018/0327523 A1 Nov. 15, 2018

Related U.S. Application Data

(63) Continuation of application No. 15/298,647, filed on Oct. 20, 2016.
(Continued)

(51) Int. Cl.
*C08F 8/30* (2006.01)
*C08F 8/32* (2006.01)
(Continued)

(52) U.S. Cl.
CPC .............. *C08F 8/30* (2013.01); *B01J 29/00* (2013.01); *B01J 29/084* (2013.01); *B01J 29/40* (2013.01);
(Continued)

(58) Field of Classification Search
CPC ........ C08G 75/24; C02F 5/12; C02F 2103/08; C02F 2303/22; H01M 8/10
See application file for complete search history.

(56) References Cited

U.S. PATENT DOCUMENTS

| 3,210,349 A | 10/1965 | Godfrey |
| 4,585,638 A | 4/1986 | Kuhl |

(Continued)

FOREIGN PATENT DOCUMENTS

| EP | 0587534 B1 | 10/1996 |
| EP | 2592049 A2 | 5/2013 |

(Continued)

OTHER PUBLICATIONS

Cundy et al., "The Hydrothermal Synthesis of Zeolites; History and Development From the Earliest Days to the Present Time", Chem. Rev., 2003, 103, 663-701, American Chemical Society.
(Continued)

*Primary Examiner* — Shane Fang
(74) *Attorney, Agent, or Firm* — Dinsmore & Shol LLP

(57) ABSTRACT

According to one or more embodiments, cationic polymers may be produced which include one or more monomers containing cations. Such cationic polymers may be utilized as structure directing agents to form mesoporous zeolites. The mesoporous zeolites may include micropores as well as mesopores, and may have a surface area of greater than 350 $m^2/g$ and a pore volume of greater than 0.3 $cm^3/g$. Also described are core/shell zeolites, where at least the shell portion includes a mesoporous zeolite material.

19 Claims, 38 Drawing Sheets

Related U.S. Application Data

(60) Provisional application No. 62/244,388, filed on Oct. 21, 2015.

(51) Int. Cl.

| | |
|---|---|
| C08F 8/40 | (2006.01) |
| B01J 29/00 | (2006.01) |
| B01J 29/06 | (2006.01) |
| B01J 29/08 | (2006.01) |
| B01J 29/40 | (2006.01) |
| B01J 29/70 | (2006.01) |
| B01J 29/80 | (2006.01) |
| B01J 29/89 | (2006.01) |
| B01J 35/02 | (2006.01) |
| B01J 37/00 | (2006.01) |
| B01J 37/02 | (2006.01) |
| B01J 37/04 | (2006.01) |
| B01J 37/06 | (2006.01) |
| B01J 37/10 | (2006.01) |
| C01B 39/04 | (2006.01) |
| C08F 226/04 | (2006.01) |
| C08F 230/02 | (2006.01) |
| C08G 73/06 | (2006.01) |

(52) U.S. Cl.
CPC ........... B01J 29/7007 (2013.01); B01J 29/80 (2013.01); B01J 29/89 (2013.01); B01J 35/026 (2013.01); B01J 37/0018 (2013.01); B01J 37/0221 (2013.01); B01J 37/04 (2013.01); B01J 37/06 (2013.01); B01J 37/10 (2013.01); C01B 39/04 (2013.01); C08F 8/32 (2013.01); C08F 8/40 (2013.01); C08F 226/04 (2013.01); C08F 230/02 (2013.01); B01J 2029/062 (2013.01)

(56) References Cited

U.S. PATENT DOCUMENTS

| | | | |
|---|---|---|---|
| 5,908,474 | A | 6/1999 | Danner et al. |
| 6,271,264 | B1 | 8/2001 | Dhal et al. |
| 6,602,644 | B2 | 8/2003 | Matsushima et al. |
| 2006/0052338 | A1 | 3/2006 | Gentry Mullins |
| 2009/0174100 | A1 | 7/2009 | Rolfe et al. |
| 2011/0118107 | A1 | 5/2011 | Garcia-Martinez et al. |
| 2011/0281197 | A1 | 11/2011 | Daikoku et al. |

FOREIGN PATENT DOCUMENTS

| | | | |
|---|---|---|---|
| KR | 100644501 | B1 | 11/2006 |
| KR | 20150075813 | A | 7/2015 |
| WO | 0014124 | A1 | 3/2000 |
| WO | 0117901 | A1 | 3/2001 |
| WO | 0149607 | A1 | 7/2001 |
| WO | 2007054468 | A2 | 5/2007 |
| WO | 2007110621 | A2 | 10/2007 |
| WO | 2010150996 | A2 | 12/2010 |
| WO | 2015092669 | A1 | 6/2015 |

OTHER PUBLICATIONS

Guo et al. "Characterization of Beta/MCM-41 Composite Molecular Sieve Compared With the Mechanical Mixture", Microporous and Mesoporous Materials, 2001, 44-45, 427-434, Elsevier Science B.V.

Holland et al., "Dual Templating of Macroporous Silicates with Zeolitic Microporous Frameworks", J. Am. Chem. Soc., 1999, 121, 4308-4309, American Chemical Society.

Hua et al., "One-Step Preparation of Zeolite Silicalite-1 Microspheres with Adjustable Macroporosity", Chem. Mater., 2009, 21, 2344-2348, American Chemical Society.

Karlsson et al., "Composities of Micro- and Mesoporous Materials: Simultaneous Syntheses of MFI/MCM-41 Like Phases by a Mixed Template Approach", Microporous and Mesoporous Materials, 1999, 27, 181-192, Elsevier Science B.V.

Li et al., "In-Situ Crystallization Route to Nanorod-Aggregated Functional ZSM-5 Microspheres", J. Am. Chem. Soc., 2013, 135, 1181-1184, American Chemical Society.

Moller et al., "Nanofusion: Mesoporous Zeolites Made Easy", Chem. Eur. J., 2012, 18, 7671-7674, Wiley-VCH Verlag GmbH & Co.

Ren et al, "A Crystalline Germanate with Mesoporous 30-Ring Channels", J. Am. Chem. Soc., 2009, 131, 14128-14129, American Chemical Society.

Yang et. al., "Well-Organized Zeolite Nanocrystal Aggregates with Interconnected Hierarchically Micro-Meso-Macropore Systems Showing Enhanced Catalytic Performance", Chem. Eur. J., 2011, 17, 14987-14995, Wiley-VCH Verlag GmbH & Co.

Zou et al., "A Mesoporous Germanium Oxide with Crystalline Pore Walls and its Chiral Derivative", Nature, 2005, 437, 716-719, Nature Publishing Group.

Chen et al., "Hydrothermal Synthesis of Zeolites with Three-Dimensionally Ordered Mesoporous-Imprinted Structure", Journal of the American Chemical Society, 2011, 133, 12390-12393, American Chemical Society.

Chen et al., "Highly Stable and Reusable Multimodal Zeolite TS-1 Based Catalysts with Hierarchically Interconnected Three-Level Micro-Meso-Macroporous Structure", Angew. Chem. Int. Ed., 2011, 50, 11156-11161, Wiley-VSH Verlag GmbH & Co.

Cho et al., "Zeolite Synthesis Using Hierarchical Structure-Directing Surfactants: Retaining Porous Structure of Initial Synthesis Gel and Precursors", Chemistry of Materials, 2012, 24, 2733-2738, American Chemical Society.

Choi et al., "Amphiphilic Organosilane-Directed Synthesis of Crystalline Zeolite with Tunable Mesoporosity", Nature Materials, 5, 2006, 718-723, Nature Publishing Group.

Choi et al. "Stable Single-Unit-Cell Nanosheets of Zeolite MFI as Active and Long-Lived Catalysts", Nature, 2009, 461, 246-250, Macmillian Publishers Limited.

Christensen et al. "Catalytic Benzene Alkylation Over Mesoporous Zeolite Single Crystals: Improving Activity and Selectivity with a New Family of Porous Materials", Journal of American Chemical Society, 2003, 125, 13370-13371, American Chemical Society.

Corma, Avelino, "From Microporous to Mesoporous Molecular Sieve Materials and Their Use in Catalysts", Chem. Rev. 1997, 97, 2373-2419, American Chemical Society.

Davis, Mark E., "Ordered Porous Materials for Emerging Applications", Nature 2002, 417, 813-821, Nature Publishing Group.

Fan et al., "Hierarchical Nanofabrication of Microporous Crystals with Ordered Mesoporosity", Nature Materials, 2008, 7, 984-991, Macmillian Publishing Limited.

Fu et al., "Extraordinarily High Activity in the Hydrodesulfurization of 4, 6-Dimethyldibenzothiophene Over Pd Supported on Mesoporous Zeolites Y", Journal of the American Chemical Society, 2001, 133, 15346-15349, American Chemical Society.

Groen et al., "Mechanism of Hierarchical Porosity Development in MFI Zeolites by Disilication: The Role of Aluminium as a Pore-Directing Agent", Chem. Eur. J., 2005, 11, 4983-4994, Wiley-VCH Verlag GmbH & Co.

Groen et al. "Direct Demonstration of Enhanced Diffusion in Mesoporous ZSM-5 Zeolite Obtained via controlled Desilication", Journal of the American Chemical Society, 2007, 129M 355-360, American Chemical Society.

Gu et al., "New Strategy to Synthesis of Hierarchical Mesoporous Zeolites", Chemistry of Materials, 2010, 22, 2442-2450, American Chemical Society.

Han, Yu, "Highly Mesoporous Single-Crystalline Zeolites Synthesized Using a Non-Surfactant Cationic Polymer as a Dual-Function Template", KAUST Catalysis Center Symposium, Feb. 1-4, 2015, King Abduallah University of Science and Technology.

Huang et al., "Investigation of Synthesizing MCM-41/ZSM-5 Composites", J. Phys. Chem. B, 2000, 104, 2817-2823, American Chemical Society.

(56) References Cited

OTHER PUBLICATIONS

Jacobsen et al., "Mesoporous Zeolites Single Crystals", J. Am. Chem. Soc., 2000, 122, 7116-7117 American Chemical Society.

Jiang et al. "Synthesis and Structure Determination of the Hierarchical Meso-Microporous Zeolite ITQ-43", Science, 2011, 333, 1131-1134.

Jo et al. "Random-Graft Polymer-Directed Synthesis of Inorganic Mesostructures with Ultrathin Frameworks", Angew. Chem. Int. Ed., 2014, 53, 5117-5121, Wiley-VCH Verlag GmbH & Co.

Jung et al., "Zeolite Nanosheet of a Single-Pore Thickness Generated by a Zeolite-Structure-Directing Surfactant", Journal of Materials Chemistry, 2012, 22, 4637-4670, The Royal Society of Chemistry.

Kim et al. "Effect of Mesoporosity Against the Deactivation of MFI Zeolite Catalyst During the Methanol-to-Hydrocarbon Conversion Process", Journal of Catalysis, 2010, 269, 219-228, Elsevier, Inc.

Kore et al., "Synthesis of Hierarchical Beta Using Piperidine Based Multi-Ammonium Surfactants", RSC Advances, 2013, 3, 1317-1322, The Royal Society of Chemistry.

Lee et al., "Sub-40 nm Zeolite Suspensions via Disassembly of Three-Dimensionally Ordered Mesoporous-Imprinted Silicalite-1", J. Am. Chem. Soc., 2011, 133, 493-502, American Chemical Society.

Liu et al., "ZSM-5 Zeolite Single Crystals with b-Axis-Aligned Mesoporous Channels as an Efficient Catalyst for Conversion of Bulky Organic Molecules", J. Am. Chem. Soc., 2012, 134, 4557-4560, American Chemical Society.

Liu et al., "Polyelectrolyte-Surfactant Complex as a Template for the Synthesis of Zeolites with Intracrystalline Mesopores", Langmuir, 2012, 28, 8600-8607, American Chemical Society.

Moller et al., "One-Step Synthesis of Hierarchical Zeolite Beta via Network Formation of Uniform Nanocrystals", J. Am. Chem. Soc., 2011, 133, 5284-5295, American Chemical Society.

Moller et al. "Mesoporosity—A New Dimension for Zeolites", Chem. Soc. Rev., 2013, 42, 3689-3707, The Royal Society of Chemistry.

Morris, Russell E., "Some Difficult Challenges for the Synthesis of Nanoporous Materials", Top Catal, 2010, 53, 1291-1296, Springer Science+Business Media, LLC.

Na et al., "Pillard MFI Zeolite Nanosheets of a Single-Unit-Cell Thickness", J. Am. Chem. Soc., 2010, 132, 4169-4177, American Chemical Society.

Na et al., "Directing Zeolite Structures into Hierarchically Nanoporous Architectures", Science, 2011, 333, 328-332.

Na et al. "MFI Titanosilicate Nanosheets with Single-Unit-Cell Thickness as an Oxidation Catalyst Using Peroxides", ACS Catal., 2011, 1, 901-907, American Chemical Society.

Na et al., "Recent Advances in the Synthesis of Hierarchically Nanoporous Zeolites", Microporous and Mesoporous Materials, 2013, 166, 3-19, Elsevier Inc.

Park et al., "Selective Petroleum Refining Over a Zeolite Catalyst with Small Intracrystal Mesopores", Angew, Chem. Ed., 2009, 48, 7645-7648, Wiley-VCH Verlag GmbH & Co.

Park et al. "Hierarchically Structure-Directing Effect of Multi-Ammonium Surfactants for the Generation of MFI Zeolite Nanosheets", Chemistry of Materials, 2011, 23, 5131-5137, American Chemical Society.

Perez-Ramirez et al., "Hierarchical Zeolites: Enhances Utilisation of Microporous Crystals in Catalysis by Advances in Materials Design", Chem. Soc. Rev., 2008, 37,2530-2542, The Royal Society of Chemistry.

Reichinger et al., "Ordered Mesoporous Materials with MFI Structures Microporous Walls—Synthesis and Proof of Wall Microporosity", Microporous and Mesoporous Materials, 2012, 164, 21-31, Elsevier Inc.

Seo et al., "Microporous Aluminophosphate Nanosheets and Their Nanomorphic Zeolite Analogues Tailored by Hierarchical Structure-Directing Amines", J. Am. Chem., Soc., 2013, 135, 8806-8809, American Chemical Society.

Serrano et al., "Hierarchical Zeolites with Enhanced Textural and Catalytic Properties Synthesized from Organofunctionalized Seeds", Chem. Mater., 2006, 18, 2462-2464, American Chemical Society.

Srivastava et al., "Mesoporous Materials with Zeolite Framework: Remarkable Effect of the Hierarchical Structure for Retardation of Catalyst Deactivation", Chem. Commun., 2006, 4889-4491, The Royal Society of Chemistry.

Sun et al., "Friedel-Crafts Alkylations Over Hierarchical Zeolite Catalysts", Applied Catalysis A: General, 2008, 336, 11-16, Elsevier B.V.

Sun et al., "Hydrodesulfurization of 4,6-Dimethyldibenzothiphene Over Noble Metals Supported on Mesoporous Zeolites", Angew. Chem, Int. Ed., 2008, 47, 8478-8481, Wiley-VCH Verlag GmbH & Co.

US 10,196,465 B2

CATIONIC POLYMERS AND POROUS MATERIALS

CROSS REFERENCE TO RELATED APPLICATIONS

This Application is a continuation of U.S. patent application Ser. No. 15/298,647 filed Oct. 20, 2016, which claims priority to U.S. Provisional Patent Application Ser. No. 62/244,388, filed Oct. 21, 2015, the entire contents of which are incorporated by reference.

TECHNICAL FIELD

The present disclosure generally relates to cationic polymers and porous materials, and more specifically to cationic polymers that may be utilized in the synthesis of porous materials.

BACKGROUND

Microporous structures, such as zeolites, may be utilized in many petrochemical industrial applications. For example, such microstructures may be utilized as catalysts in a number of reactions.

BRIEF SUMMARY

In accordance with one embodiment of the present disclosure, a cationic polymer may comprise the structure depicted in Chemical Structure #3 or Chemical Structure #8 that is included subsequently in the present disclosure.

In accordance with another embodiment of the present disclosure, the cationic polymer depicted in Chemical Structure #3 may be formed by a process comprising the steps of forming a diallyl methyl ammonium hydrochloride cation with a chloride anion from diallylamine, polymerizing the diallyl methyl ammonium hydrochloride to form a poly(diallyl methyl ammonium hydrochloride) (PDMAH), forming a poly(diallyl methyl amine) (PDMA) from the poly(diallyl methyl ammonium hydrochloride) (PDMAH), forming an ammonium halide cation with a halide anion by reacting a trialkyl amine with a dihaloalkane; and forming the chemical composition depicted in Chemical Structure #3 by reacting the PDMA with the ammonium halide cation.

In accordance with yet another embodiment of the present disclosure, a catalyst may be formed by utilizing the cationic polymer depicted in Chemical Structure #3 as a structure-directing agent.

In accordance with yet another embodiment of the present disclosure, a mesoporous zeolite may comprise a microporous framework comprising a plurality of micropores having diameters of less than or equal to 2 nanometers (nm), and a plurality of mesopores having diameters of greater than 2 nm and less than or equal to 50 nm. The mesoporous zeolite may comprise an aluminosilicate material, a titanosilicate material, or a pure silicate material, the mesoporous zeolite may comprise a Brunauer-Emmett-Teller (BET) surface area of greater than 350 square meters per gram ($m^2/g$), and the mesoporous zeolite may comprise a pore volume of greater than 0.3 cubic centimeters per gram ($cm^3/g$). Throughout this disclosure, surface area refers the BET surface area of a zeolite structure.

In accordance with yet another embodiment of the present disclosure, a mesoporous zeolite may be produced by a method comprising combining a cationic polymer and one or more precursor materials to form an intermediate material comprising micropores, and calcining the intermediate structure form the mesoporous zeolite. The cationic polymer may act as a structure-directing agent for the formation of the micropores. The cationic polymer comprises monomers that comprise two or more quaternary ammonium cations or quaternary phosphonium cations connected by a hydrocarbon chain.

In accordance with yet another embodiment of the present disclosure, a porous material may comprise a zeolite core portion comprising a microporous structure comprising a plurality of micropores having a diameter of less than or equal to 2 nm, where the core portion comprises an aluminosilicate material, a titanosilicate material, or a pure silicate material. The porous material may also comprise a mesoporous zeolite shell portion that comprises an aluminosilicate material, a titanosilicate material, or a pure silicate material and surrounds the core portion. The shell portion may comprise a microporous framework comprising a plurality of micropores having diameters of less than or equal to 2 nm, and a plurality of mesopores having diameters of greater than 2 nm and less than or equal to 50 nm.

In accordance with yet another embodiment of the present disclosure, a core/shell zeolite comprising a core portion and a shell portion may be produced by a method comprising forming the shell portion intermediate material around the core seed material, the shell portion intermediate material comprising micropores, and calcining the core/shell porous material to form a core/shell zeolite, where the shell portion comprises a mesoporous zeolite. The cationic polymer acts as a structure-directing agent for the formation of the micropores of the shell portion intermediate. The cationic polymer comprises monomers that comprise two or more quaternary ammonium cations or quaternary phosphonium cations separated by a hydrocarbon chain.

Additional features and advantages of the technology disclosed in this disclosure will be set forth in the detailed description which follows, and in part will be readily apparent to those skilled in the art from the description or recognized by practicing the technology as described in this disclosure, including the detailed description which follows, the claims, as well as the appended drawings.

BRIEF DESCRIPTION OF THE DRAWINGS

The following detailed description of specific embodiments of the present disclosure can be best understood when read in conjunction with the following drawings, where like structure is indicated with like reference numerals and in which:

FIG. 15A depicts the core (that is, the seed) materials, FIG. 15B depicts a core shell structure with a shell thickness of about 40 nm, FIG. 15C depicts a core shell structure with a shell thickness of about 100 nm, and FIG. 15D depicts a core shell structure with a shell thickness of about 150 nm, according to one or more embodiments described in this disclosure;

FIG. 16B is of the core/shell porous structure, according to one or more embodiments described in this disclosure;

Figure 1:
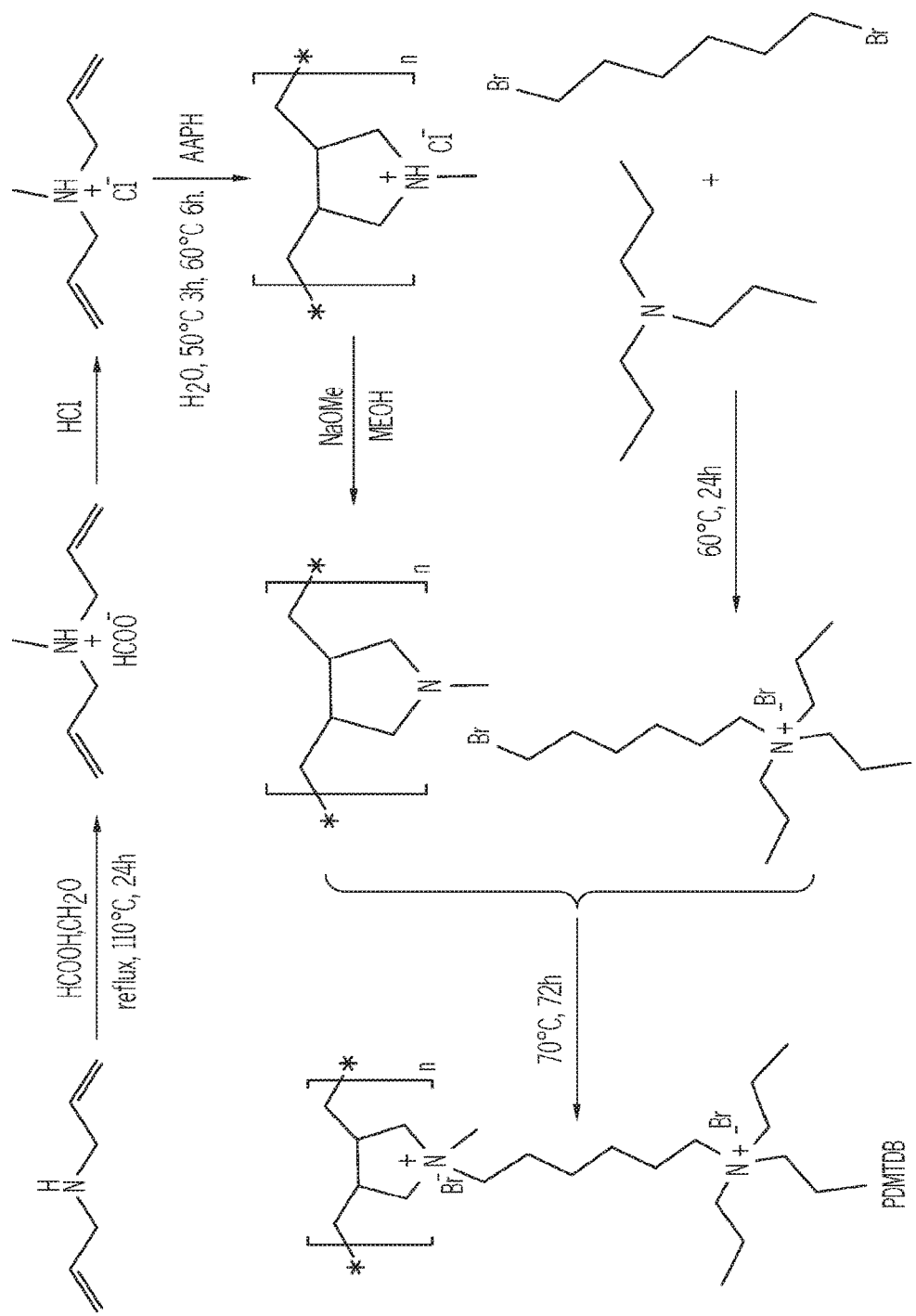
FIG. 1 depicts a reaction pathway to form poly($N^1,N^1$-diallyl-$N^1$-methyl-$N^6,N^6,N^6$-tripropylhexane-1,6-diamonium bromide) (PDAMAB-TMHAB), according to one or more embodiments described in this disclosure.

Reference will now be made in greater detail to various embodiments, some embodiments of which are illustrated in the accompanying drawings. Whenever possible, the same

DETAILED DESCRIPTION

This disclosure is directed to various embodiments of cationic polymers that may be used as structure-directing agents (SDAs) for the fabrication of mesoporous zeolite materials. As used throughout this disclosure, "zeolites" refer to micropore-containing inorganic materials with regular intra-crystalline cavities and channels of molecular dimension. The microporous structure of zeolites (for example, 0.3 nm to 1 nm pore size) may render large surface areas and desirable size-/shape-selectivity, which may be advantageous for catalysis. The mesoporous zeolites described may include aluminosilicates, titanosilicates, or pure silicates. In embodiments, the zeolites described may include micropores (present in the microstructure of a zeolite), and additionally include mesopores. As used throughout this disclosure, micropores refer to pores in a structure that have a diameter of less than or equal to 2 nm and greater than or equal to 0.1 nm, and mesopores refer to pores in a structure that have a diameter of greater than 2 nm and less than or equal to 50 nm. The cationic polymers may function as dual-function templates for synthesizing the mesoporous zeolites, meaning that they act simultaneously as a template for the fabrication of the micropores and as a template for the fabrication of the mesopores. In embodiments, the mesoporous zeolites fabricated by the use of the cationic polymers as SDAs may comprise microstructures (which include micropores) characterized by an MFI (mordenite framework inverted) framework type or a BEA framework type. For example, the mesoporous zeolites described may be characterized as ZSM-5 (that is, having an aluminosilicate MFI framework type), as TS-1 (that is, having a titanosilicate MFI framework type), or as silicalite-I (that is, having a pure silicate MFI framework type). In other embodiments, the mesoporous zeolites described may be characterized as Beta (that is, having an aluminosilicate BEA framework type).

The cationic polymers disclosed may comprise one or more monomers which each comprise multiple cationic functional groups, such as quaternary ammonium cations or quaternary phosphonium cations. The cation functional groups of the monomers may be connected by a hydrocarbon chain. Without being bound by theory, it is believed that the cationic functional groups may form or at least partially aid in forming the microstructure of the mesoporous zeolite (for example, an MFI framework type or BEA framework type) and the hydrocarbon chains and other hydrocarbon functional groups of the polymer may form or at least partially aid in forming the mesopores of the mesoporous zeolite.

The cationic polymers may comprise functional groups which are utilized as SDAs for the fabrication of the zeolite microstructure. Such functional groups, which are believed to form the zeolite microstructure, include quaternary ammonium cations and quaternary phosphonium cations. Quaternary ammonium is generally depicted in Chemical Structure #1 and quaternary phosphonium is generally depicted in Chemical Structure #2.

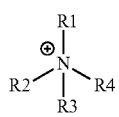

Chemical Structure #1—Generalized Quaternary Ammonium Cation

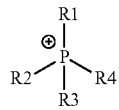

Chemical Structure #2—Generalized Quaternary Phosphonium Cation

As used throughout this disclosure, the encircled plus symbols ("+") show cationic positively charged centers. R groups (including R1, R2, R3, R4, R5, R6, R7, R8, R9, R10, R11, R12, and R13) represent chemical constituents. One or more of the various R groups may be structurally identical or may be structurally different from one another.

In Chemical Structure #1 and Chemical Structure #2, R1, R2, R3, and R4 may include hydrogen atoms or hydrocarbons, such as a hydrocarbon chain, optionally comprising one or more heteroatoms. As used throughout this disclosure, a "hydrocarbon" refers to a chemical or chemical moiety comprising hydrogen and carbon. For example, the hydrocarbon chain may be branched or unbranched, and may comprise an alkane hydrocarbon chain, an alkene hydrocarbon chain, or an alkyne hydrocarbon chain, including cyclic or aromatic moieties. In some embodiments, one or more of R1, R2, R3, or R4 may represent hydrogen atoms. As used throughout this disclosure, a heteroatom is a non-carbon and non-hydrogen atom. In embodiments, quaternary ammonium and quaternary phosphonium may be present in a cyclic moiety, such as a five atom ring, a six atom ring, or a ring comprising a different number of atoms. For example, in Chemical Structure #1 and Chemical Structure #2, the R1 and R2 constituents may be part of the same cyclic moiety.

In one or more embodiments, the two cation moieties may form ionic bonds with anions. Various anionic chemical species are contemplated, including $Cl^-$, $Br^-$, $F^-$, $I^-$, $OH^-$, ½ $SO_4^{2-}$, ⅓ $PO_4^{3-}$, ½ $S^{2-}$, $AlO_2^-$. In some embodiments, an anion with a negative charge of more than 1−, such as 2−, 3−, or 4−, may be utilized, and in those embodiments, a single anion may pair with multiple cations of the cationic polymer. As used throughout this disclosure, a fraction listed before an anionic composition means that the anion is paired with more than one cation and may, for example, be paired with the number of cations equal to its negative charge.

In one or more embodiments, two cations of a monomer may be separated from one another by a hydrocarbon chain. The hydrocarbon chain may be branched or unbranched, and may comprise an alkane hydrocarbon chain, an alkene hydrocarbon chain, or an alkyne hydrocarbon chain, including cyclic or aromatic moieties. In one embodiment, the length of the hydrocarbon chain (measured as the number of carbons in the chain directly connecting the two cations) may be from 1 to 10,000 carbon atoms, such 1 to 20 carbon atom alkane chains.

The cationic polymers described in this disclosure are generally non-surfactants. A surfactant refers to a compound that lowers the surface tension (or interfacial tension) between two liquids or between a liquid and a solid, usually by the inclusion of a hydrophilic head and a hydrophobic tail. Non-surfactants do not contain such hydrophobic and hydrophilic regions, and do not form micelles in a mixture containing a polar material and non-polar material. Without being bound by theory, it is believed that the polymers described are non-surfactants because of the inclusion of two or more cation moieties which are joined by a hydrocarbon chain. Such an arrangement has polar charges on or near each end of the monomer, and such an arrangement excludes the hydrophobic segment from the polymer, and thus the surfactant behavior (self-assembly in solution). On the atomic scale, it is believed that the functional groups (for example, quaternary ammoniums) on the polymer direct the formation of zeolite structure; on the mesoscale, the polymer functions simply as a "porogen" rather than an SDA in the conventional sense. As opposed to the cases of surfactants, non-surfactant polymers do not self-assemble to form an ordered mesostructure, which in turn favors the crystallization of zeolites, producing a new class of hierarchical zeolites that feature three-dimensionally (3-D) continuous zeolitic frameworks with highly interconnected intracrystalline mesopores. Such materials are advantageous over their surfactant-templated counterparts for applications where the structural integrity of zeolite is important while the ordering of mesopores is not.

In one embodiment, the cationic polymer may comprise the generalized structure depicted in Chemical Structure #3:

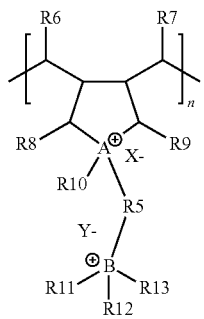

Chemical Structure #3—Generalized Cationic Polymer

Chemical Structure #3 depicts a single monomer of the cationic polymer, which is signified by the included bracket, where n is the total number of repeating monomers in the polymer. In some embodiments, the cationic polymer may be a copolymer comprising two or more monomer structures. The $X^-$ and $Y^-$ of Chemical Structure #3 represent anions. It should be understood that one or more monomers (such as that shown in Chemical Structure #3) of the cationic polymers described in the present application may be different from one another. For example, various monomer units may include different R groups. Referring the Chemical Structure #3, A may represent nitrogen or phosphorus and B may represent nitrogen or phosphorus, R5 may be a branched or unbranched hydrocarbon chain having a carbon chain length of from 1 to 10,000 carbon atoms, such as a 2 to 20 carbon alkane, $X^-$ may be an anion and $Y^-$ may be an anion, and R6, R7, R8, R9, R10, R11, R12, and R13 may be hydrogen atoms or hydrocarbons optionally comprising one or more heteroatoms.

Referring to Chemical Structure #3, in one or more embodiments, A may represent nitrogen or phosphorus and B may represent nitrogen or phosphorus. In one embodiment, A and B may be nitrogen, and in another embodiment, A and B may be phosphorus. For example, A of Chemical Structure #3 may comprise a quaternary ammonium cation or a quaternary phosphonium cation. As shown in Chemical Structure #3, A may be a portion of a ring structure, such as a five sided ring. In one or more embodiments, $X^-$ and $Y^-$ are anions. For example, $X^-$ may be chosen from $Cl^-$, $Br^-$, $F^-$, $I^-$, $OH^-$, $\frac{1}{2} SO_4^{2-}$, $\frac{1}{3} PO_4^{3-}$, $\frac{1}{2} S^{2-}$, $AlO_2^-$, and $Y^-$ may be chosen from $Cl^-$, $Br^-$, $F^-$, $I^-$, $OH^-$, $\frac{1}{2} SO_4^{2-}$, $\frac{1}{3} PO_4^{3-}$, $\frac{1}{2} S^{2-}$, $AlO_2^-$. In embodiments, an anion with a negative charge of more than 1−, such as 2−, 3−, or 4−, may be present, and in those embodiments, a single anion may pair with multiple cations of the cationic polymer.

Still referring to Chemical Structure #3, R5 represents a branched or unbranched hydrocarbon chain. The hydrocarbon chain may be branched or unbranched, and may comprise an alkane hydrocarbon chain, an alkene hydrocarbon chain, or an alkyne hydrocarbon chain. The length of the hydrocarbon chain (measured as the number of carbons in the chain directly connecting A to B) may be from 1 to 10,000 carbon atoms (such as from 1 to 1,000 carbon atoms, from 1 to 500 carbon atoms, from 1 to 250 carbon atoms, from 1 to 100 carbon atoms, from 1 to 50 carbon atoms, from 1 to 25 carbon atoms, from 1 to 20 carbon atoms, from 1 to 15 carbon atoms, from 1 to 10 carbon atoms, from 2 to 10,000 carbon atoms, from 3 to 10,000 carbon atoms, from 4 to 10,000 carbon atoms, from 5 to 10,000 carbon atoms, from 6 to 10,000 carbon atoms, from 8 to 10,000 carbon atoms, from 10 to 10,000 carbon atoms, from 15 to 10,000 carbon atoms, from 20 to 10,000 carbon atoms, from 25 to 10,000 carbon atoms, from 50 to 10,000 carbon atoms, from 100 to 10,000 carbon atoms, from 250 to 10,000 carbon atoms, from 500 to 10,000 carbon atoms, from 2 to 100 carbon atoms, from 3 to 30 carbon atoms, from 4 to 15 carbon atoms, or from 5 to 10 carbon atoms, such as 6 carbon atoms. R5 may comprise one or more heteroatoms, but some embodiments of R1 include only carbon and hydrogen.

In Chemical Structure #3, R6, R7, R8, R9, R10, R11, R12, and R13 may be hydrogen atoms or hydrocarbons optionally comprising one or more heteroatoms, respectively. For example, some of R6, R7, R8, R9, R10, R11, R12, and R13 may be structurally identical with one another and some of R6, R7, R8, R9, R10, R11, R12, and R13 may be structurally different from one another. For example, one or more of R6, R7, R8, R9, R10, R11, R12, and R13 may be hydrogen, or alkyl groups, such as methyl groups, ethyl groups, propyl groups, butyl groups, or pentyl groups. In embodiments, one or more of R6, R7, R8, and R9 may be hydrogen. In embodiments, one or more of R10, R11, R12, and R13 may be an alkyl groups. For example, R10 may be a methyl, ethyl, propyl, or butyl group, and one or more of R11, R12, and R13 may be methyl, ethyl, propyl, or butyl groups. In one embodiment, R10 is a methyl group and R11, R12, and R13 are propyl groups. In one embodiment, R11, R12, and R13 are methyl groups. In another embodiment, R11, R12, and R13 are methyl groups. In another embodiment, R11, R12, and R13 are propyl groups.

In one or more embodiment, Chemical Structure #3 may be a polymer that comprises n monomer units, where n may be from 10 to 10,000,000 (such as from 50 to 10,000,000, from 100 to 10,000,000, from 250 to 10,000,000, from 500 to 10,000,000, from 1,000 to 10,000,000, from 5,000 to 10,000,000, from 10,000 to 10,000,000, from 100,000 to 10,000,000, from 1,000,000 to 10,000,000, from 10 to 1,000,000, from 10 to 100,000, from 10 to 10,000, from 10 to 5,000, from 10 to 1,000, from 10 to 500, from 10 to 250, or from 10 to 100. For example, n may be from 1,000 to 1,000,000.

According to one or more embodiments, the cationic polymer comprises poly($N^1,N^1$-diallyl-$N^1$-alkyl-$N^6,N^6,N^6$-trialkylalkane-1,6-diamonium halide), such as poly($N^1,N^1$-diallyl-$N^1$-methyl-$N^6,N^6,N^6$-trialkylhexane-1,6-diamonium bromide). An example of such is poly($N^1,N^1$-diallyl-$N^1$- methyl-$N^6,N^6,N^6$-tripropylhexane-1,6-diamonium bromide), referred to as (PDAMAB-TPHAB) and shown in Chemical Structure #4.

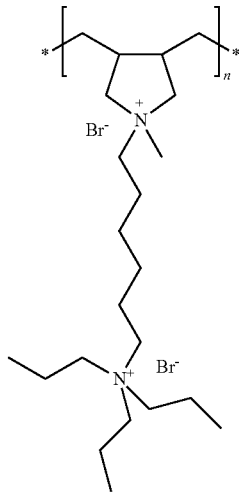

Chemical Structure #4—PDAMAB-TPHAB

In another embodiment, the cationic polymer comprises poly($N^1,N^1$-diallyl-$N^1$-methyl-$N^6,N^6,N^6$-triethylhexane-1,6-diamonium bromide), referred to as (PDAMAB-TEHAB) and shown in Chemical Structure #5.

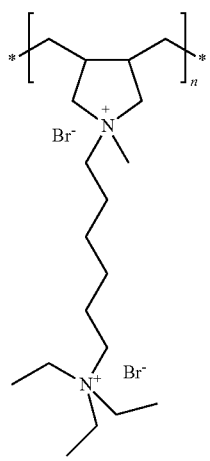

Chemical Structure #5—PDAMAB-TEHAB

In another embodiment, the cationic polymer comprises poly($N^1,N^1$-diallyl-$N^1$-methyl-$N^6,N^6,N^6$-trimethylhexane-1,6-diamonium bromide), referred to as (PDAMAB-TMHAB) and shown in Chemical Structure #6.

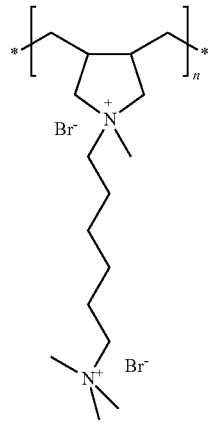

Chemical Structure #6—PDAMAB-TMHAB

The cationic polymers described in the present disclosure, including that of Chemical Structure #3, may be synthesized by a reaction pathway such as that shown in FIG. 1. Specifically, FIG. 1 depicts a reaction pathway for the synthesis of PDAMAB-TPHAB. However, it should be understood that other reaction pathways may be utilized for the synthesis of PDAMAB-TPHAB or other generalized polymers such as the polymer of Chemical Structure #3. Furthermore, it should be understood that the reaction scheme depicted in FIG. 1 may be adapted to form polymers which have a different structure than PDAMAB-TPHAB, such as some polymers included in the generalized Chemical Structure #3 (for example, PDAMAB-TEHAB or PDAMAB-TEHAB. For example, the hydrocarbon chain length between the cation groups A and B of Chemical Structure #3 may be changed by utilizing a different reactant in the scheme of FIG. 1.

Referring to FIG. 1, the cationic polymer of Chemical Structure #3 may be formed by a process comprising forming a diallyl methyl ammonium hydrochloride cation with a chloride anion from diallylamine, polymerizing the diallyl methyl ammonium hydrochloride to form a poly(diallyl methyl ammonium hydrochloride) (PDMAH), forming a poly(diallyl methyl amine) (PDMA) from the poly(diallyl methyl ammonium hydrochloride) (PDMAH), forming an ammonium halide cation with a halide anion by reacting a trialkyl amine, such as a tripropyl amine, with a dihaloalkane, and forming the PDAMAB-TPHAB by reacting the PDMA with the ammonium halide cation. In other embodiments, triethyl amine or trimethyl amine may be utilized as the trialkyl amine.

Still referring to FIG. 1, according to one or more embodiments, the diallyl methyl ammonium hydrochloride cation with a chloride anion may be formed by contacting the diallylamine with formic acid, formaldehyde, and HCl. In other embodiments, the diallyl methyl ammonium hydrochloride may be polymerized by contact with 2,2'-axobis(2-methylpropionamidine) dihydrochloride (AAPH). In additional embodiments, the poly(diallyl methyl amine) (PDMA) may be formed by contacting the poly(diallyl methyl ammonium hydrochloride) (PDMAH) with methane and sodium methoxide.

According to another embodiment, the cationic polymer may be a co-polymer comprising the monomer of the structure depicted in Chemical Structure #3 and the monomer of Chemical structure #7.

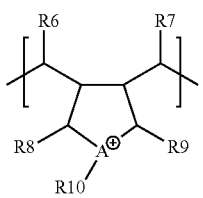

Chemical Structure #7

Referring to Chemical Structure #7, in one or more embodiments, A may represent nitrogen or phosphorus. In one embodiment, A may be nitrogen, and in another embodiment, A may be phosphorus. For example, A of Chemical Structure #7 may comprise a quaternary ammonium cation or a quaternary phosphonium cation. As shown in Chemical Structure #7, A may be a portion of a ring structure, such as a five sided ring. Anions may be present and be attracted to A or B, or both, For example, anions may be chosen from $Cl^-$, $Br^-$, $F^-$, $I^-$, $OH^-$, $½ SO_4^{2-}$, $⅓ PO_4^{3-}$, $½ S^{2-}$, $AlO_2^-$. In embodiments, an anion with a negative charge of more than 1-, such as 2-, 3-, or 4-, may be present, and in those embodiments, a single anion may pair with multiple cations of the cationic polymer.

In Chemical Structure #3, R6, R7, R8, R9, R10, may be hydrogen atoms or hydrocarbons optionally comprising one or more heteroatoms, respectively. For example, some of R6, R7, R8, R9, R10 may be structurally identical with one another and some of R6, R7, R8, R9, R10 may be structurally different from one another. For example, one or more of R6, R7, R8, R9, R10, may be hydrogen, or alkyl groups, such as methyl groups, ethyl groups, propyl groups, butyl groups, or pentyl groups. In embodiments, one or more of R6, R7, R8, and R9 may be hydrogen. In embodiments, R10 may be an alkyl groups. For example, R10 may be a methyl, ethyl, propyl, or butyl group. In one embodiment, R10 is a methyl group.

An embodiment of cationic polymers comprising the monomer of the structure depicted in Chemical Structure #3 and the monomer of Chemical structure #7 is depicted in Chemical Structure #8.

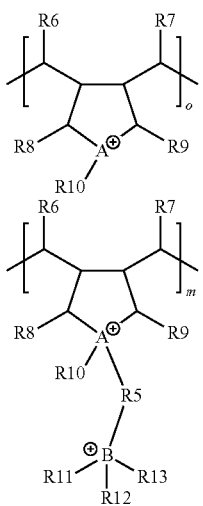

Chemical Structure #8

As depicted in Chemical Structure #8, the co-polymer may include the monomeric component of Chemical Structure #3 in "m" parts and the monomeric component of Chemical structure #7 in "o" parts. According to embodiments, the ratio of m/(o+m) may be equal to from 0 to 100%. For example, when m/(o+m)=0%, the cationic polymer may include only the monomeric components depicted in Chemical Structure #7, and when m/(o+m)=100%, the cationic polymer may include only the monomeric components depicted in Chemical Structure #3. In additional embodiments, m/(o+m) may be equal to from 0 to 25%, from 25% to 50%, from 50% to 75%, or from 75% to 100%. In some embodiments, m/(o+m) may be equal to from 25% to 75%, or from 60% to 70%.

In one or more embodiment, Chemical Structure #7 may be a co-polymer that comprises (o+m) monomer units, where (o+m) may be from 10 to 10,000,000 (such as from 50 to 10,000,000, from 100 to 10,000,000, from 250 to 10,000,000, from 500 to 10,000,000, from 1,000 to 10,000,000, from 5,000 to 10,000,000, from 10,000 to 10,000,000, from 100,000 to 10,000,000, from 1,000,000 to 10,000,000, from 10 to 1,000,000, from 10 to 100,000, from 10 to 10,000, from 10 to 5,000, from 10 to 1,000, from 10 to 500, from 10 to 250, or from 10 to 100. For example, (o+m) may be from 1,000 to 1,000,000.

Now referring to FIG. 1, the monomer of Chemical Structure #8 may, in one embodiment, be formed by supplying a lesser molar amount of ammonium halide cation, such that only a portion of the PDMA reacts with ammonium halide cation. In such an embodiment, the non-cation substituted PDMA monomers are representative of the monomers of Chemical Structure #7 and the cation substituted monomers are representative of the monomers of Chemical Structure #3.

According to one or more embodiments, the mesoporous zeolites described in the present disclosure may be produced by utilizing the cationic polymers described in the present disclosure as structure-directing agents. The mesoporous zeolites may comprise mesopores and micropores. The mesoporous zeolites described are generally silica-containing materials, such as aluminiosilicates, pure silicates, or titanosilicates. The mesoporous zeolites may have surface areas and pore volumes greater than that of conventionally produced zeolites. In this disclosure, a "conventional zeolite" or "conventionally produced zeolite" refers to a zeolite that does not substantially comprise mesopores (for example, less than 0.5% of the zeolite pore volume is characterized as mesopores).

According to various embodiments, the mesoporous zeolites described in the present disclosure may be produced by forming a mixture comprising the cationic polymer structure-directing agent (SDA), such as PDAMAB-TPHAB, and one or more precursor materials which will form the structure of the mesoporous zeolites. The precursor materials may contain the materials that form the porous structures, such as alumina and silica for a aluminosilicate zeolite, titania and silica for a titanosilicate zeolite, and silica for a pure silica zeolite. For example, the precursor materials may be one or more of a silicon-containing material, a titanium-containing material, and an aluminum-containing material. For example, at least $NaAlO_2$, tetra ethyl orthosilicate, and the cationic polymer may be mixed in an aqueous solution to form an intermediate material that will become a mesoporous aluminosilicate zeolite. It should be appreciated that other precursor materials that include silica, titania, or alumina may be utilized. For example, in other embodiments, tetra ethyl orthosilicate and cationic polymers may be combined to form an intermediate material that will become a silicate mesoporous zeolite; or tetra ethyl orthosilicate, tetrabutylorthotitanate, and cationic polymer may be combined to form an intermediate material that will become a titanosilicate mesoporous zeolite. Optionally, the combined mixture may be heated to form the intermediate material, and may crystallize under autoclave conditions. The intermediate material may comprise micropores, and the cationic polymer may act as a structure-directing agent in the formation of the micropores during crystallization. The intermediate materials may still contain the cationic polymers which may at least partially define the space of the mesopores following their removal. The products may be centrifuged, washed, and dried, and finally, the polymer may be removed by a calcination step. The calcination step may comprise heating at temperatures of at least about 400 degrees Celsius (° C.), 500° C., 550° C., or even greater. Without being bound by theory, it is believed that the removal of the polymers forms at least a portion of the mesopores of the mesoporous zeolite, where the mesopores are present in the space once inhabited by the polymers.

The materials of the mixture determine the material composition of the mesoporous zeolites, such as an aluminosilicate, a titanosilicate, or a pure silicate. An aluminosilicate mesoporous zeolite may comprise a molar ratio of Si/Al of greater than or equal to 10 and less than 10,000, greater than or equal to 25 and less than 10,000, greater than or equal to 50 and less than 10,000, greater than or equal to 100 and less than 10,000, greater than or equal to 200 and less than 10,000, greater than or equal to 500 and less than 10,000, greater than or equal to 1,000 and less than 10,000, or even greater than or equal to 2,000 and less than 10,000. In a pure silicate zeolite, a negligible amount or no amount of aluminum is present, and the Si/Al molar ratio theoretically approaches infinity. As used herein a "pure silicate" refers to a material comprising at least about 99.9 weight percent (wt. %) of silicon and oxygen atoms. A pure silica mesoporous zeolite may be formed by utilizing only silicon-containing materials and no aluminum. A titanosilicate porous structure may comprise a molar ratio of Si/Ti of greater than or equal to 30 and less than 10,000, greater than or equal to 40 and less than 10,000, greater than or equal to 50 and less than 10,000, greater than or equal to 100 and less than 10,000, greater than or equal to 200 and less than 10,000, greater than or equal to 500 and less than 10,000, greater than or equal to 1,000 and less than 10,000, or even greater than or equal to 2,000 and less than 10,000. It has been found that PDAMAB-TPHAB may be utilized to form mesoporous ZSM-5 zeolites when used with silica and alumina precursor materials, mesoporous TS-1 zeolites when used with a silica and titania precursor, and mesoporous silicalite-I zeolites when used with silica precursors. It has also been found that PDAMAB-TMHAB may be utilized to form mesoporous Beta zeolites when used with silica and alumina precursors.

Figure 2:
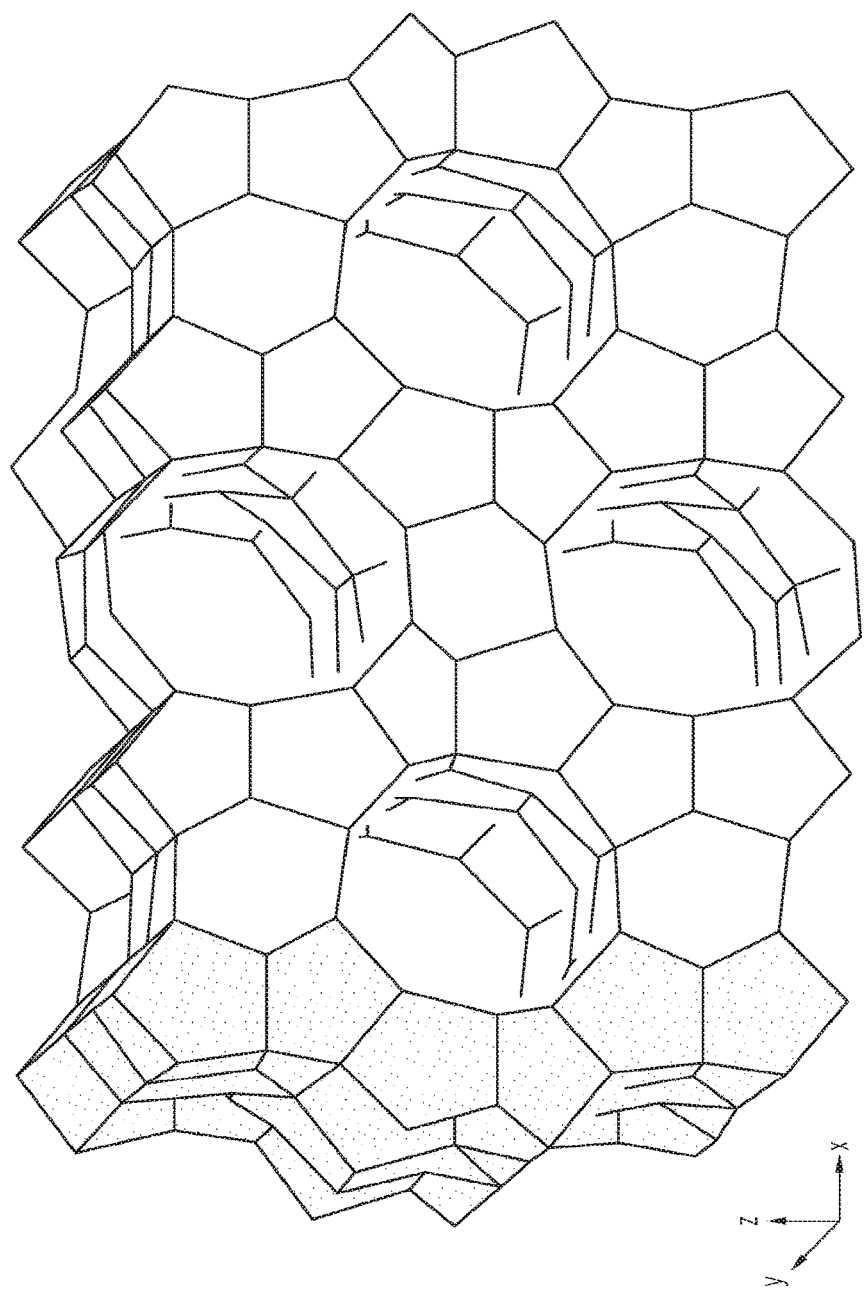
FIG. 2 depicts a schematic drawing of an MFI framework type microstructure, according to one or more embodiments described in this disclosure.

The formed mesoporous zeolites may comprise micropores characterized as MFI framework type, which is schematically depicted in FIG. 2. The MFI framework type comprises micropores which have a diameter of less than or equal to 2 nm. However, other microporous zeolite structures, for example, BEA, FAU, LTA framework types, are contemplated.

The formed mesoporous zeolites also comprise mesopores. It is believed that the mesopores are formed from the voids created during calcination of the polymers. The mesopores of the presently disclosed mesoporous zeolites may have an average size of from 4 nm to 16 nm, from 6 nm to 14 nm, from 8 nm to 12 nm or from 9 nm to 11 nm. Conventionally prepared zeolites may have mesopores with a pore size of about 6 nm or less. In some embodiments, the majority of the mesopores may be greater than 8 nm, greater than 9 nm, or even greater than 10 nm. The mesopores of the mesoporous zeolites described may range from 2 nm to 40 nm, and the median pore size may be from 8 to 12 nm. In embodiments, the mesopore structure of the mesoporous zeolites may be fibrous, where the mesopores are channel-like. Without being bound by theory, it is believed that the mesoporous zeolites disclosed have enhanced mesoporous characteristics due to the polymer structure of the SDA, which when calcined, leaves a plurality of interconnected channels in the mesoporous zeolite.

The mesoporous zeolites described in the present disclosure may have enhanced catalytic activity. Without being bound by theory, it is believed that the microporous structures provide for the majority of the catalytic functionality of the mesoporous zeolites described. The high mesoporosity allows for greater catalytic functionality because more micropores are available for contact with the reactant in a catalytic reaction. The mesopores allow for better access to microporous catalytic sites on the mesoporous zeolite.

In embodiments, the mesoporous zeolites may have a surface area of greater than or equal to 300 m$^2$/g, greater than or equal to 350 m$^2$/g, greater than or equal to 400 m$^2$/g, greater than or equal to 450 m$^2$/g, greater than or equal to 500 m$^2$/g, greater than or equal to 550 m$^2$/g, greater than or equal to 600 m$^2$/g, greater than or equal to 650 m$^2$/g, or even greater than or equal to 700 m$^2$/g, and less than or equal to 1,000 m$^2$/g. In one or more other embodiments, the mesoporous zeolites may have pore volume of greater than or equal to 0.2 cm$^3$/g, greater than or equal to 0.25 cm$^3$/g, greater than or equal to 0.3 cm$^3$/g, greater than or equal to 0.35 cm$^3$/g, greater than or equal to 0.4 cm$^3$/g, greater than or equal to 0.45 cm$^3$/g, greater than or equal to 0.5 cm$^3$/g, greater than or equal to 0.55 cm$^3$/g, greater than or equal to 0.6 cm$^3$/g, greater than or equal to 0.65 cm$^3$/g, or even greater than or equal to 0.7 cm$^3$/g, and less than or equal to 1.5 cm$^3$/g. In further embodiments, the portion of the surface area contributed by mesopores may be greater than or equal to 20%, greater than or equal to 25%, greater than or equal to 30%, greater than or equal to 35%, greater than or equal to 40%, greater than or equal to 45%, greater than or equal to 50%, greater than or equal to 55%, greater than or equal to 60%, or even greater than or equal to 65%, such as between 20% and 70% of total surface area. In additional embodiments, the portion of the pore volume contributed by mesopores may be greater than or equal to 20%, greater than or equal to 30%, greater than or equal to 35%, greater than or equal to 40%, greater than or equal to 45%, greater than or equal to 50%, greater than or equal to 55%, greater than or equal to 60%, greater than or equal to 65%, greater than or equal to 70%, or even greater than or equal to 75%, such as between 20% and 80% of total pore volume. Surface area and pore volume distribution may be measured by $N_2$ adsorption isotherms performed at 77 Kelvin (K) (such as with a Micrometrics ASAP 2020 system).

The mesoporous zeolites described may form as particles that may be generally spherical in shape or irregular globular shaped (that is, non-spherical). In embodiments, the particles have a "particle size" measured as the greatest distance between two points located on a single zeolite particle. For example, the particle size of a spherical particle would be its diameter. In other shapes, the particle size is measured as the distance between the two most distant points of the same particle, where these points may lie on outer surfaces of the particle. The particles may have a particle size from 25 nm to 500 nm, from 50 nm to 400 nm, from 100 nm to 300 nm, or less than 900 nm, less than 800 nm, less than 700 nm, less than 600 nm, less than 500 nm, less than 400 nm, less than 300 nm, or less than 250 nm. Particle sizes may be visual examination under a microscope.

The mesoporous zeolites described may be formed in a single-crystal structure, or if not single crystal, may consist of a limited number of crystals, such as 2, 3, 4, or 5. The crystalline structure of the mesoporous zeolites may have a branched, fibrous structure with highly interconnected intra-crystalline mesopores. Such structures may be advantageous in applications where the structural integrity of the zeolite is important while the ordering of the mesopores is not.

According to another embodiment, a mesoporous zeolites may be formed which comprises a core portion and a shell portion, where the shell portion generally surrounds the core portion. Such materials are described in this disclosure as a "core/shell zeolite." The core portion may be a mesoporous zeolite comprising micropores, such as some conventional zeolites, and may optionally comprise mesopores to some degree. The shell portion comprises a mesoporous zeolite comprising mesopores and micropores as previously described, and may be formed by utilizing the cationic polymer described in this disclosure as an SDA. In some embodiments, the core portion may comprise micropores, such as an MFI framework type, but not substantially comprise mesopores. In such an embodiment, the core portion may not substantially comprise mesopores, and the shell portion may comprise mesopores (or alternatively, the shell portion may comprise a higher degree of mesopores than the core portion).

The core/shell zeolite may be produced by processes similar to the process for synthesizing the mesoporous zeolites comprising micropores and mesopores described previously. As described previously, such mesoporous zeolites comprising micropores and mesopores may be fabricated by utilizing a cationic polymer, such as the polymer of Chemical Structure #3 or the polymer of Chemical Structure #8. To form the core/shell zeolite embodiment, a seed material, which will become the core portion, is added to the mixture comprising the SDA polymer and the precursor materials. The seed material may be a pre-fabricated zeolite which works as a crystalline seed upon which mesoporous zeolite (containing mesopores and micropores) is grown. The mesoporous zeolite is formed around the seeds, and the core/shell structure is formed. For example, a crystallized intermediate material may be formed around the core which includes micropores, and in a subsequent step, the polymer is removed by calcination to produce mesopores.

The core portion, which may have the same composition and microporous structure as the seed material, may comprise a zeolite such as an MFI framework type zeolite, for example, a ZSM-5 zeolite. However, the core portion may comprise other materials such as silicate zeolites and titanosilicate zeolites, or zeolites with different microporous framework types, such as Y-zeolites. The seed materials may have a length of from 25 nm to 500 nm, such as from 50 nm to 300 nm, or from 75 nm to 200 nm. The size of the seed materials determines the size of the core portion of the core/shell zeolite.

The shell portion may have a composition and structure of the mesoporous zeolites described previously in the present disclosure. For example, the surface area, pore volume, and materials of composition of the MFI-structured or BEA-structured, mesoporous zeolites previously described may be the same as those of the shell material. Without being bound by theory, it is believed that the materials of the shell portion and the core portion are interconnected at the interface of the two materials by Si—O—Si covalent bonds. The shell portion may have a thickness of from 10 nm to 300 nm, such as 20 nm to 200 nm, from 20 nm to 50 nm, from 50 nm to 100 nm, from 100 nm to 150 nm, or from 150 nm to 200 nm. Generally, the thickness of the shell portion can be varied based on the amount of seeds that are added to the mixture, as less seeds may produce thicker shells, and more seeds may produce thinner shells.

In some embodiments, the core and shell have the same microstructure, which may allow for the formation of a single-crystalline core/shell body. If the core and shell have different microstructures, the shell may grow at defective sites on the outer surface of the core. However, matching of the microstructure framework of the core and shell material may produce enhanced core/shell embodiments. In some embodiments, the core/shell structure is at least partially enhanced by matching of framework type of the core and shell zeolites.

In one or more embodiments, non-surfactant polymer-based templates are not limited to the creation of interconnecting mesopores in zeolite crystals. For example, different from small molecules, polymer chains can be easily grafted with functional groups. It is contemplated that if a polymer containing additional functional groups besides the SDA groups is used to synthesize zeolites, the corresponding functionalities (for example, adsorption capacity, catalytic activity, molecular recognition ability, fluorescent property) can be "carried" into the resulting hierarchical zeolites to render multi-functional materials. For example, direct incorporation of colloidal nanocrystals may be achieved, such as metal or oxide nanocrystals, into hierarchical zeolite particles during the synthesis, by functionalizing the polymer template with special groups that have specific interaction with the nanocrystals. For example, PDAMAB-TPHAB has a high density of quaternary ammonium groups along the polymer chain, a small fraction of which play the role of SDA for the crystallization of ZSM-5, leaving a large number of unused ammonium groups. These reductant ammoniums may be available as adsorption sites to adsorb anions.

The mesoporous zeolites described in the present disclosure can be applied to many industrially valuable processes. These processes include fluidization processes (such as fluidized catalytic cracking (FCC), deep catalytic cracking (DCC), and high severity fluidized catalytic cracking (HS-FCC)), dehydrogenation process, isomerization process, methanol to olefin process (MTO) and reforming process. Table 1 summarizes some industrial applications of zeolites and other porous catalytic materials in the petrochemical industry. The present mesoporous zeolites and core/shell structures may replace these catalysts or be used in combination with these catalysts.

Additionally, core/shell embodiments may be particularly suited for facilitating the conjugation of zeolite with polymer to fabricate high-quality composite membranes without interfacial defects for separation or catalysis, where molecules can be pre-aligned by the mesopores in the shell before they enter the microporous core, giving unusual transportation properties. The shell and the core with different catalytic activities may form a tandem catalyst for multistep reactions.

TABLE 1

| Catalytic Reaction | Target Description | Zeolitic Catalyst |
|---|---|---|
| Fluid Catalytic cracking | To convert high boiling, high molecular mass hydrocarbon fractions to more valuable gasoline, olefinic gases, and other products | REY, USY, ZSM-5 |
| Hydrocracking | To produce gasoline with higher quality | NiMo or NiW/USY |
| Hydrodesulfurization (HDS) | To produce clean, high quality fuels and feeds for petrochemical industry | Pt, Pd, Ru, Ir, Ni loaded on a HY zeolite |
| Gas oil hydrotreating/Lube hydrotreating | Maximizing production of premium distillate by catalytic dewaxing | Ni, W or Pt/Y or ZSM-5 |
| Alkane cracking and alkylation of aromatics | To improve octane and production of gasolines and BTX | ZSM-5 |
| Olefin oligomerization | To convert light olefins to gasoline & distillate | Pt/FRR ZSM |
| Methanol dehydration to olefins | To produce light olefins from methanol | SAPO-34, ZSM-5 |
| Heavy aromatics transalkylation | To produce xylene from C9+ | ZSM-5, Y, 6, |
| Fischer-Tropsch Synthesis FT | To produce gasoline, hydrocarbons, and linear alpha-olefins, mixture of oxygenates | $Co/Al_2O_3$ and H-ZSM-5 |
| CO2 to fuels and chemicals | To make organic chemicals, materials, and carbohydrates | $g-Al2O3$, HZSM-5, and NaHZSM-5 |

EXAMPLES

The various embodiments of methods and systems for forming mesoporous zeolites and core/shell zeolites will be further clarified by the following examples. The examples are illustrative in nature, and should not be understood to limit the subject matter of the present disclosure.

Throughout the various examples, powder X-ray diffraction (XRD) patterns were recorded on a Bruker D8 Advance diffractometer using Cu Kα radiation. Inductively coupled plasma-optical emission spectroscopy (ICP-OES) was conducted on a Varian 720-ES spectrometer. Thermogravimetric analysis (TGA) was performed on a Netzsch TG 209 F1 apparatus under flowing air at a rate of 25 milliliters per minute (mL/min) and a constant ramping rate of 10 Kelvin per minute (K/min). $N_2$ adsorption-desorption isotherms were collected on a Micromeritics ASAP 2420 analyzer at 77 K. Temperature-programed desorption (TPD) measurements using $NH_3$ as the probe molecule were performed on a Micromeritics AutoChem II 2950 apparatus. Before measurements, 0.15 g of the sample was pretreated in He gas (25 mL/min) for 1 hour at 500° C. and then cooled to 100° C. Next, the sample was exposed to a mixed gas (10 mole percent (mol %) $NH_3$ and 90 mol % He) flow of 20 mL/min for 1 hour to ensure the sufficient adsorption of $NH_3$. Prior to desorption, the sample was flushed in He gas for 3 h. Subsequently, $NH_3$ desorption was performed in the range of 100-600° C. at a heating rate of 10 degrees Celsius per minute (° C./min) under a He flow of 20 mL/min. Electron microscopy imaging and tomography was carried out on FEI-Titan ST electron microscope operated at 300 kilivolt (kV), except the image shown in FIG. 19C, which was taken at a JEOL JEM-3010 microscope operated at 300 kV. For TEM tomography, an electron tomography tilt series from 75 degrees (°) to 75° at 1° intervals was firstly aligned and then reconstructed to a 3D volume using the SIRT function in the FEI Inspect 3D software. The 3D volume rendering, density segmentation and slicing were then achieved by the Avizo software.

Example 1—Synthesis of PDAMAB-TPHAB Cationic Polymer

A generalized reaction sequence for producing PDAMAB-TPHAB is depicted in FIG. 1. Each step in the synthesis is described in the context of FIG. 1.

In a first step, a methyl amine monomer was synthesized. Diallylamine (1 part equivalent, 0.1 mol) was slowly added to a solution of formic acid (5 equivalent, 0.5 mol) that was cooled to 0° C. in a 500 milliliter (mL) round-bottom flask. To the resulting clear solution a formaldehyde solution (37% solution; 3 equivalent, 0.3 mol) was added and the mixture was stirred at room temperature for 1 hour. Then, the flask was connected to a reflux condenser and the reaction mixture was heated overnight at 110° C. After, the solution was cooled and aqueous HCl (4 N, 2 equivalent, 0.9 mol, 225 mL) was added. The crude reaction product was evaporated to dryness under reduced pressure.

In a second step, a poly(diallyl methyl amine) (PDMA) was synthesized. A 50% aqueous solution of the monomer diallyl methyl ammonium hydrochloride with 3.2% initiator of 2,2'-azobis(2-methylpropionamidine) dihydrochloride (AAPH) was purged with nitrogen for 20 minutes (min). Afterwards, the reaction was stirred under nitrogen atmosphere at 50° C. for 3 hours, and then the reaction was increased to 60° C. for another 6 hours. The product poly (diallyl methyl ammonium hydrochloride) (PDMAH) was purified by dialysis and the water was removed on the rotary evaporator under reduced pressure. Then, the PDMAH (1 part equivalent with respect to monomer unit) was dissolved in a minimum amount of methanol and placed in an ice bath. Subsequently, sodium methoxide (1 part equivalent) dissolved in a minimum amount of methanol, was added. The reaction was stored in a freezer for 1 hour. The PDMA methanol solution was obtained after removing the NaCl with centrifugation.

In a third step, 6-bromo-N,N,N-tripropylhexan-1-aminium bromide (BTPAB) was synthesized. A tripropyl amine (0.05 mol)/toluene mixture (1:1 volume/volume (v/v)) was added to 1,6-dibromohexane (0.1 mol)/acetonitrile (1:1 v/v) slowly at 60° C. under magnetic stirring, and kept at this temperature for 24 hours. After cooling to room temperature and solvent evaporation, the obtained BTPAB was extracted through a diethyl ether-water system that separates excess 1, 6-dibromohexane from the mixture.

In a fourth step, PDAMAB-TPHAB was synthesized. For the synthesis of PDAMAB-TPHAB, 1 part equivalent of PDMA (with respect to monomer unit) in methanol was dissolved with 1 part equivalent of BTPAB in acetonitrile/toluene (40 mL, v:v=1:1) and refluxed at 70° C. for 72 hours under magnetic stirring. After cooling to room temperature and then solvent evaporation, the obtained PDAMAB-TPHAB was further purified by dialysis method in water.

Example 2—H-NMR Analysis of PDAMAB-TPHAB Cationic Polymer

Figure 3:
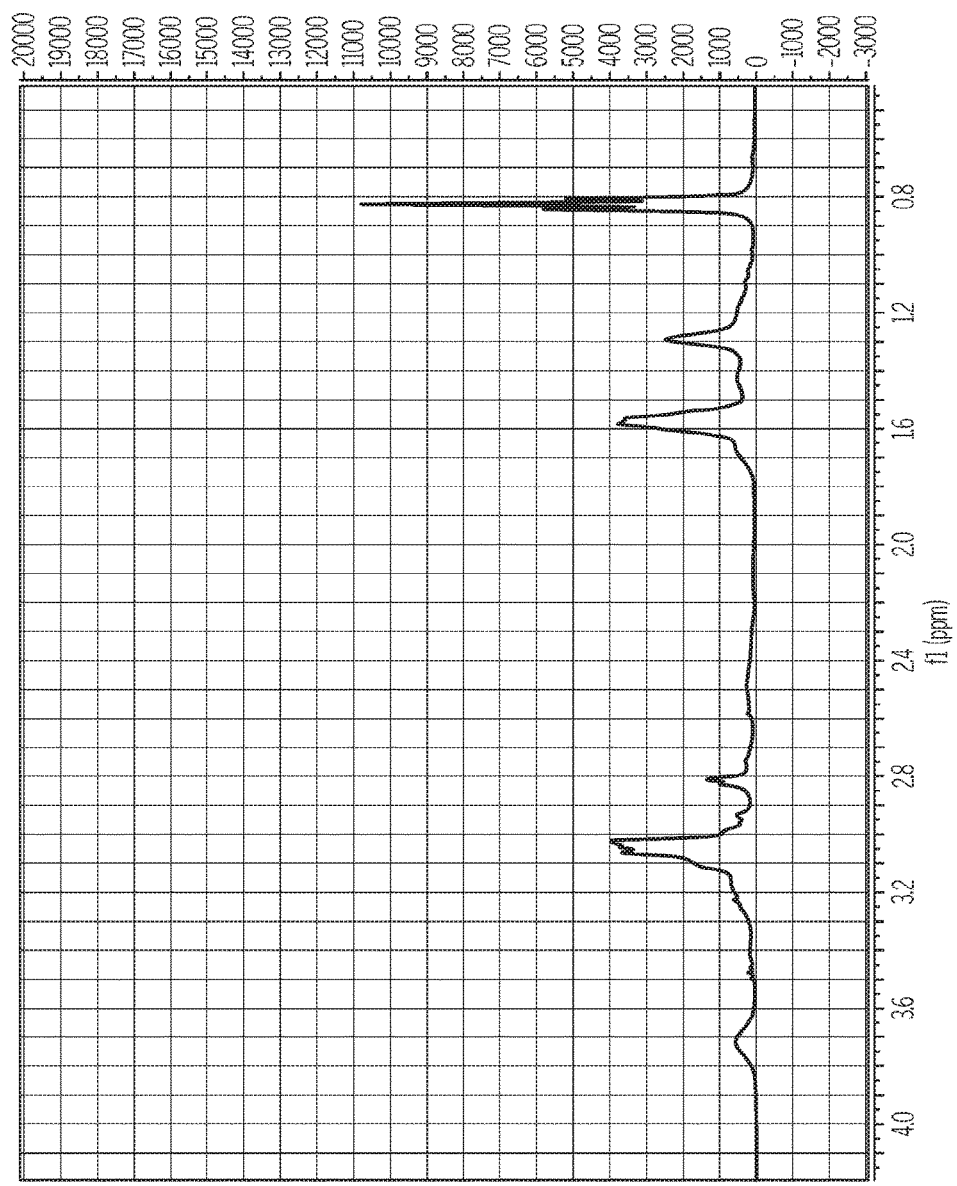
FIG. 3 depicts a Proton Nuclear Magnetic Resonance (H-NMR) spectrum of PDAMAB-TMHAB as synthesized in Example 1, according to one or more embodiments described in this disclosure.
Figure 4:
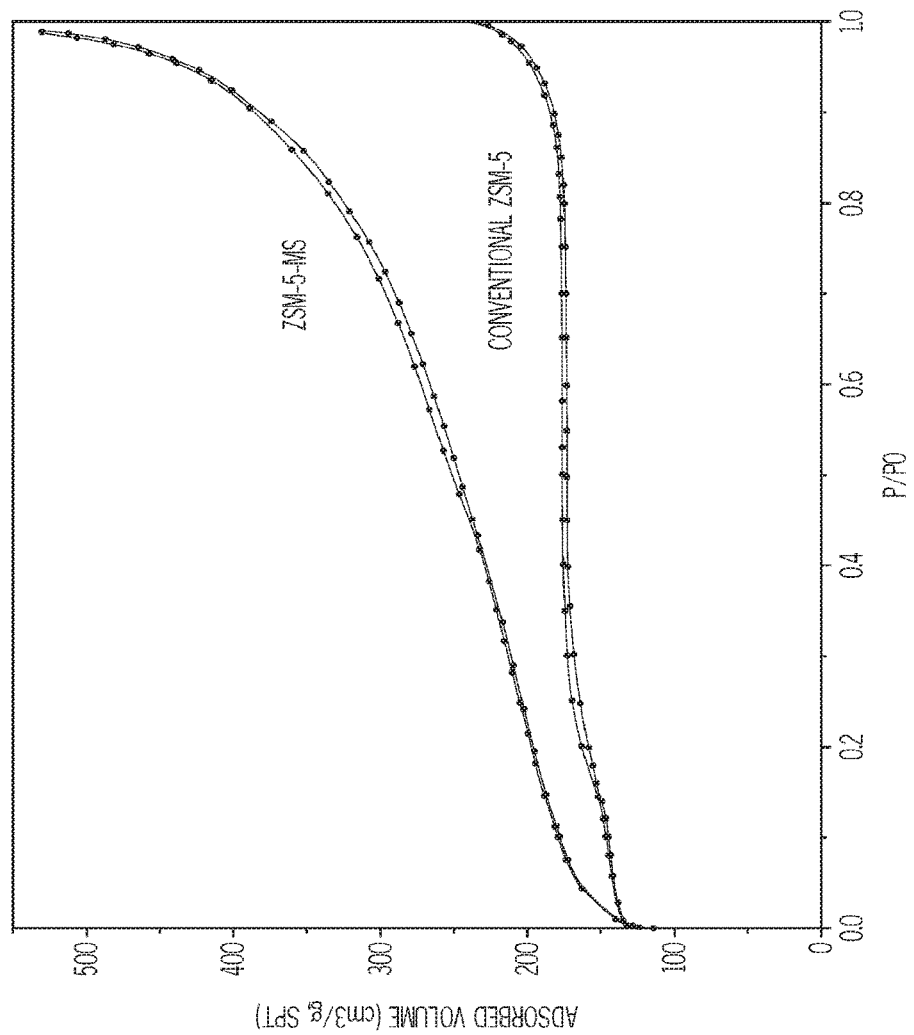
FIG. 4 depicts $N_2$ sorption isotherms for the zeolite of Example 3 and a conventional ZSM-5 zeolite (without mesopores), according to one or more embodiments described in this disclosure.

The PDAMAB-TPHAB polymer synthesized in Example 1 was analyzed by H-NMR. The H-NMR spectrum for the polymer produced in Example 1 is depicted in FIG. 3. The H-NMR spectrum shows peaks at or near 0.85 parts per million (ppm), at or near 1.3 ppm, at or near 1.6 ppm, at or near 2.8 ppm, and at or near 3.05 ppm.

Example 3—Synthesis of Mesoporous ZSM-5 Zeolite with 100 Si/Al Ratio

A mesoporous ZSM-5 zeolite was formed having a Si/Al molar ratio of 100. First, 0.1093 grains (g) of $NaAlO_2$ and 0.2 g NaOH was dissolved in 14.4 mL of water with stirring for 0.5 hours. When a clear solution was formed, 0.497 g of PDAMAB-TPHAB was added to the solution and stirred for 0.5 hours. Then, 4.16 g of tetraethyl orthosilicate was added at 60° C. The molar composition of the mixture was 1 PDAMAB-TPHAB:20 $SiO_2$:2.5 $Na_2O$:0.1 $Al_2O_3$:800 $H_2O$. After stirring for 10 hours at 60° C., the resulting gel was heated to 100° C. for an additional 2 hours. Crystallization was conducted in Teflon-lined stainless steel autoclaves (sized 25 mL) at 150° C. for 48 hours. The products were centrifuged, washed with distilled water and methanol, and dried at 100° C. overnight. The polymer template was removed from the as-synthesized material by calcination at 550° C. for 5 hours.

Example 4—Synthesis of Mesoporous TS-1 Zeolite with 60 Si/Ti Ratio

A mesoporous titanosilicate zeolite was formed having a Si/Ti molar ratio of 60. First, 0.2 g NaOH was dissolved in 14.4 mL of water with stirring for 10 minutes. When a clear solution was formed, 0.497 g of PDAMAB-TPHAB was added to the solution and stirred for 0.5 hours. Then, a mixture of tetraethylorthosilicate and tetrabutylorthotitanate (total amounts: 4.16 g) with Si/Ti molar ratio 60 was added at 60° C. The molar composition of the mixture was 1 PDAMAB-TPHAB: 20 $SiO_2$:0.33 $TiO_2$:2.5 $Na_2O$:800 $H_2O$. After stifling for 10 hours at 60° C., the resulting gel was heat to 100° C. for an additional 2 hours. Crystallization was conducted in Teflon-lined stainless steel autoclaves (sized 25 mL) at 150° C. for 48 hours. The products were centrifuged, washed with distilled water and methanol and, dried at 100° C. overnight. The polymer template was removed from the as-synthesized material by calcination at 550° C. for 5 hours.

Example 5—Analysis of Mesoporous ZSM-5 Zeolite with 100 Si/Al Ratio

Figure 5:
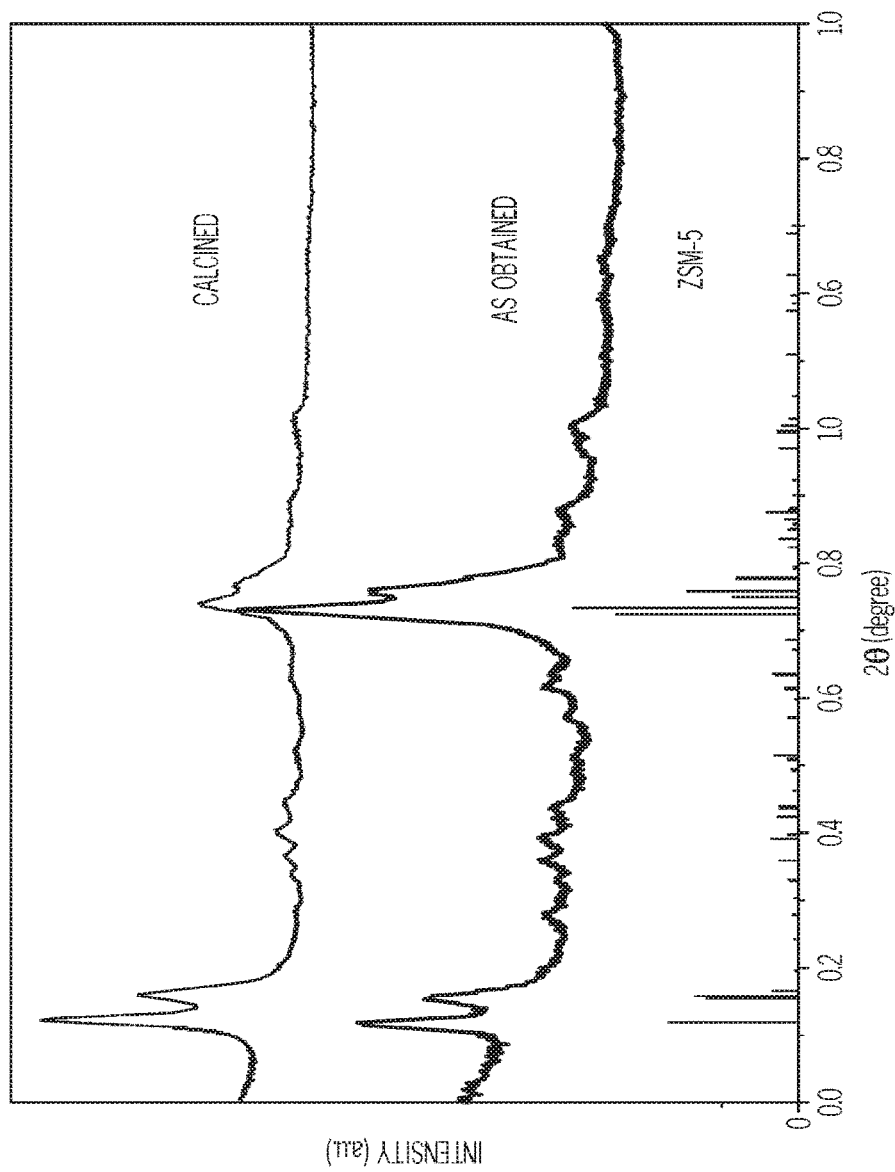
FIG. 5 depicts an X-ray diffraction (XRD) pattern of the zeolite of Example 3 as-synthesized and following calcination, according to one or more embodiments described in this disclosure.

The mesoporous ZSM-5 zeolite of Example 3 was analyzed. FIG. 5 depicts X-ray diffraction (XRD) patterns of the mesoporous ZSM-5 zeolite as-synthesized and following calcination. It was determined from the XRD patterns that the zeolite of Example 3 had an MFI type of zeolite structure, which was well maintained after the removal of polymer template by calcination. For example XRD peaks at those shown in FIG. 5 were used to determine that the zeolite had an MFI framework type microstructure.

Figure 6:
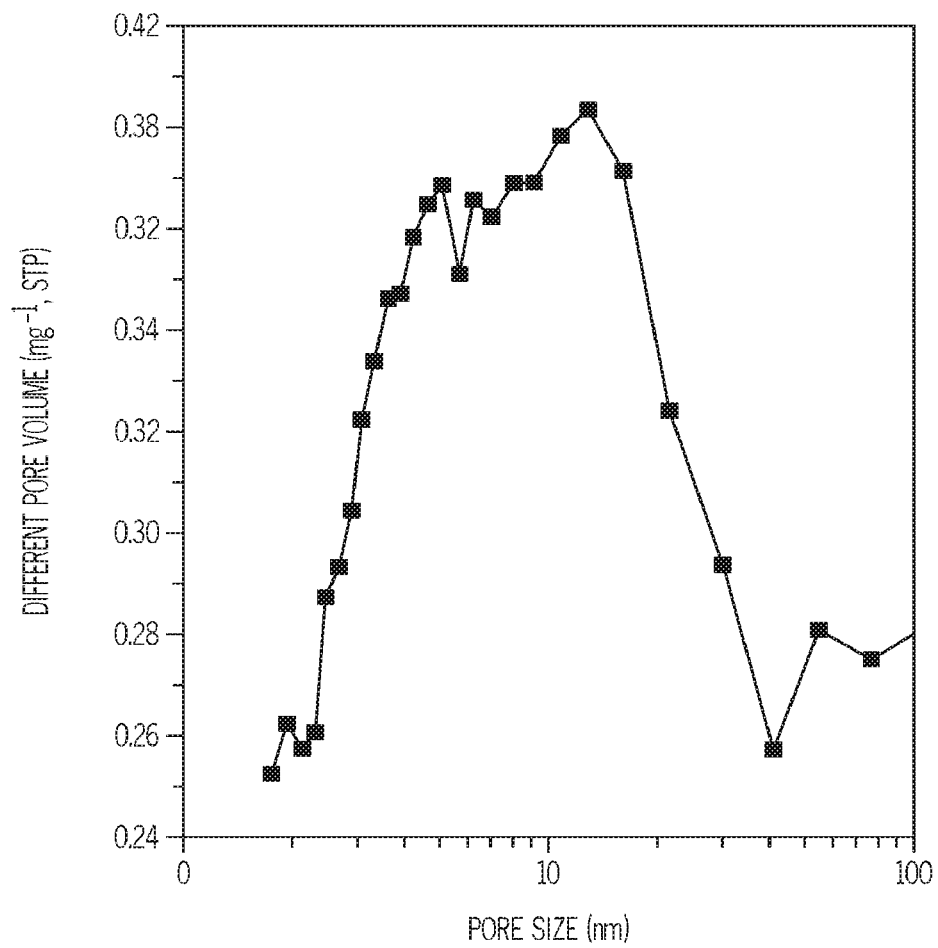
FIG. 6 depicts a distribution curve of mesopore size in the zeolite of Example 3, according to one or more embodiments described in this disclosure.

Additionally, the mesoporous ZSM-5 zeolite of Example 3 was tested for porosity. FIG. 5 depicts $N_2$ sorption isotherms for the zeolite of Example 3 and a conventionally prepared ZSM-5 zeolite, and indicates that it has a much higher porosity than does a conventional ZSM-5 zeolite. A surface area of 700 $m^2/g$ was measured for the zeolite of Example 3, as opposed to a surface area of 320 $m^2/g$ for a conventional ZSM-5 zeolite. Additionally, a total pore volume of 0.71 $cm^3/g$ was measured for the zeolite of Example 3, as opposed to a total pore volume of 0.23 $cm^3/g$ for a conventional ZSM-5 zeolite. In the zeolite of Example 3, 57% of the total surface area and 68% of the total pore volume are contributed by mesopores. Additionally, FIG. 6 depicts the distribution curve of mesopores in the zeolite of Example 3. The mesopores have a relatively broad size distribution, centered at or near 10 nm, as shown in FIG. 6.

Figure 7:
FIG. 7 depicts a Transmission Electron Microscope (TEM) image of the zeolite of Example 3, according to one or more embodiments described in this disclosure.
Figure 8:
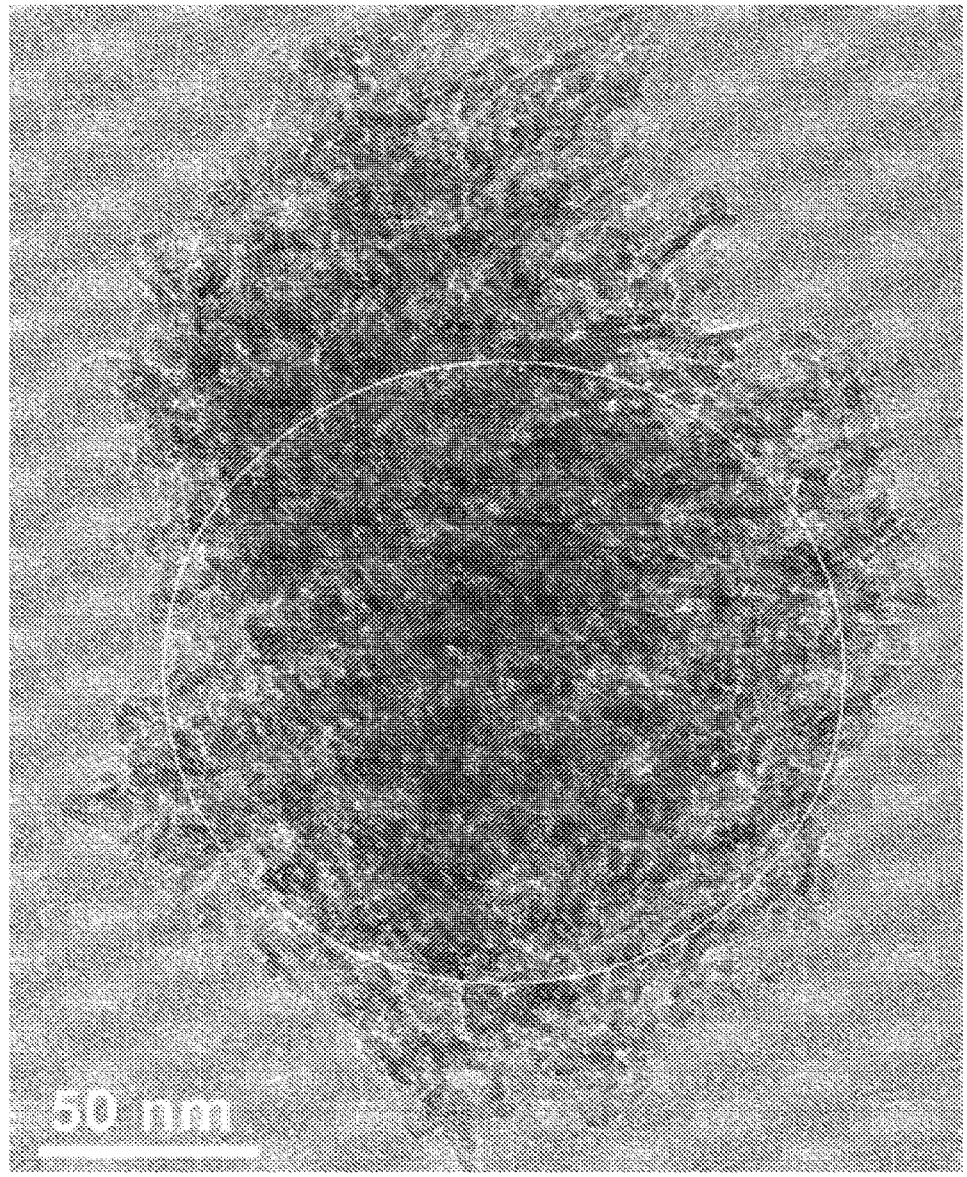
FIG. 8 depicts a High Resolution Transmission Electron Microscope (HRTEM) image of the zeolite of Example 3, according to one or more embodiments described in this disclosure.
Figure 9:
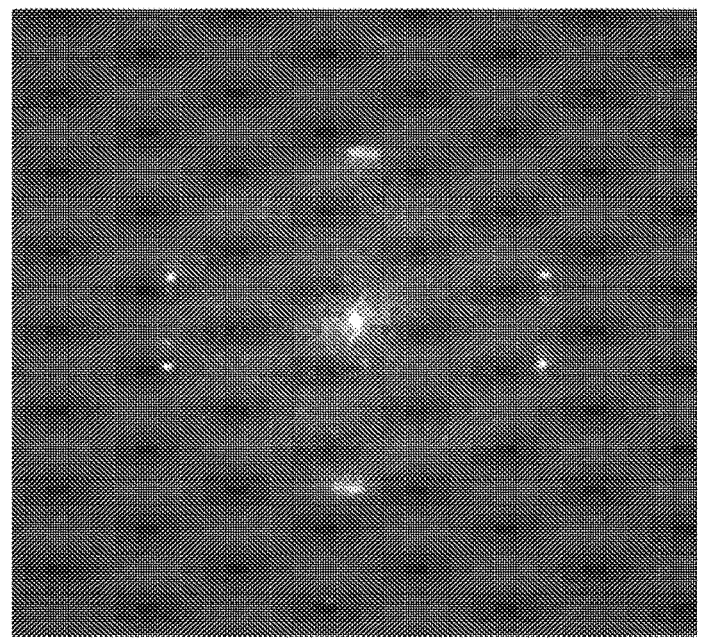
FIG. 9 depicts a Fast Fourier Transform (FFT) image of the selected area shown in FIG. 8, according to one or more embodiments described in this disclosure.
Figure 10:
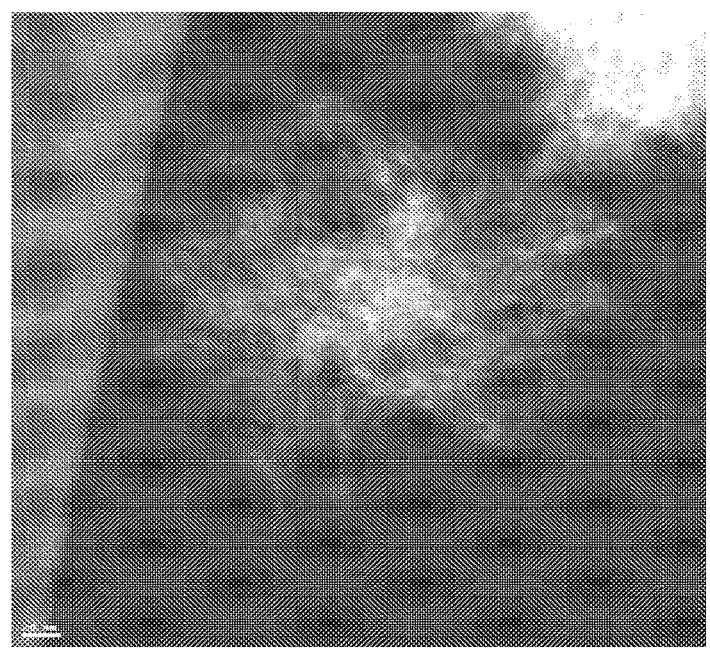
FIG. 10 depicts a dark field Scanning Transmission Electron Microscope (STEM) image of the zeolite of Example 3, according to one or more embodiments described in this disclosure.

Referring to FIG. 7, a transmission electron microscope (TEM) image of the zeolite of Example 3 is depicted. The TEM characterization shows that the zeolite of Example 3 consists of uniform and relatively small (about 200 nm in size) but highly mesoporous particles. Further, FIG. 8 depicts a high resolution transmission electron microscope image (HRTEM) of the zeolite of Example 3, FIG. 9 depicts a Fast Fourier Transform (FFT) image of the selected area shown in FIG. 8, and FIG. 10 depicts a dark field scanning electron microscope (STEM) image of the zeolite of Example 3. The high crystallinity of these particles are confirmed with the HRTEM images, while the FFT of the HRTEM image suggests that each particle is of a single-crystalline nature despite the presence of significant amount of mesopores. The HRTEM image of FIG. 8 also reveal that the zeolite of Example 3 particles are highly branched, and each branch is only 3 to 4 nm in thickness, corresponding to 1 to 2 unit cells. The STEM image of FIG. 10 show the mesoporous structure in the particle more clearly due to the better image contrast.

Example 6—Analysis of Mesoporous ZSM-5 Zeolites with Si/Al Molar Ratio of 31

Figure 19B:
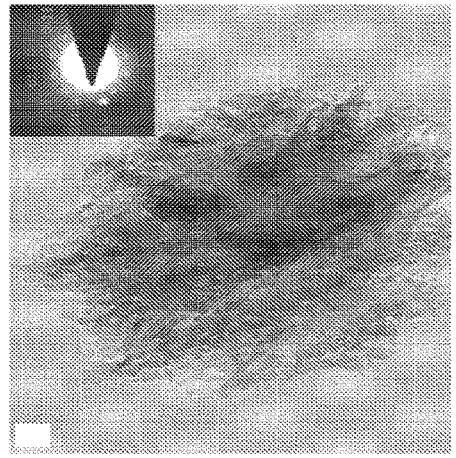
FIG. 19B depicts electron diffraction (ED) patterns for the zeolites of Example 6.
Figure 19C:
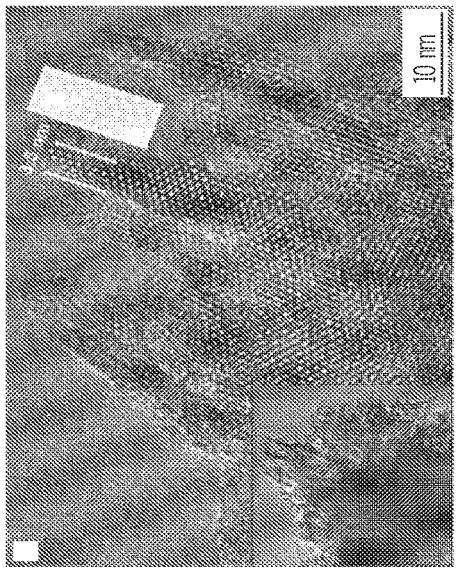
FIG. 19C depicts a high resolution TEM image for the zeolites of Example 6.
Figure 19A:
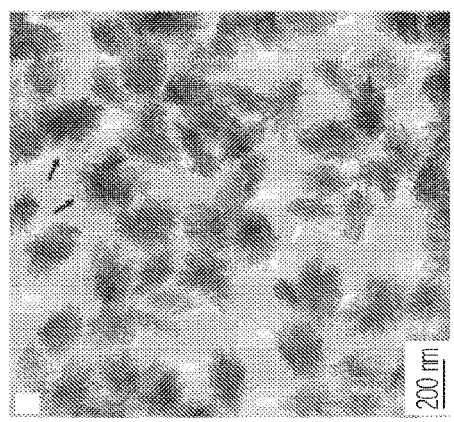
FIG. 19A depicts TEM images for the zeolites of Example 6.
Figure 19D:
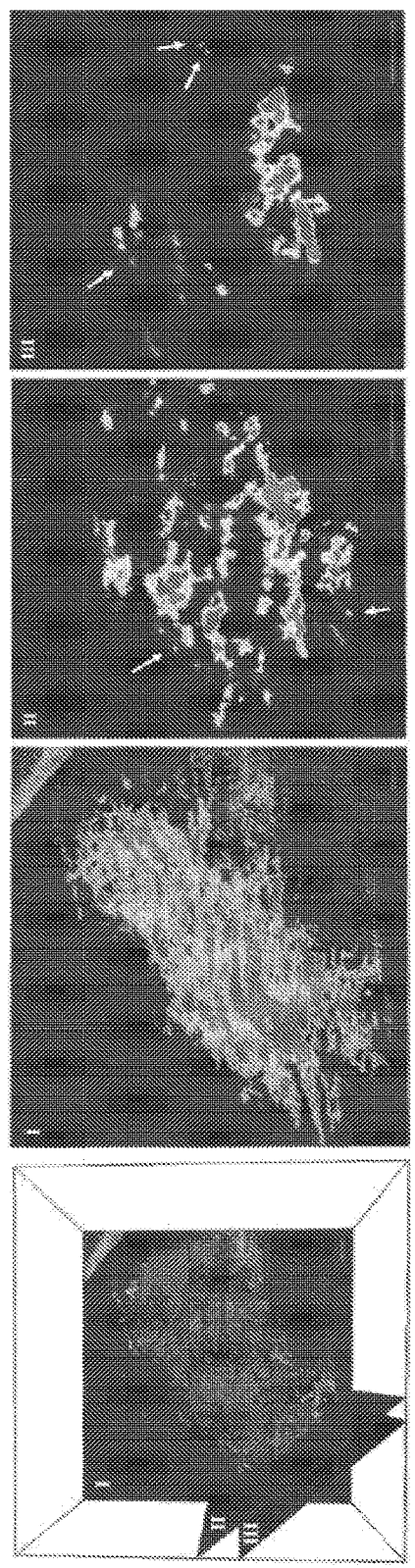
FIG. 19D depicts reconstructed electron tomographic volume data for the zeolites of Example 6, according to one or more embodiments described in this disclosure.

A mesoporous ZSM-5 zeolite with a Si/Al molar ratio of 31 was prepared in a process similar to Example 3 (with a different ratio of Si to Al precursor materials), which had a measured surface area of 655.6 $m^2/g$, a measured total pore volume of 0.66 $cm^3/g$, and a measured micropore volume of 0.081 $cm^3/g$. FIG. 19A-19D depicts images of the 31 molar ratio Si/Al mesoporous ZSM-5 zeolite. Specifically, FIG. 19A depicts a low-magnification TEM image. FIG. 19B depicts the ED pattern and TEM image of a single mesoporous ZSM-5 particle. The ED pattern can be indexed as two sets of [010]-projected reflections with an in-plane orientation difference of about 35 degrees. FIG. 19C depicts a high-resolution TEM image taken along the [010] direction at the periphery of a mesoporous ZSM-5 particle, showing the fibrous structure with ordered arrangement of 10-ring channels. The thinnest region (about 3.5 nm) in the fiber is indicated, along with a structural model for comparison. The inset at the left bottom corner is the corresponding low-magnification TEM image, in which the region for HRTEM imaging is labeled. FIG. 19D depicts a reconstructed electron tomographic volume of a mesoporous ZSM-5 particle, and three slices intersected at different regions of the volume. The slices are rendered in a rainbow color scheme, where empty areas are deep blue. In slices II and III, the discrete dots, some of which are indicated by arrows, represent cross-sections of protruding fibers. Scale bars represent 50 nm.

Figure 24B:
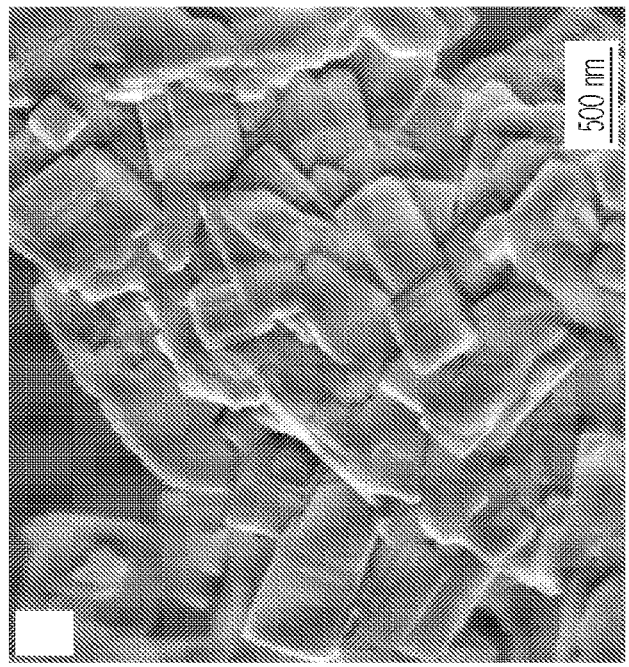
FIGS. 24A and 24B depict TEM images of conventional zeolites, according to one or more embodiments described in this disclosure.
Figure 24A:
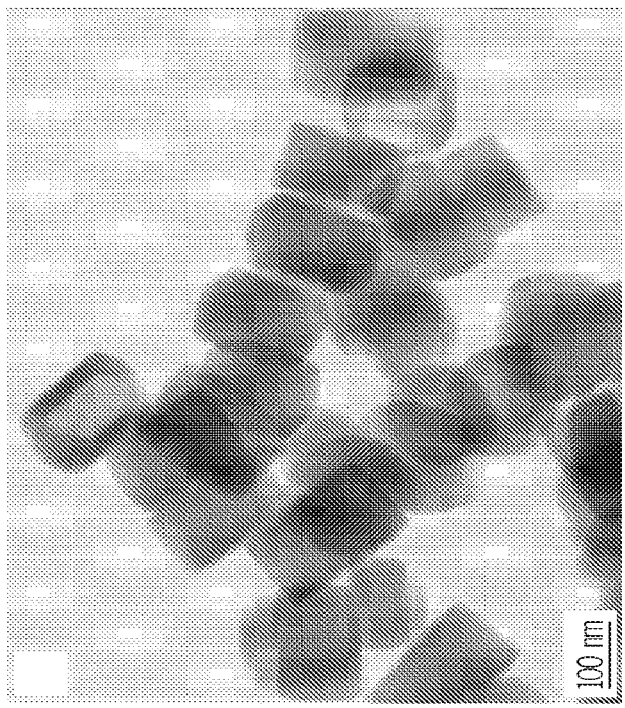

The mesoporous ZSM-5 zeolite having an Si/Al molar ratio of 31 was compared with conventional ZSM-5 zeolites. Two conventional ZSM-5 zeolites were prepared. A "nano ZSM-5 conventional zeolite" was prepared having an average particle size of about 200 nm (using a tetrapropylammonium hydroxide (TPAOH) polymer as the SDA), which had an Si/Al molar ratio of 26, a measured surface area of 399.1 $m^2/g$, a measured total pore volume of 0.24 $cm^3/g$, and a measured micropore volume of 0.099 $cm^3/g$. Also, a "micro ZSM-5 conventional zeolite" was prepared having an average particle size of 3-10 microns ($\mu m$) (commercially available from the Catalyst Plant of Nakai University), which had a an Si/Al molar ratio of 25, a measured surface area of 298.6 $m^2/g$, a measured total pore volume of 0.15 $cm^3/g$, and a measured micropore volume of 0.092 $cm^3/g$. FIGS. 20A-20D show various distinctions between the conventional ZSM-5 zeolites and the mesoporous ZSM-5 zeolites. FIG. 24A depicts a TEM image of nano ZSM-5 conventional zeolite and FIG. 24B depicts a TEM image of micro ZSM-5 conventional zeolite.

Figure 20A:
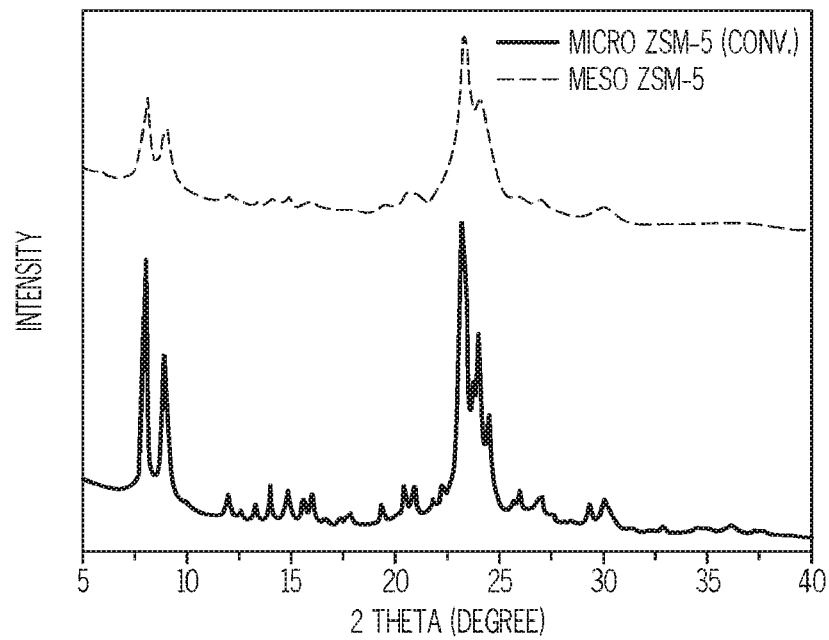
FIG. 20A depicts XRD data for the zeolites of Example 6.
Figure 20B:
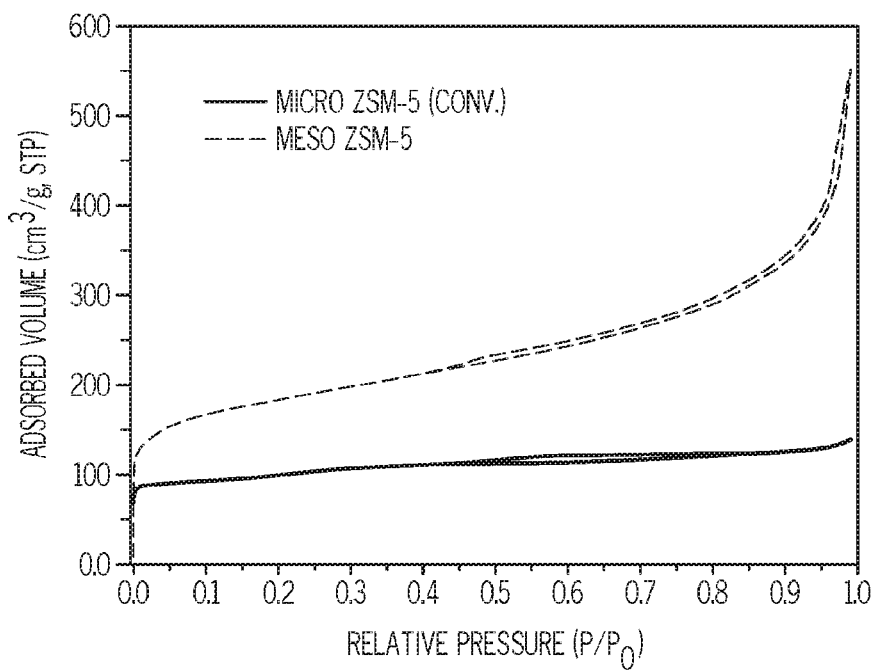
FIG. 20B depicts adsorption/desorption isotherm data for the zeolites of Example 6.
Figure 20C:
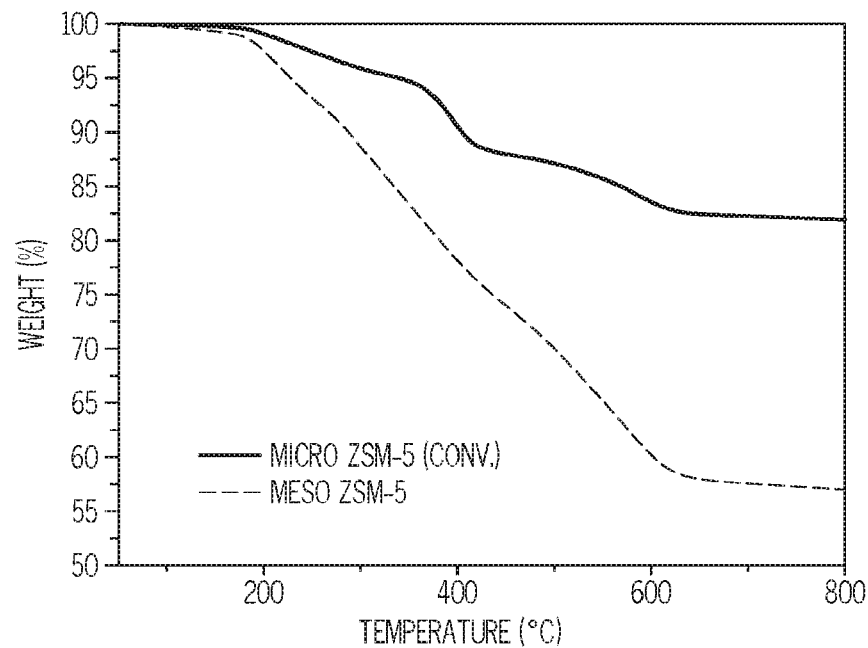
FIG. 20C depicts thermogravimetric analysis data for the zeolites of Example 6.
Figure 20D:
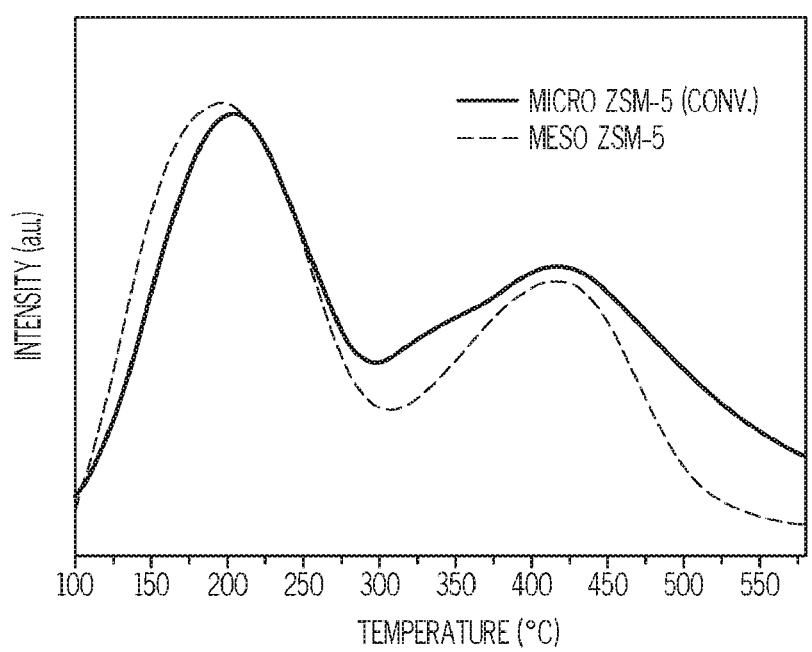
FIG. 20D depicts $NH_3$-Temperature-Programmed Desorption (TPD) profiles for the zeolites of Example 6, according to one or more embodiments described in this disclosure.

FIG. 20A depicts powder X-ray diffraction patterns for mesoporous ZSM-5 zeolite and micro ZSM-5 conventional zeolite. FIG. 20B depicts $N_2$ adsorption-desorption isotherms for mesoporous ZSM-5 zeolite and micro ZSM-5 conventional zeolite. FIG. 20C depicts thermogravimetric analysis profiles for mesoporous ZSM-5 zeolite and nano ZSM-5 conventional zeolite. FIG. 20D depicts $NH_3$-TPD profiles for mesoporous ZSM-5 zeolite and micro ZSM-5 conventional zeolite.

Transmission electron microscopy (TEM) shows that the mesoporous ZSM-5 zeolite consists of relatively uniform particles in sizes of 200-250 nm, and that most particles have elongated shapes. The broadened X-ray diffraction (XRD) peaks of mesoporous ZSM-5 zeolite relative to conventional ZSM-5 zeolites suggest that the former has smaller crystallite sizes, in accordance with its porous structure at mesoscale as revealed by TEM. There are no concomitant impurity phases or amorphous components observed in mesoporous ZSM-5 zeolite by TEM and XRD. The presence of high mesoporosity in mesoporous ZSM-5 zeolite is confirmed by the adsorption isotherm, in which the continuous increase of the adsorbed volume with the relative pressure in the range of $P/P_0>0.10$ indicates a highly open and interconnected mesoporous system. Accordingly, mesoporous ZSM-5 zeolite has a significantly larger BET surface area (655 $m^2/g$ versus 298 $m^2/g$) and total pore volume (0.66 $cm^3/g$ versus 0.15 $cm^3/g$) than does conventional ZSM-5. Thermogravimetric analysis of as-synthesized mesoporous ZSM-5 zeolite showed a marked weight loss (>40 wt. %) in the region of 200-650° C., corresponding to the decomposition of PDAMAB-TPHAB. By comparison, conventional ZSM-5 zeolite synthesized using tetrapropylammonium hydroxide as a SDA showed a weight loss of about 15 wt. % in the same range temperature range. This result confirms the incorporation of PDAMAB-TPHAB in mesoporous ZSM-5 zeolite and its role of a "porogen" to generate mesopores.

Figure 28:
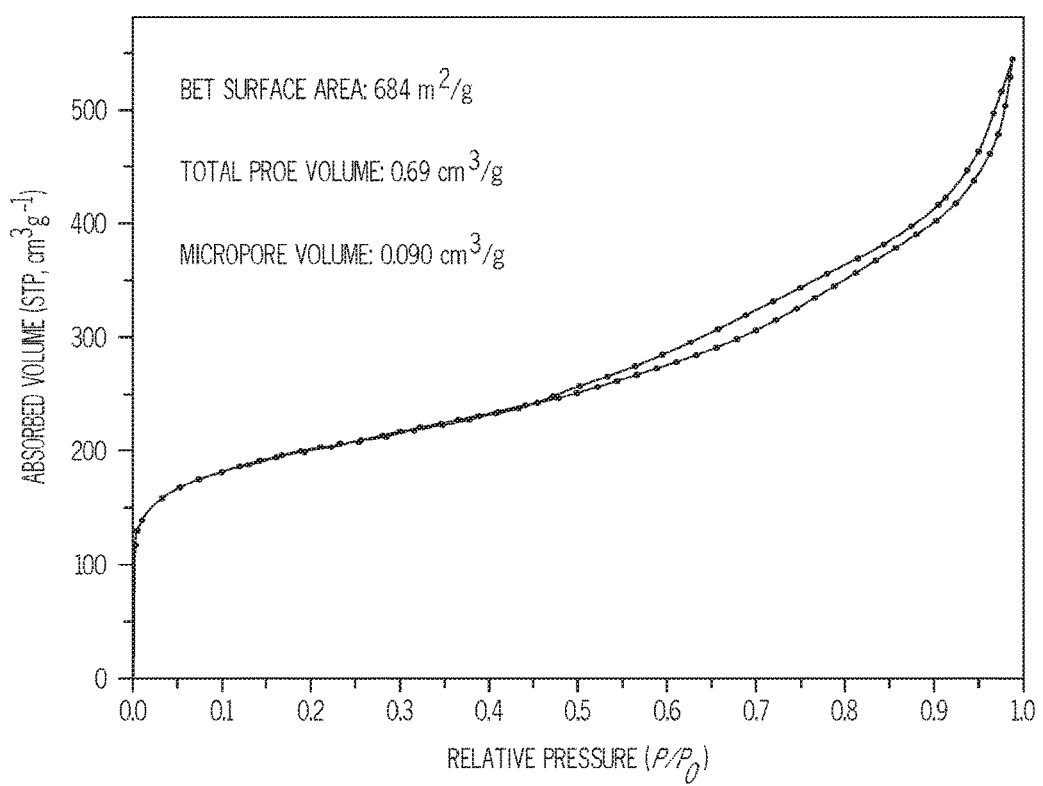
FIG. 28 shows $N_2$ adsorption isotherms for zeolites prepared with SDA polymers having different molecular weights, according to one or more embodiments described in this disclosure.

According to one or more embodiments, the molecule weight of PDAMAB-TPHAB has little influence on the textural properties of mesoporous ZSM-5 zeolite. FIG. 28 shows an $N_2$ adsorption isotherm of a mesoporous ZSM-5 zeolite sample synthesized using PDAMAB-TPHAB with a smaller molecular weight than that used for the synthesis described previously (about 130 K versus about 390 K). Two PDAMAB-TPHAB samples were synthesized with different molecular weights by controlling the temperature and reaction time of the polymerization process. It is difficult to accurately determine their molecular weights by gel permeation chromatography. Therefore, their intrinsic viscosity were measured with the Cannon Unnelohde viscometer at 30° C. by following an established method (A. L. Prajapat, P. R. Gogate/Chemical Engineering and Processing, 2015, 88, 1). Using poly dimethyl diallyl ammonium chloride with molecular weights from 100 kilodaltons (kDa) to 200 kDa and 400 kDa to 500 kDa as references, we roughly determined the average molecular weights of the two PDAMAB-TPHAB samples to be 390 kDa and 130 kDA, respectively. The former was used for all the synthesis of MFI-type hierarchical zeolites described in this disclosure, while the latter was used only here for comparison purpose.

Figure 29:
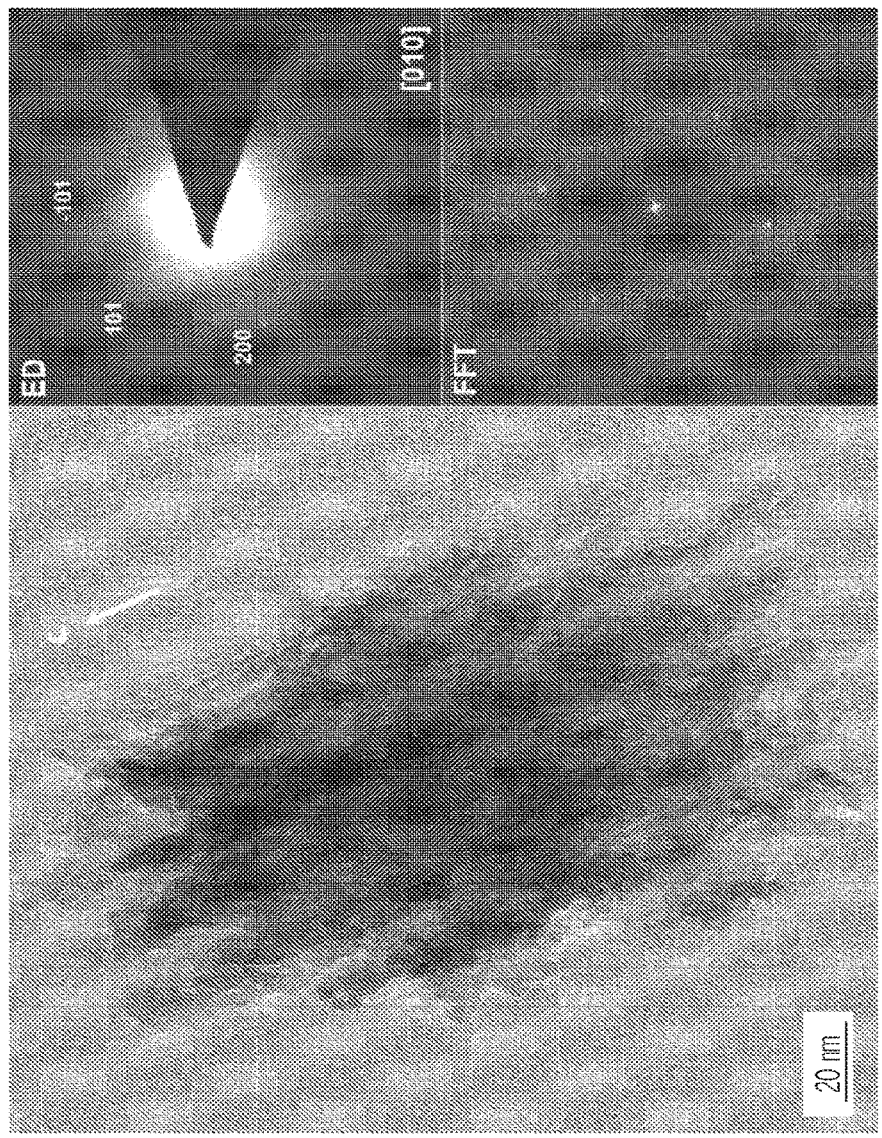
FIG. 29 shows a TEM image of a mesoporous ZSM-5 zeolite particle and the corresponding ED pattern, according to one or more embodiments described in this disclosure.
Figure 30A:
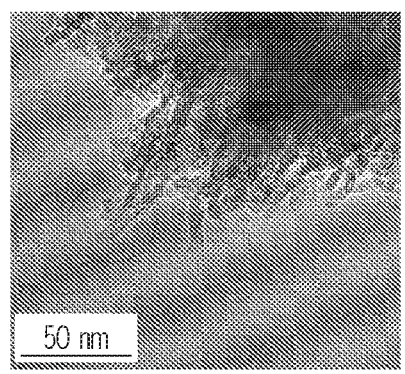
FIGS. 30A-30D shows TEM images of protruding MFI (mordenite framework inverted) fibers taken at different incident angles, according to one or more embodiments described in this disclosure.
Figure 30B:
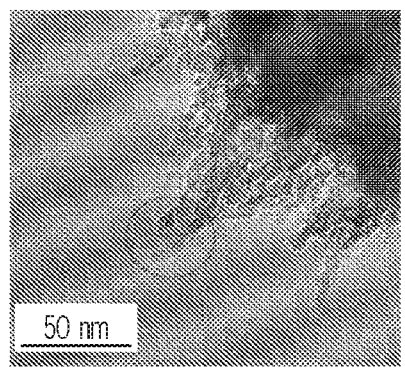
Figure 30C:
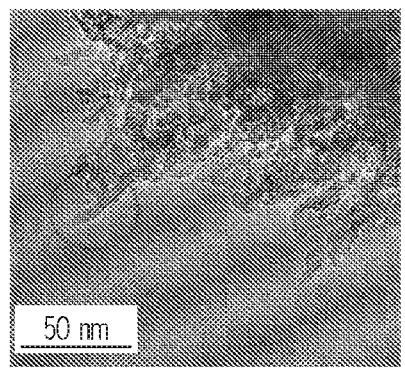
Figure 30D:
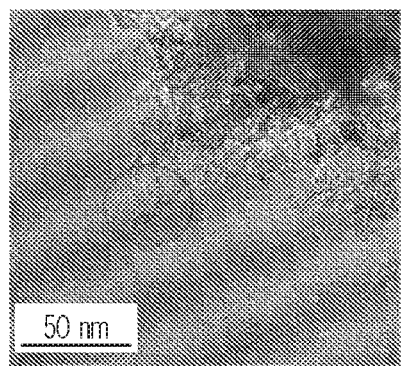

FIG. 19B presents the TEM image and electron diffraction (ED) pattern of a typical mesoporous ZSM-5 zeolite particle. The ED pattern contains two sets of [100]-projected reflections, suggesting that this particle is comprised of two single crystals with their a axes aligned and an orientation difference of about 35 degrees in the be plane. Notably, some mesoporous ZSM-5 zeolite particles are thinner and more a TEM image of a mesoporous ZSM-5 zeolite particle and the corresponding ED pattern elongated than the rest, as labeled with white arrows in FIG. 19A. TEM and ED results shown in FIG. 29 show that such a particle is essentially a single crystal and that the elongation is along the c-axis. Specifically, FIG. 29 shows and FFT of the mesoporous ZSM-5 zeolite particle, regarding FIG. 29, it should be noted that the and the [100] projections cannot be distinguished at the current resolution, and that [010] was arbitrarily chosen for indexing. Also, mesoporous ZSM-5 zeolite may have ultrathin "fibers" at particle periphery protruding along the elongation directions. High-resolution TEM clearly shows ordered 10-ring microporous channels in the fibers, and confirms that the fibers are grown along the c-axis, as shown in FIG. 19C. The thinnest region of the fibers is about 3.5 nm, containing only three 10-ring channel layers, as shown in FIG. 19C. When tilting the TEM specimen within a large angle range, it was found that the fibers retained their one-dimensional (1-D) morphology. For example, FIGS. 30A-30D shows TEM images of protruding MFI fibers taken at different incident angles (i.e: −40° in FIG. 30A, −20° in FIG. 30B, 0° in FIG. 30C, and 20° in FIG. 30D), by tilting the TEM specimen. The fibers retain their 1-D morphologies during the titling, ruling out the possibility that these "fibers" are lateral projections of 2-D nanosheets. Also, TEM tomography was performed to characterize mesoporous ZSM-5 zeolite. FIG. 19D presents a reconstructed electron tomographic volume of a mesoporous ZSM-5 zeolite particle and three slices (about 2 nm thick) intersected at different regions of the volume. In the central area of the particle, as shown in slice I, disordered mesopores are encompassed by a continuous zeolite framework. Meanwhile, zeolite exhibits highly branched fibrous structures to form larger and more open mesopores at the periphery of the particle, as demonstrated in slices II and III, where the discrete dots represent the cross-sections of the protruding fibers, shown in FIG. 19D.

Figure 31:
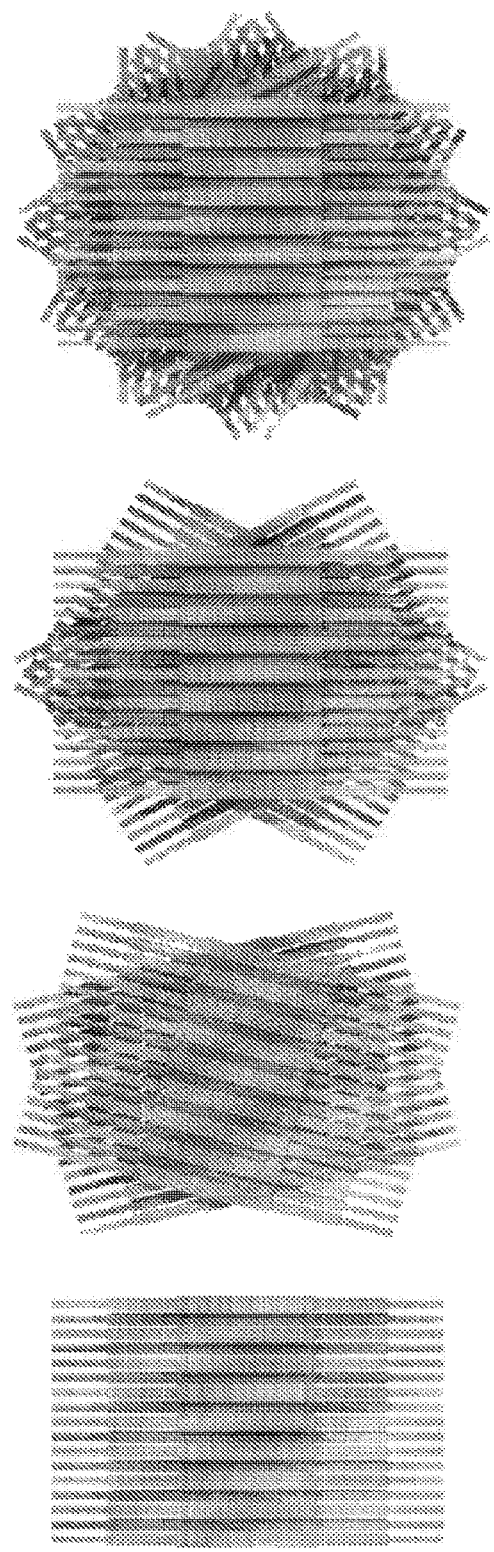
FIG. 31 shows simplified schematic illustration of mesoporous ZSM-5 zeolite with one or more staggered crystal structures, according to one or more embodiments described in this disclosure.

According to electron microscopy and tomography, the structural features of mesoporous ZSM-5 zeolite may be characterized as follows: despite being highly mesoporous, most mesoporous ZSM-5 zeolite particles are single crystals or composed of two intergrown single crystals. Each single crystal is slightly elongated along the c-axis with branched ultrathin fibers at the two ends. A small number of particles look thicker and more round compared to the majority (for example, particles labeled by black arrows in FIG. 19A, because they contain more (that is, at least 2) staggered single crystals. FIG. 31 shows a simplified schematic illustration of mesoporous ZSM-5 zeolite with one or more staggered crystal structures. Specifically, FIG. 31 shows simplified schematic illustrations of mesoporous ZSM-5 zeolites, where the far left represents a single-crystalline mesoporous elongated (along the c-axis) ZSM-5 particle, which can exist alone or in combination with one (or a few) more particles in staggered configurations through intergrowth, as illustrated in the right three schemes of FIG. 31. The single-crystalline nature distinguishes mesoporous ZSM-5 zeolite from surfactant-templated zeolites, which are constructed by 2-D zeolite nanosheets or random agglomeration of small (several nm) zeolite grains.

Example 7—Synthesis and Analysis of Mesoporous Silicalite-I

Figure 12:
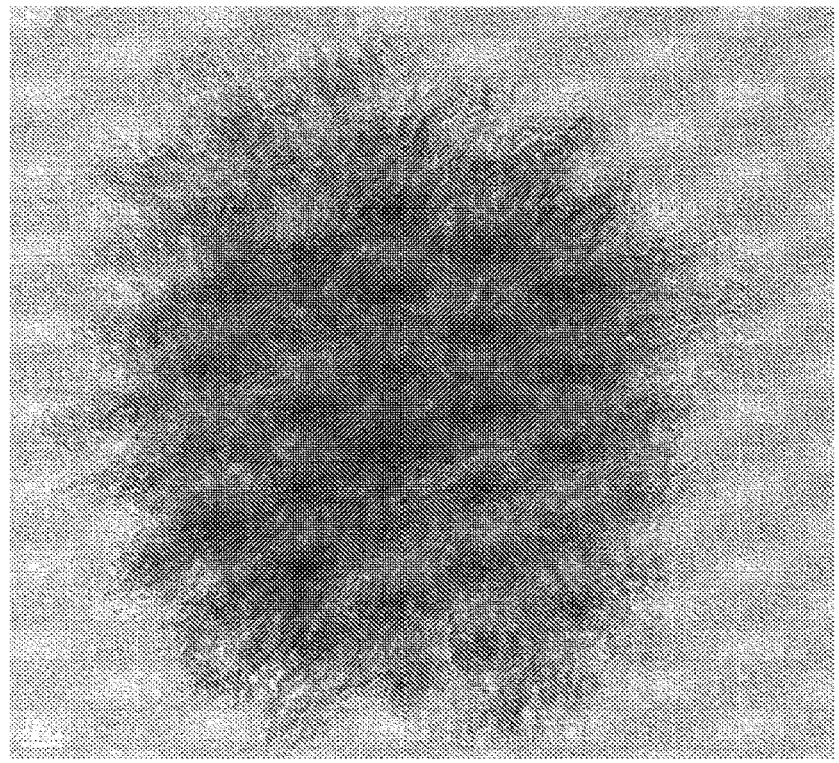
FIG. 12 depicts an HRTEM image of the silicalite material of Example 5, according to one or more embodiments described in this disclosure.

The procedure of Example 3 was used to produce silicalite mesoporous structures by not including aluminum in the mixture. FIG. 12 depicts an HRTEM image of the silicalite produced. The mesoporous Silicalite-I zeolite had a measured surface area of 671.4 m$^2$/g, a measured total pore volume of 0.77 cm$^3$/g, and a measured micropore volume of 0.080 cm$^3$/g.

Example 8—Analysis of Mesoporous TS-1

Figure 13:
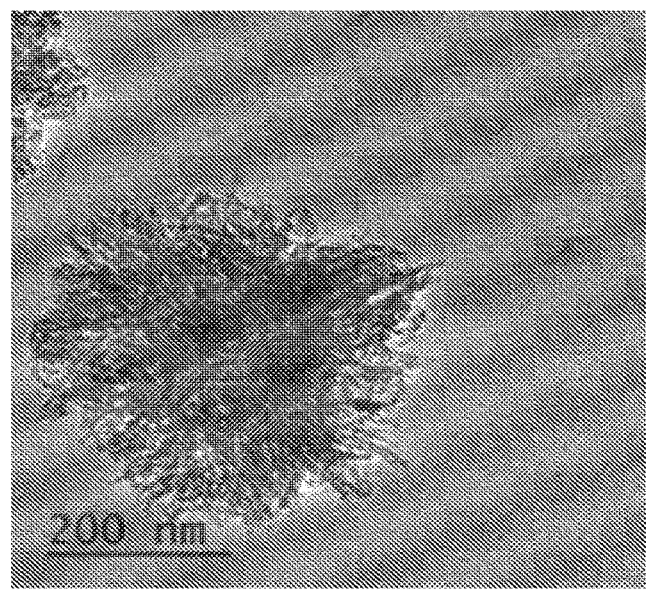
FIG. 13 depicts a TEM image of the titanosilicate material of Example 4, according to one or more embodiments described in this disclosure.
Figure 14:
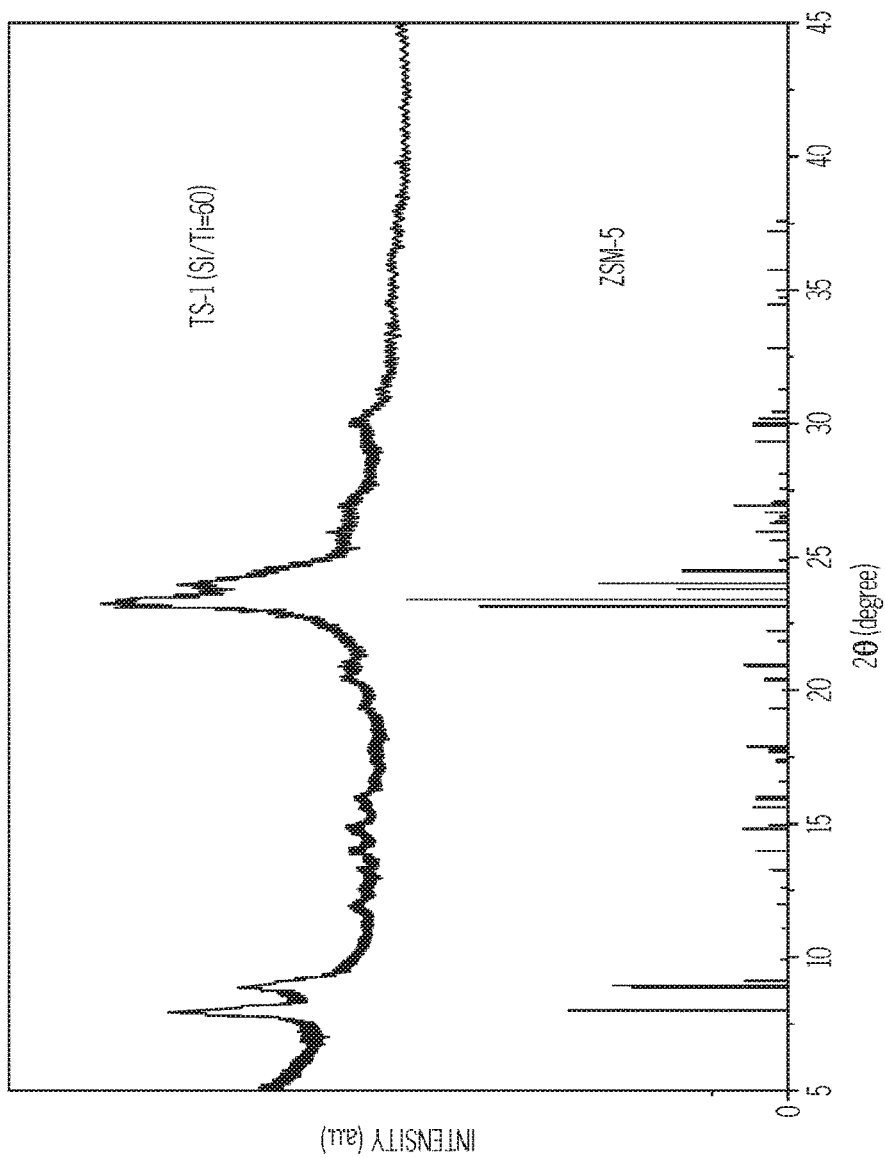
FIG. 14 depicts an XRD pattern of the titanosilicate material of Example 4, according to one or more embodiments described in this disclosure.

The mesoporous titanosilicate material of Example 4 was analyzed. FIG. 13 depicts a TEM image of the titanosilicate material of Example 4, and FIG. 14 depicts an XRD pattern of the titanosilicate material of Example 4. The mesoporous TS-1 zeolite had had a measured surface area of 527 m$^2$/g, a measured total pore volume of 0.61 cm$^3$/g, and a measured micropore volume of 0.065 cm$^3$/g.

Example 9—Synthesis of Zeolite Core/Mesoporous Zeolite Shell Structures (Core/Shell Zeolites)

A core/shell zeolite structure was formed. First, 0.1-0.5 g of pre-synthesized zeolite crystals (for example, ZSM-5, Y, or Beta) were dispersed in 6.3 g of water to make a suspension. Then, PDAMAB-TPHAB (0.2485 g), sodium aluminate (0.0164 g) and 10% NaOH aqueous solution (1 g) were added to the suspension. After stirring for 6 h, 2.229 mL TEOS was added and stirred for another 4 h. The resulting gel was heated to 100° C. for 1 h. Crystallization was conducted in Teflon-lined stainless steel autoclaves (25 mL) at 150° C. for 48 h. The products were centrifuged, washed with distilled water and methanol, and dried at 100° C. overnight. The polymer template was removed from the as-synthesized material by calcination at 550° C. for 5 h.

Depending on the type of the zeolite seeds, different core-shell structures could be synthesized using this method. Depending on the amount of zeolite seeds used, the thickness of mesoporous zeolite shell could be tuned from about 20 nm to about 200 nm. Samples were prepared utilizing conventional ZSM-5 core materials and conventional Y zeolite core materials, each with mesoporous ZSM-5 shells. HRTEM demonstrated the complete crystallinity and mesoporosity of the shell, as well as highly coherent interfaces between the core and the shell, revealing a epitaxial relationship. Strain mappings by geometric phase analysis confirmed the coherent interfaces with small strains, and revealed the existence of considerable strain fluctuations at the shell region as a consequence of adapting mesopores. ED and fast Furrier transform (FFT) of the HRTEM images indicated that the crystal remained single-crystalline after the growth of mesoporous ZSM-5 shell (the seed crystals were single-crystalline). These results confirm again that non-surfactant polymers enable the formation of mesoporous yet single-crystalline zeolite structures.

Additionally, combinations of core and shell materials such as conventional TS-1 core/meso ZSM-5 shell, conventional ZSM-5 core/mesoporous TS-1 shell, conventional TS-1 core/mesoporous TS-1 shell, conventional Silicalite-1 core/mesoporous ZSM-5 shell, and conventional ZSM-5 core/mesoporous Silicalite-1 shell, can be synthesized by varying the seeds, the synthetic precursors or both. If the core and shell have the same microporous framework, the core/shell can be constructed from a single crystal, where the shell portion is epitaxially grown from the seed portion (that is, the core).

Figure 26A:
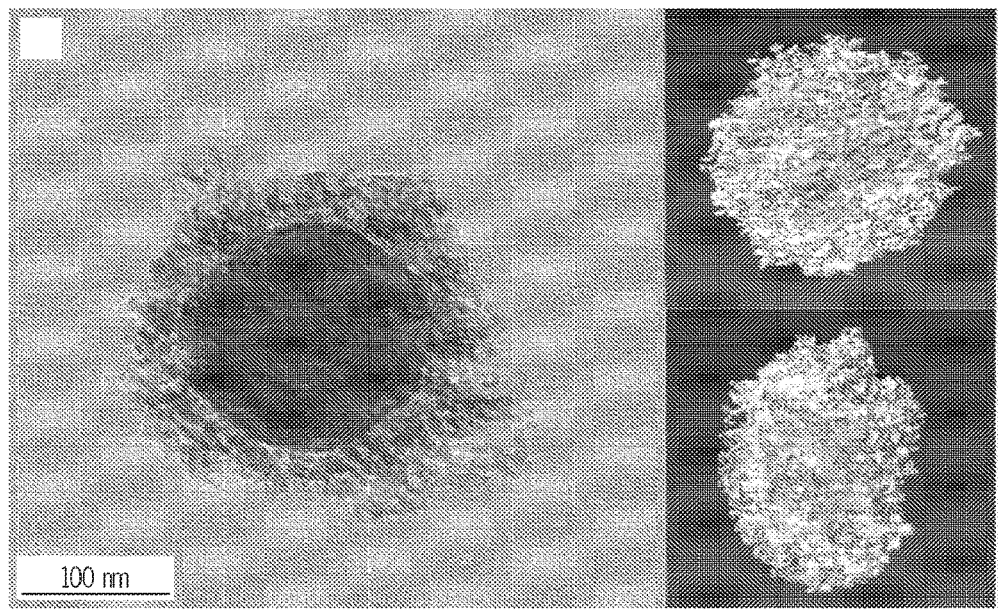
FIGS. 26A-26E depict images of a core/shell zeolite having a nano ZSM-5 conventional zeolite core and a mesoporous ZSM-5 zeolite shell, according to one or more embodiments described in this disclosure.
Figure 26B:
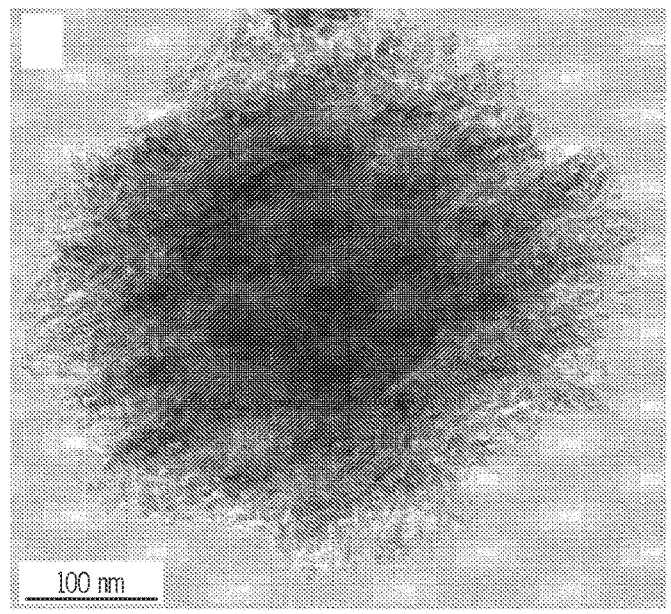
Figure 26C:
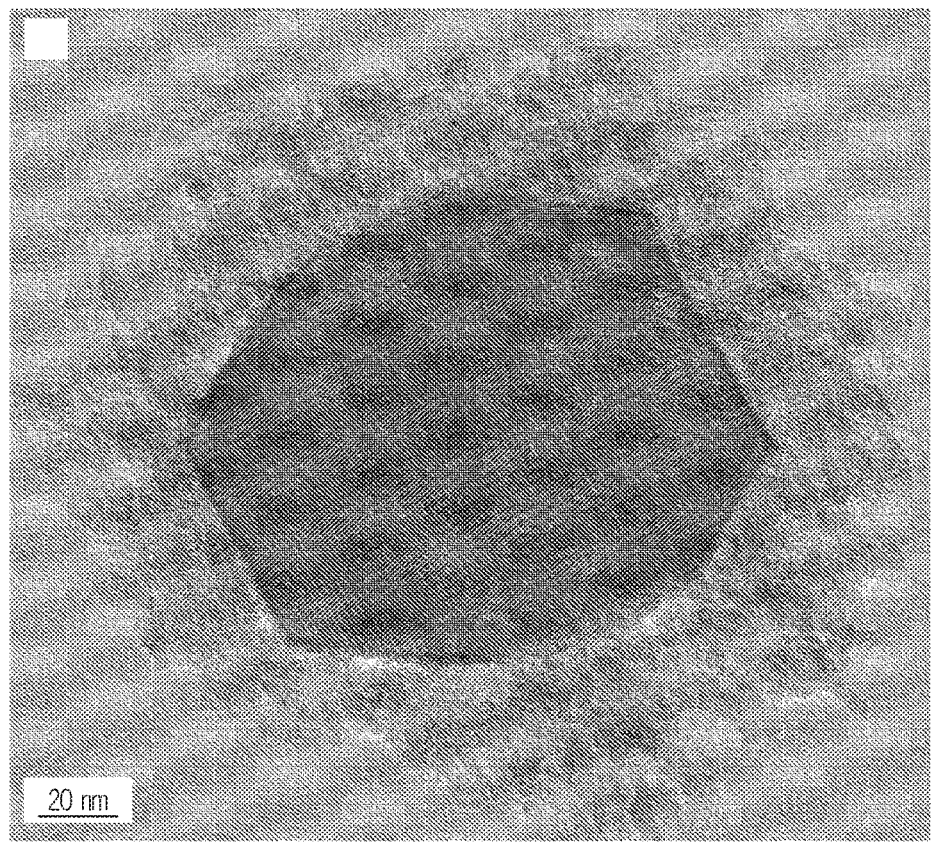
Figure 26D:
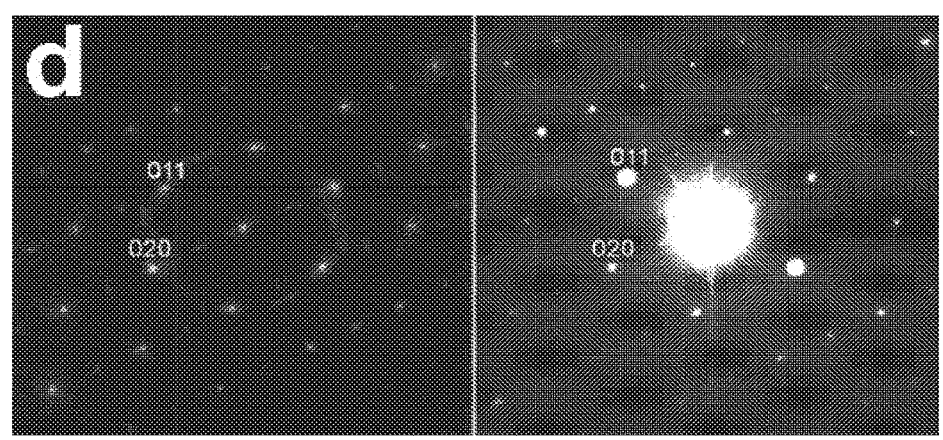
Figure 26E:
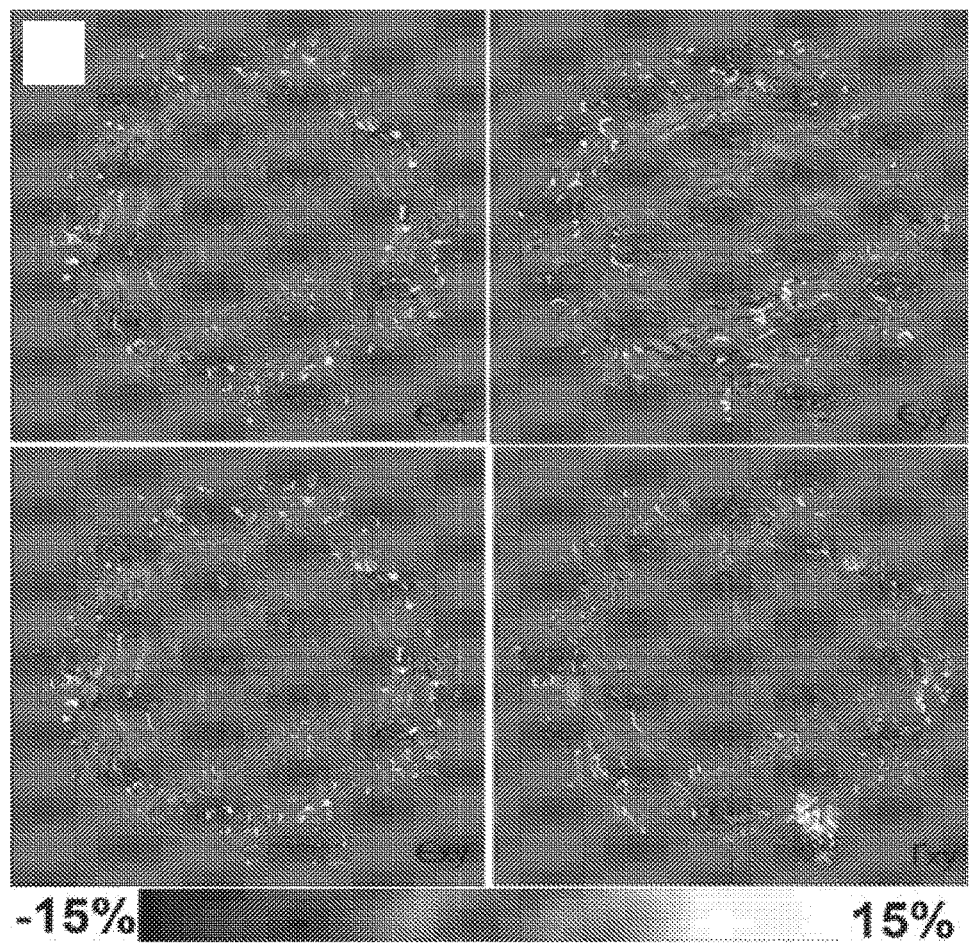

FIGS. 26A-26E shows images of core/shell structures prepared from nano ZSM-5 conventional zeolite core materials/seeds and mesoporous ZSM-5 zeolite shells. FIG. 29A shows a TEM image of a core/shell structure with a relatively thin shell and FIG. 26B shows a TEM image of a core/shell structure with a relatively thick shell. FIG. 26C shows the reconstructed core/shell particle by TEM tomography viewed in two orthogonal directions, where the mesoporous shells are labeled in a semitransparent manner to display the core crystal. FIG. 26C shows a HR-TEM image and FIG. 26D shows the corresponding FFT (left) and ED pattern (right) of the core/shell particle, showing a porous yet crystalline shell and its perfect epitaxial relationship with the core crystal. FIG. 26E shows the distribution of different strain components ($\varepsilon_{xx}$, $\varepsilon_{yy}$, $\varepsilon_{xy}$, and $r_{xy}$; cutoff at ±15%) determined by geometric phase analysis, showing a highly coherent (less strained) core-shell interface and the presence of strains in the outmost shell.

Figure 32A:
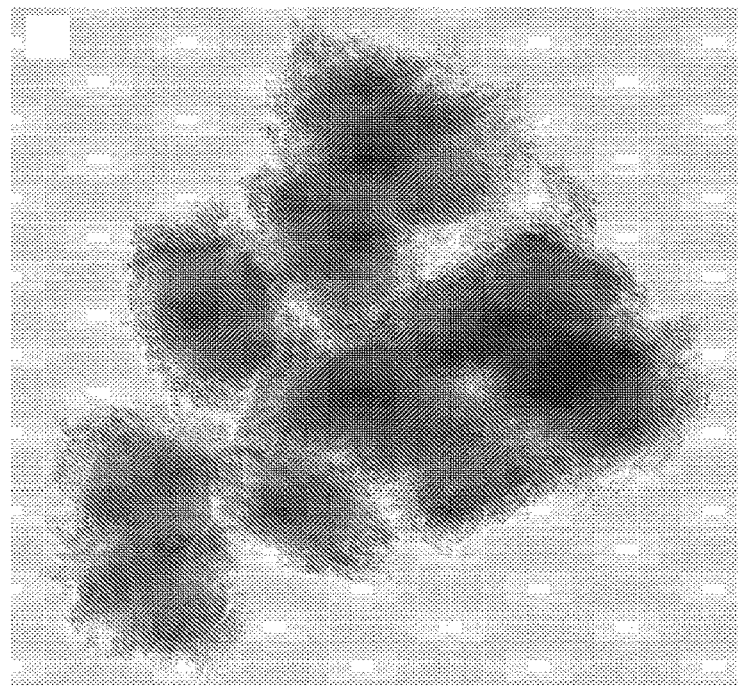
FIGS. 32A-32D show SEM images, XRD data, and $N_2$ adsorption isotherms for core/shell structures prepared from nano ZSM-5 conventional zeolite core materials/seeds and mesoporous ZSM-5 zeolite shells having varying shell thickness, according to one or more embodiments described in this disclosure.
Figure 32B:
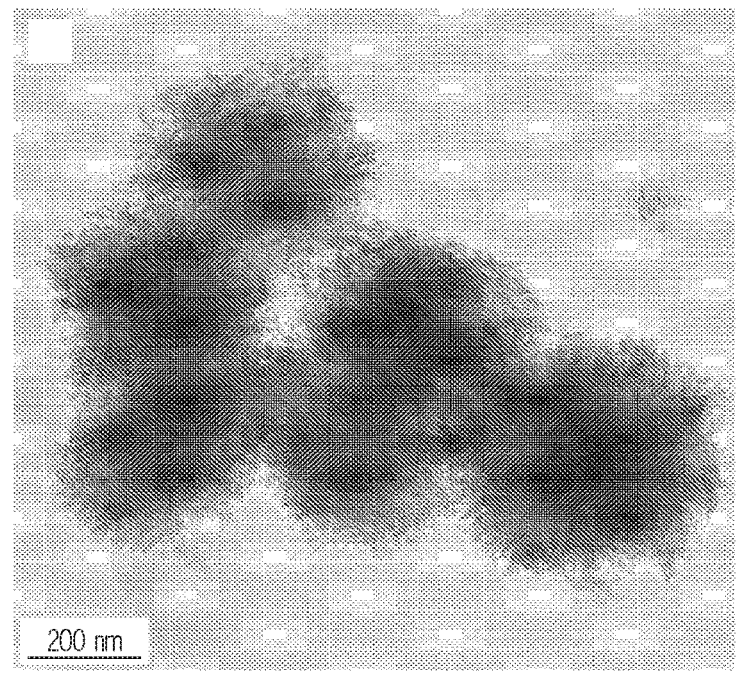
Figure 32C:
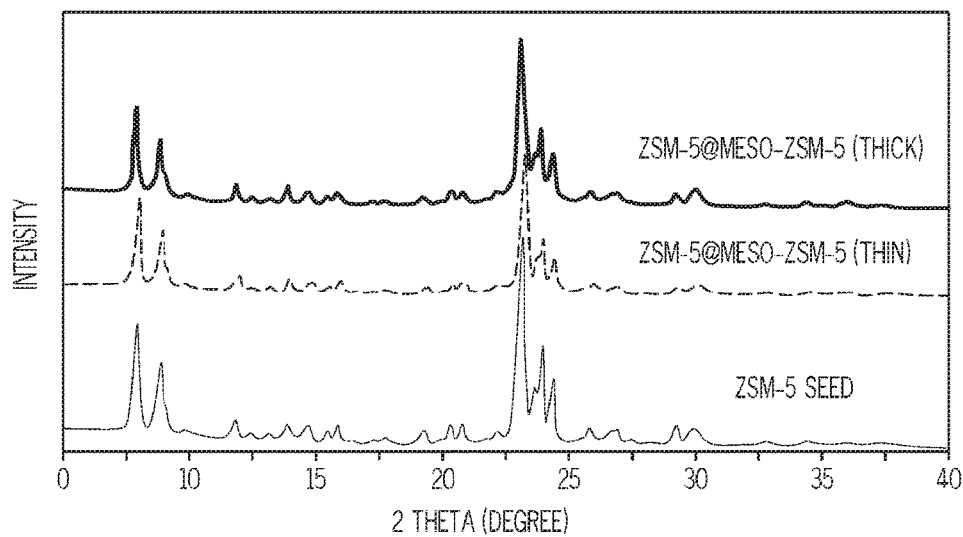
Figure 32D:
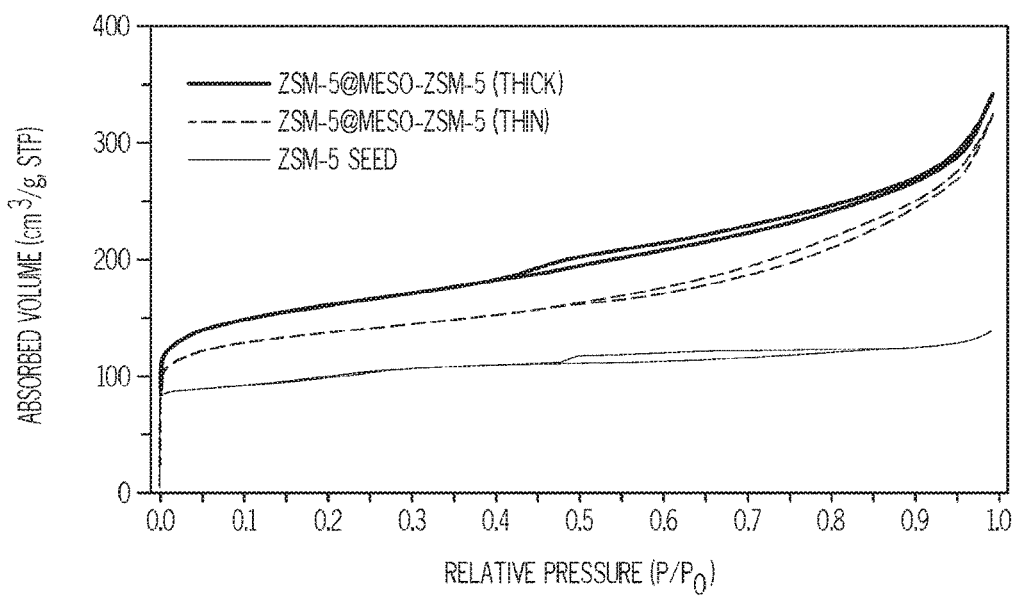

FIGS. 32A-32D shows SEM images, XRD data, and N$_2$ adsorption isotherms for core/shell structures prepared from nano ZSM-5 conventional zeolite core materials and mesoporous ZSM-5 zeolite shells having varying shell thickness. Specifically, FIG. 32A shows a low-magnification TEM image of ZSM-5/mesoporous ZSM-5 core/shell particles with thinner shells, FIG. 32B shows a low-magnification TEM image of ZSM-5/mesoporous ZSM-5 core/shell particles with thicker shells, FIG. 32C shows XRD patterns and FIG. 32D shows N$_2$ adsorption isotherms, respectively, of ZSM-5/mesoporous ZSM-5 core/shell zeolites with different shell thicknesses and the bulk ZSM-5 seeds (nano ZSM-5 conventional zeolite). The results show the coherency between the core and the shell in structure, and the increase of mesoporosity with increasing the thickness of the shell.

Example 10—Analysis of Core/Shell Zeolites

Figure 15A:
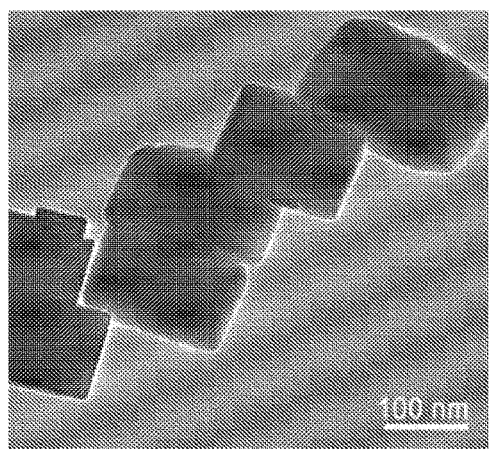
FIGS. 15A-15D depict TEM images of ZSM-5 core/ZSM-5 shell porous structures where
Figure 15B:
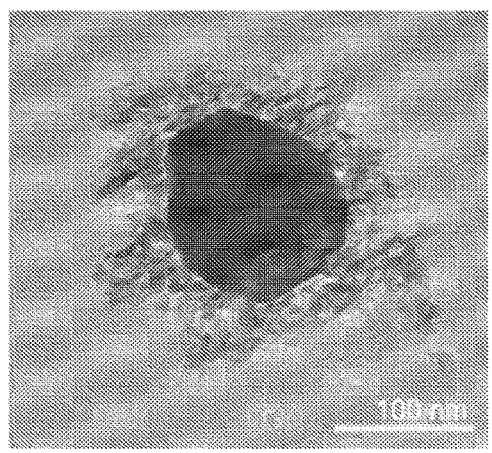
Figure 15C:
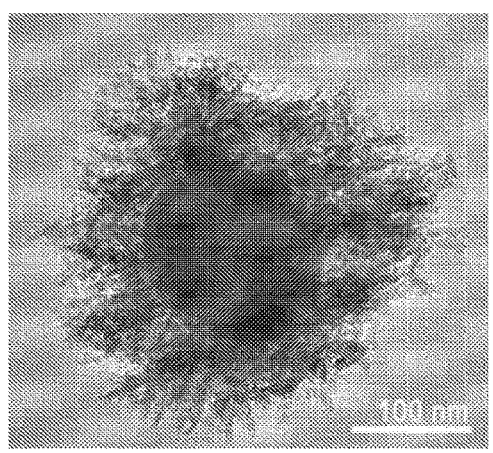
Figure 15D:
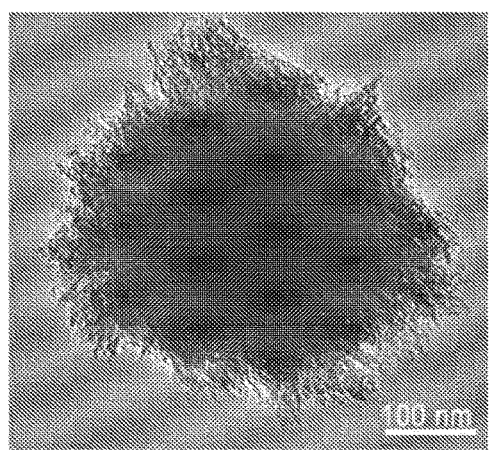

The core/shell zeolites of Example 9 were analyzed by TEM imaging. FIGS. 15A-15D depict TEM images of ZSM-5 core/mesoporous ZSM-5 shell porous structures where FIG. 15A depicts the core (that is, the seed) materials, FIG. 15B depicts a core/shell structure with a shell thickness of about 40 nm, FIG. 15C depicts a core/shell structure with a shell thickness of about 100 nm, and FIG. 15D depicts a core/shell structure with a shell thickness of about 150 nm.

Figure 16A:
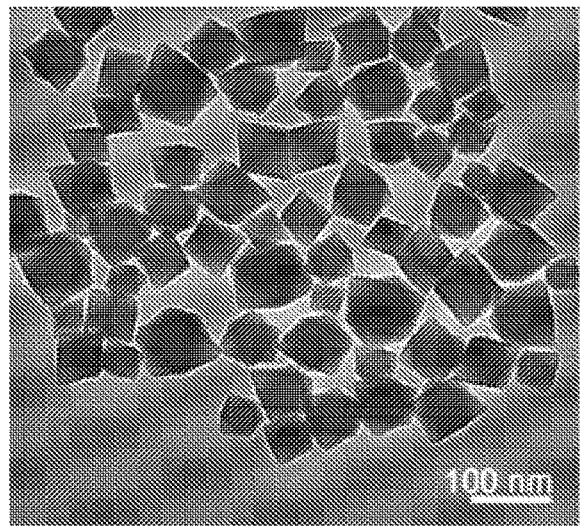
FIGS. 16A and 16B depict TEM images of zeolite Y core/mesoporous ZSM-5 shell porous structures where the image of FIG. 16A is of seed zeolite Y seed materials and the image is
Figure 16B:
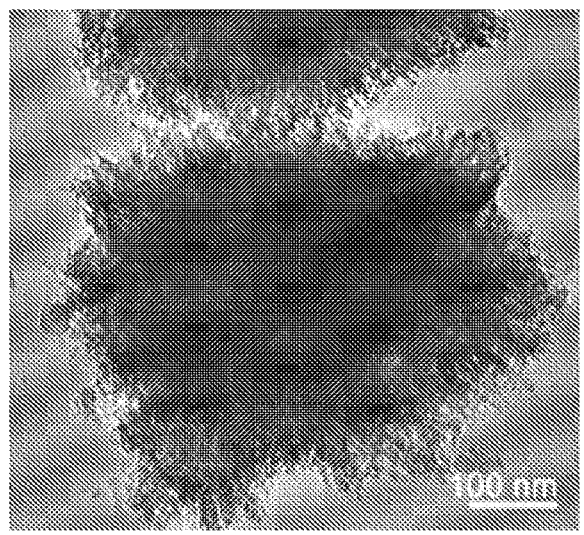

FIGS. 16A and 16B depict TEM images of Y zeolite core/mesoporous ZSM-5 shell porous structures, where the image of FIG. 16A is of zeolite Y seed materials and the image of FIG. 16B is of the core/shell zeolite.

Figure 33B:
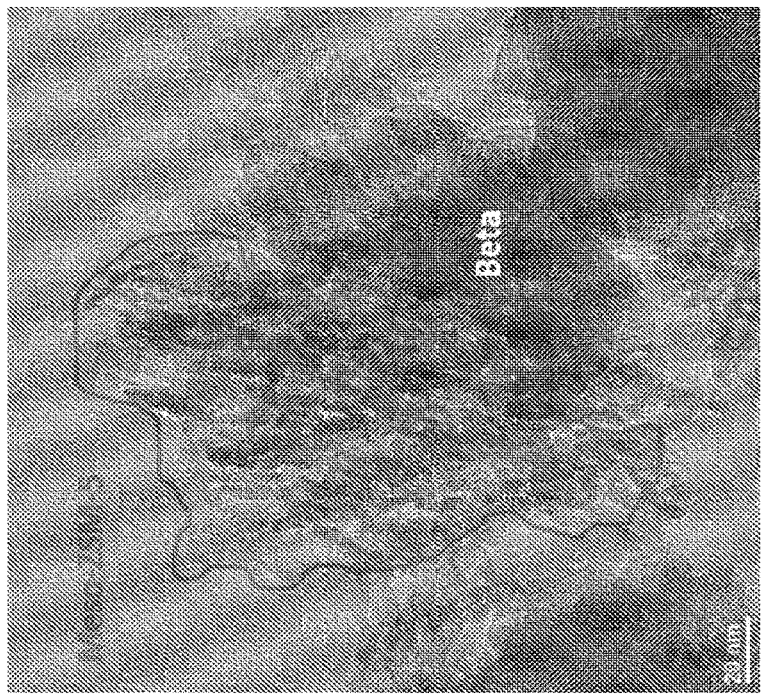
FIGS. 33A and 33B depict TEM images of mesoporous ZSM-5 zeolites grown on bulk conventional zeolite Beta crystals, according to one or more embodiments described in this disclosure.
Figure 33A:
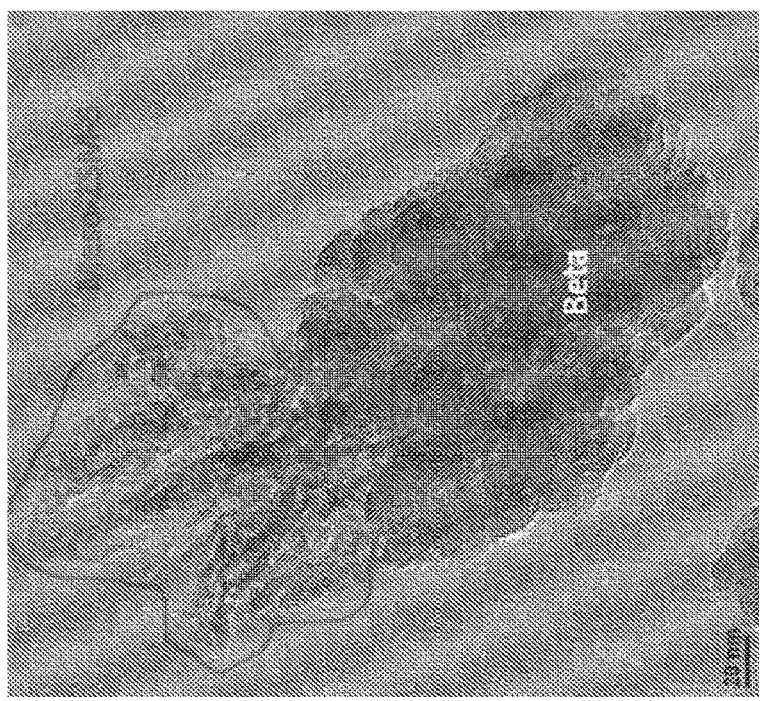

FIGS. 33A and 33B show TEM images of "dimers" comprised of mesoporous ZSM-5 zeolite grown on bulk conventional zeolite Beta crystals. These materials were obtained when it was attempted to grow a mesoporous ZSM-5 layer on the surface of conventional zeolite Beta crystals. These results suggest the lattice matching between the seed and the growing material may be crucial in some embodiments for forming a core/shell structure.

Example 11—Fabrication and Analysis of Mesoporous Beta Zeolites

To produce a mesoporous Beta zeolite, 0.058 g of $NaAlO_2$, 0.4 g of NaOH, and 0.41 g of PDAMAB-TMHAB were added to 14.4 mL of de-ionized water. After stirring for 1 hour, 0.935 g of fumed silica was added to the solution. The resulting gel (composition in molar: 1 PDAMAB-TMHAB:15.6 $SiO_2$:5 $Na_2O$:0.35 $Al_2O_3$:800 $H_2O$) was transfer into an autoclave after 12 h. The crystallization was carried out at 180° C. for 96 hours. The obtained powder was collected by centrifugation and washed by water and methanol for several times. After 24 hours drying at 80° C. under vacuum, the polymer template was removed by calcining at 550° C. for 6 hours. The Si/Al ratio of the as-synthesized mesoporous Beta zeolite was 20.

Figure 17A:
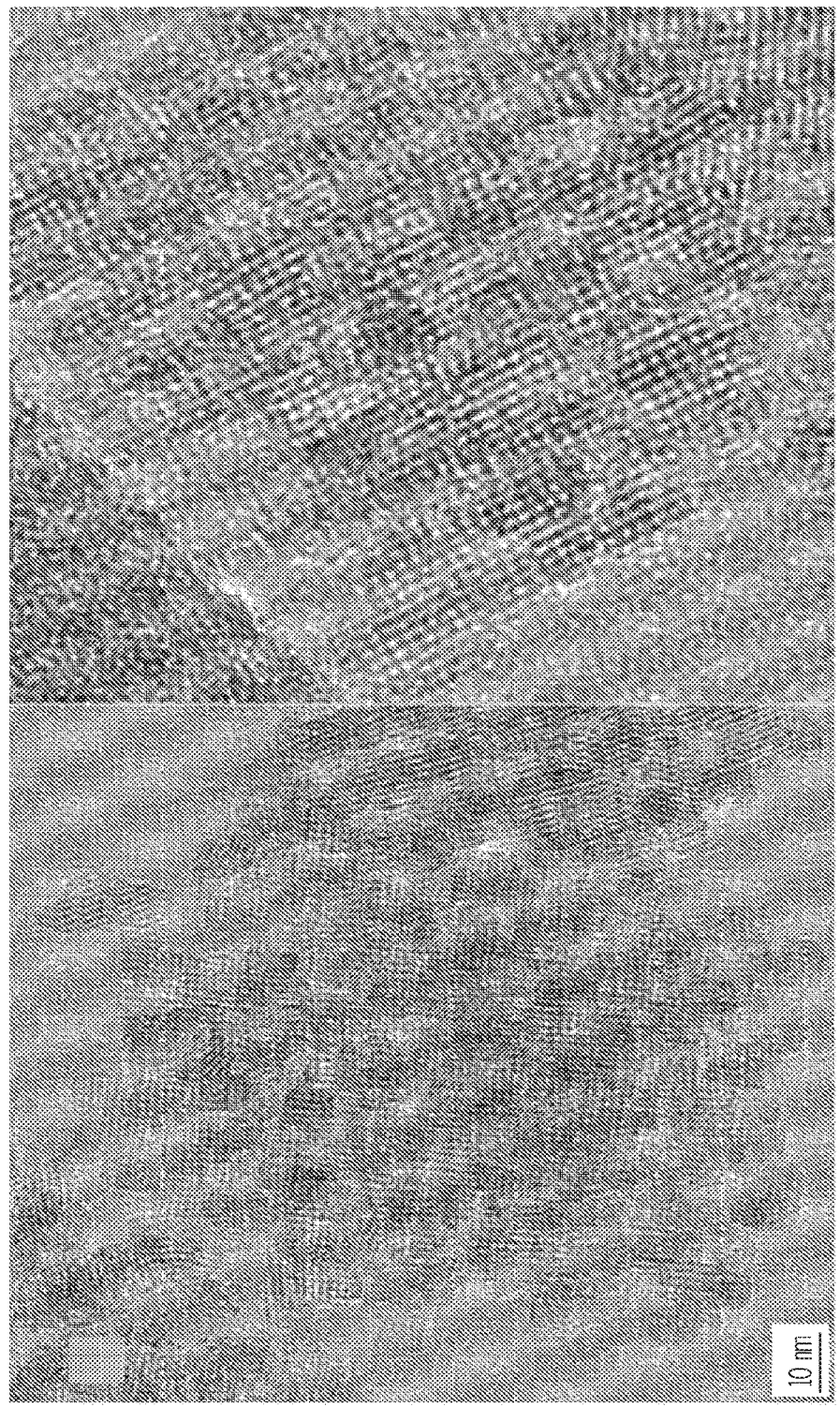
FIG. 17A depicts TEM images for synthesized mesoporous Beta zeolites.
Figure 17B:
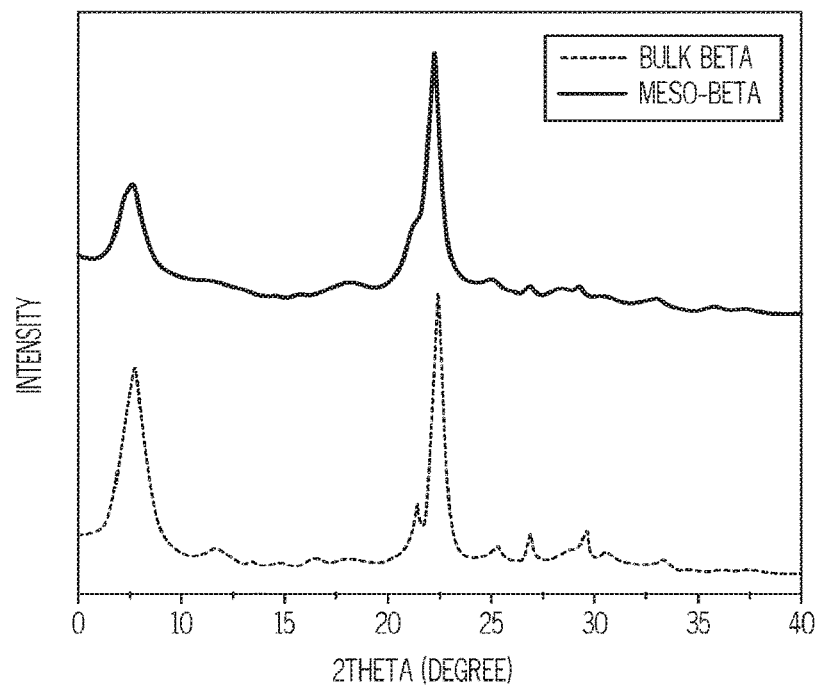
FIG. 17B depicts XRD patterns for synthesized mesoporous Beta zeolites.
Figure 17C:
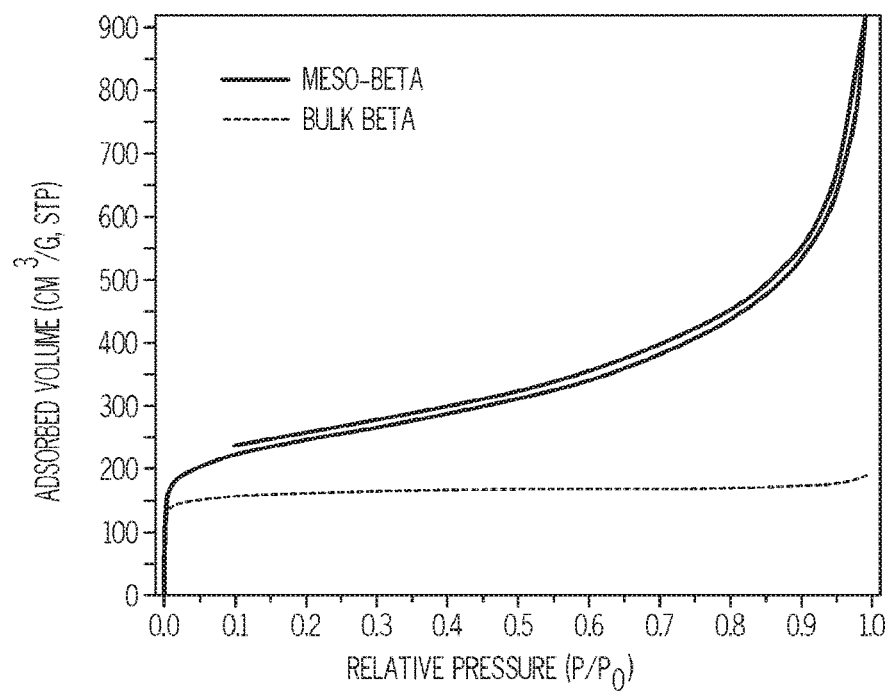
FIG. 17C depicts $N_2$ adsorption isotherms for synthesized mesoporous Beta zeolites, according to one or more embodiments described in this disclosure.

FIG. 17A shows TEM images of hierarchically structured mesoporous Beta zeolites at different magnifications; FIG. 17B shows XRD patterns of the mesoporous Beta zeolites and conventional beta zeolite, marked "bulk Beta" in the figure; and FIG. 17C shows $N_2$ sorption isotherms of the mesoporous Beta zeolites and conventional bulk beta zeolite. The mesoporous Beta zeolites has a surface area of 750 $m^2/g$ and a total pore volume of 1.1 $cm^3/g$; in contrast, and conventional (microporous) Beta zeolite has a surface area of 550 $m^2/g$ and a total pore volume of 0.3 $cm^3/g$.

Another mesoporous Beta zeolite was fabricated having a Si/Al ratio of 18, which had a measured surface area of 616 $m^2/g$, a measured total pore volume of 1.01 $cm^3/g$, and a measured micropore volume of 0.151 $cm^3/g$.

In comparison, the conventional Beta zeolite was prepared from tetraethylammonium hydroxide (TEAOH) as an SDA with a Si/Al molar ratio of 15. The convention Beta zeolite had a measured surface area of 633.5 $m^2/g$, a measured total pore volume of 0.27 $cm^3/g$, and a measured micropore volume of 0.214 $cm^3/g$.

Example 12—Fabrication of Beta Core/Mesoporous Beta Shell Zeolites

Figure 18B:
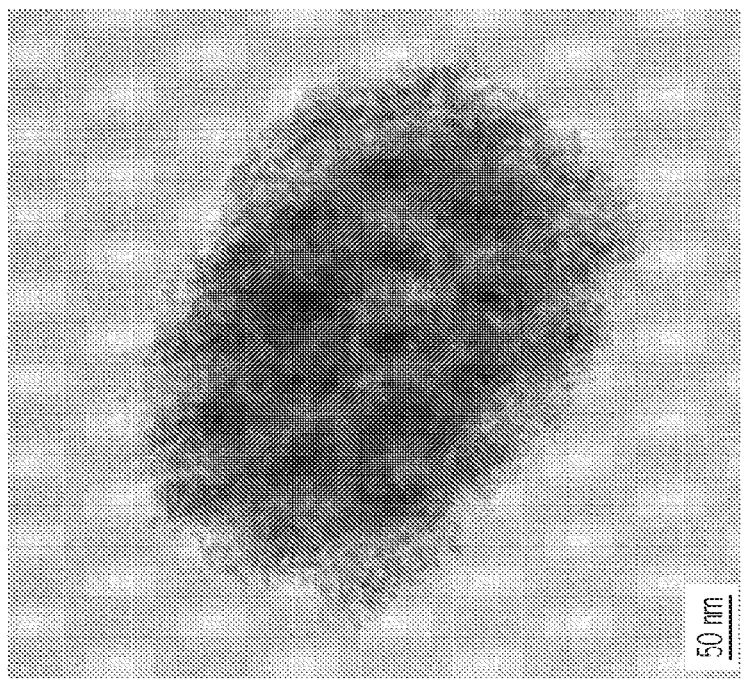
FIGS. 18A and 18B depict TEM images of a Beta core/mesoporous Beta shell porous structure, according to one or more embodiments described in this disclosure.
Figure 18A:
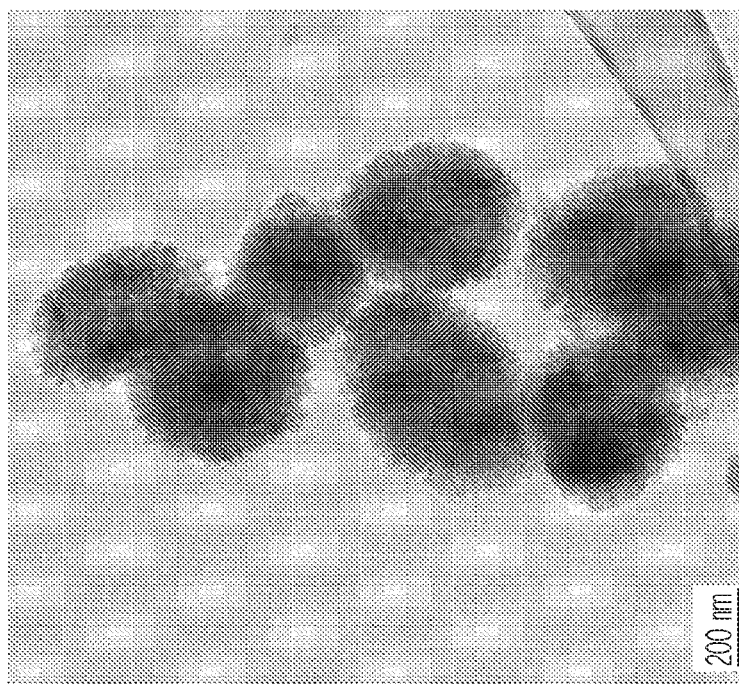
Figure 27A:
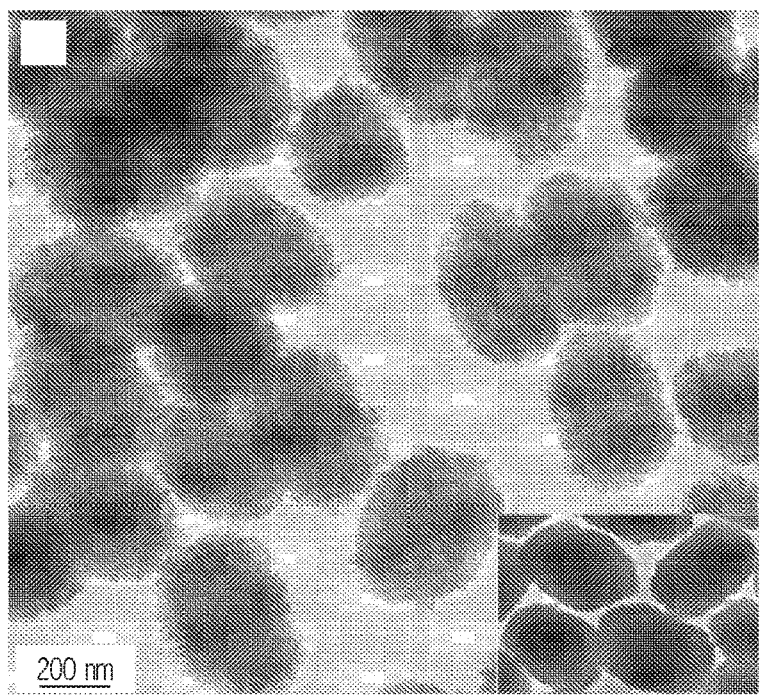
FIGS. 27A-27D show images of Beta core/mesoporous Beta shell porous structure, according to one or more embodiments described in this disclosure.
Figure 27B:
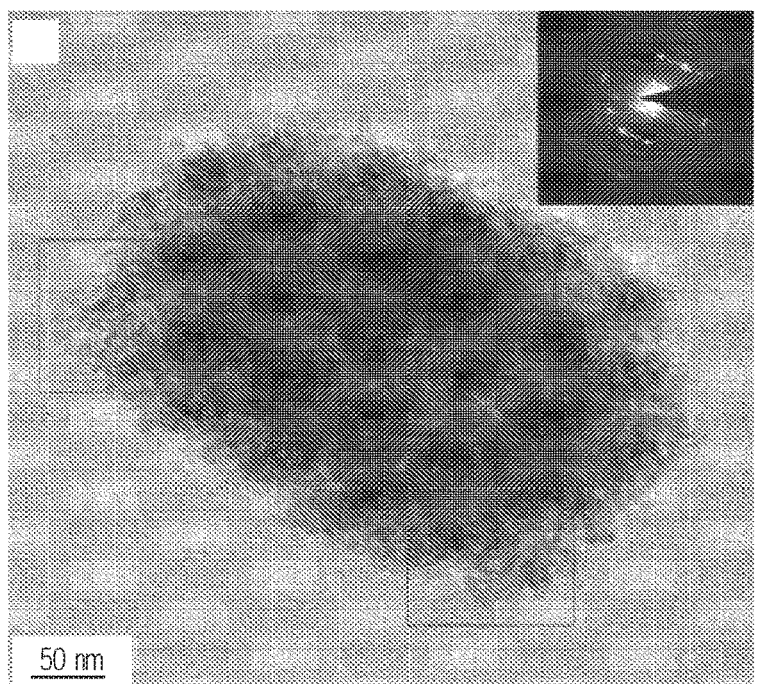
Figure 27C:
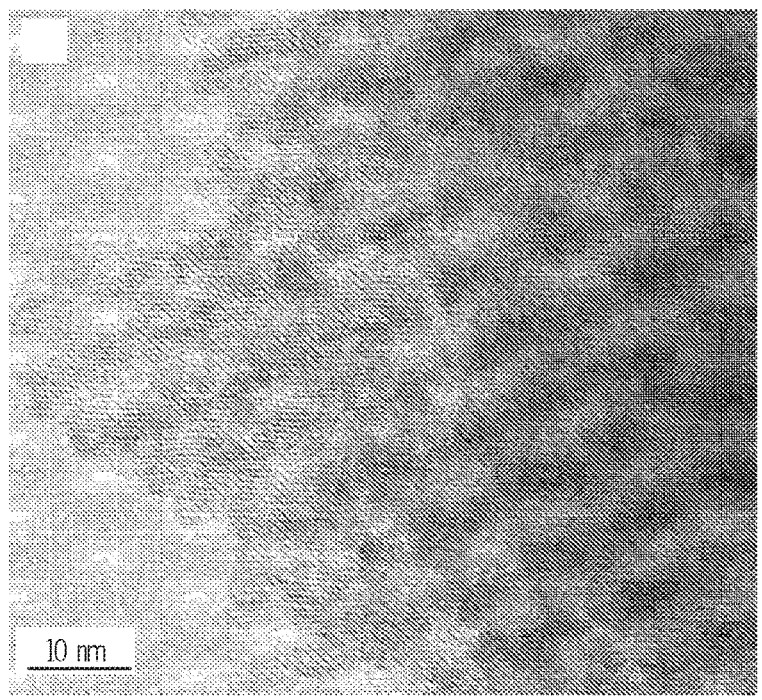
Figure 27D:
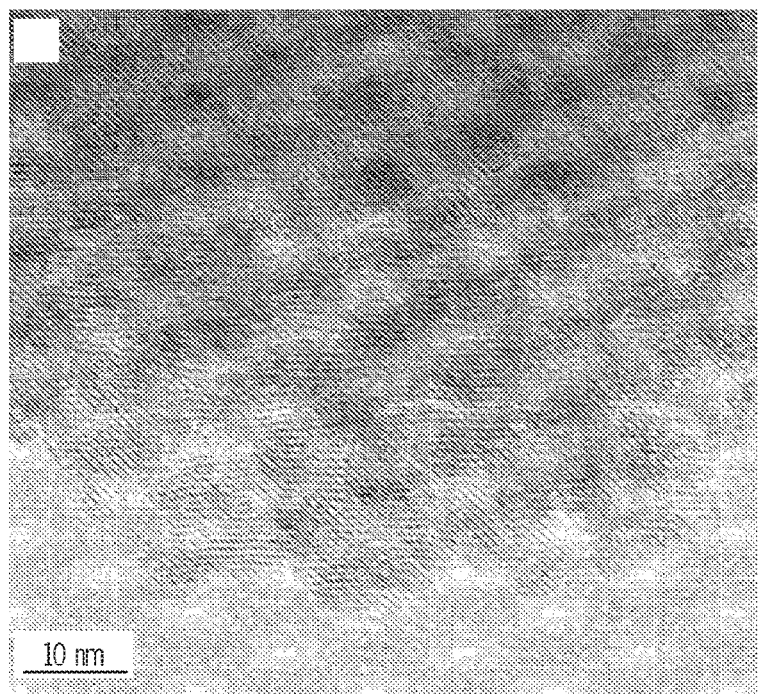

Beta Core/mesoporous Beta shell zeolites were synthesized through seeded growth by using pre-synthesized conventional (microporous) Beta zeolite crystals as seeds. The shell synthesis procedure is identical to that for the zeolites of Example 11 described previously, except that 20-50 wt. % (relative to fumed silica) pre-synthesized conventional zeolite Beta was added into the precursor. FIGS. 18A and 18B depict TEM images of Beta core/mesoporous Beta shell zeolites at different magnifications. FIGS. 27A and 27B also show images of Beta Core/mesoporous Beta shell zeolites. FIG. 27A shows low-magnification TEM images of Beta Core/mesoporous Beta shell zeolites and zeolite Beta seeds (inset). FIG. 27B shows a TEM image of a single Beta Core/mesoporous Beta shell zeolite particle. The corresponding ED pattern (inset) indicates the single-crystalline nature of the particle, and the elongated reflections imply the presence of strains associated with mesopores. FIGS. 27C and 27D show HR-TEM images of Beta Core/mesoporous Beta shell zeolites taken at particle peripheries as labeled in FIG. 27B, showing coherent core-shell interfaces and the high crystallinity of the shell.

Figure 11:
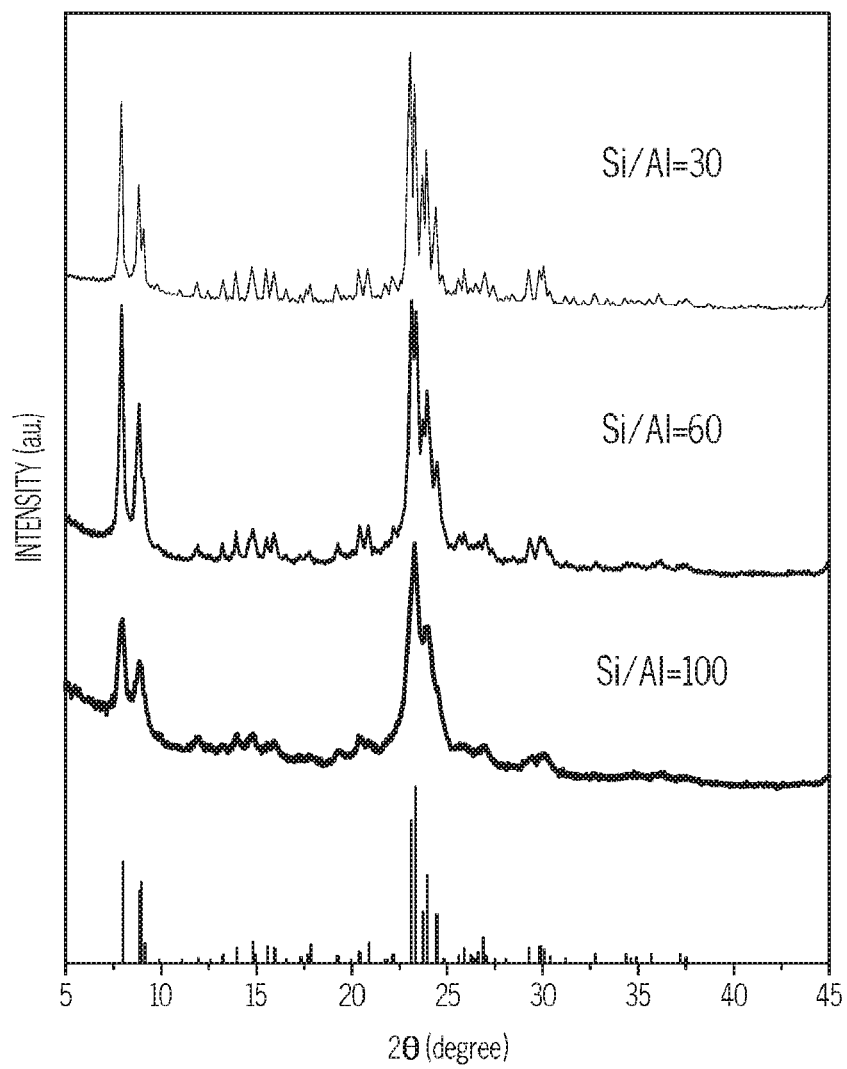
FIG. 11 depicts XRD patterns of the zeolites of Example 6 which were prepared having varying Si/Al molar ratios, according to one or more embodiments described in this disclosure.

Example 13—Analysis of Mesoporous ZSM-5 Zeolites with Varying Si/Al Molar Ratios The procedure of Example 3 was used to produce zeolites with varying molar ratios of Si to Al. FIG. 11 depicts XRD patterns of the zeolites prepared having different Si/Al molar ratios. The results confirm that zeolites with different Si/Al molar ratios all have highly crystalline MFI structures.

Example 14—Catalytic Testing of Prepared Mesoporous Zeolites

Two acid-catalyzed reactions were utilized to evaluate the catalytic performance of mesoporous ZSM-5 zeolite having an Si/Al molar ratio of 31 (as described in Example 6). The first test was the conversion of methanol to aromatics (MTA), which suffers from quick deactivation of catalyst due to the accumulation of coke. The second test was catalytic cracking of canola oil, which involves large-molecule reactants. For comparison, two conventional ZSM-5 zeolite catalysts which had different particle sizes were tested for the same reactions. These conventional ZSM-5 zeolites were the "micro ZSM-5 conventional zeolite" described in Example 6 (which has comparable particle size to the mesoporous ZSM-5 zeolite, and the "nano ZSM-5 conventional zeolite" described in Example 6 (which has a much larger particle size than the mesoporous ZSM-5 zeolite).

Conversion of methanol to aromatics was performed in a stainless fixed-bed reactor (internal diameter of 11 mm). 0.5 g of zeolitic catalyst was used in each reaction. The catalyst bed was activated in a pure air flow (50 mL/min) at 550° C. for 60 min prior to each run. Then the temperature was set to 550° C., and the air flow was switched to $N_2$ (50 mL/min) gas flow with 0.02 mL/min feedstock (the weight ratio of MeOH with 2-methylfuran is 4:1) using a HPLC pump. The weight hourly space velocity (WHSV) was about 2 g feedstock per gram catalyst per hour. All experiments were carried out under atmospheric pressure. Product analysis was performed using online gas chromatography. The effluent composition was determined on GC with a flame ionization detector (FID), equipped with Agilent HP-PLOT/Q column (30 m×0.53 mm×40 μm). The following temperature programming was applied: 6° C./min from 50° C. (5 min at the initial temperature) to 230° C. (20 min at the final temperature). Dimethyl ether was not considered as one product when doing the calculation.

The results of the temperature programmed desorption (TPD) of ammonia experiments show that mesoporous ZSM-5 zeolite is essentially identical to micro ZSM-5 conventional zeolite in the type and strength of acidity except for slightly fewer strong acid sites. Nano ZSM-5 conventional zeolite has a similar $NH_3$-TPD profile to micro ZSM-5 conventional zeolite. Using a base-titration method, it was determined that mesoporous ZSM-5 zeolite, nano ZSM-5 conventional zeolite, and micro ZSM-5 conventional zeolite have 29%, 12%, and 0% external Brønsted acid sites (accessible for molecules too large to enter the 10-ring channels of ZSM-5), respectively. Specifically, to determine external acid cites, Organic base 2, 6-di-tertbutylpyridine (DTBP) titration during ethanol dehydration reaction was used to determine the external acid sites of zeolites, reactions were performed in a pulse reactor connected with an Agilent 7890A GC equipped with a FFAP capillary column. After treated in He at 773 K for 2 hours, the catalysts (5.0 mg-11.0 mg, 100-300 mesh) were loaded in the reactor supported by glass wool. The temperature of the reactor was fixed at 415 K. 1 microliter (μL) of a mixture of 2, 6-di-tertbutylpyridine (DTBP, Alfa, 98% purity)/ethanol (0.0105 g/mL) was introduced by a liquid autosampler each pulse with 840 second intervals until the titrant became saturated with the organic base. The dehydration rate of ethanol was measured by the Agilent 7890A GC equipped with a FFAP capillary column. The loss in dehydration rate was calculated by Equation #1. The loss in ethanol dehydration rate reflected the proportion of active sites accessible for bulky DTBP molecules, which are defined as "external acid sites".

ZSM-5 zeolites may be attributed to its hierarchical structure, which allows the full use of acid sites to achieve a high conversion rate and a large conversion capacity, and meanwhile promotes molecular transport to reduce the probability of coke formation and thus the catalyst deactivation. In addition, a hierarchical structure may increase the coke tolerance capacity of the catalyst, which also accounts for the long lifetime of mesoporous ZSM-5 zeolite. It is noted that during the reaction period with 100% methanol conversion, meso ZSM-5 zeolite showed a higher selectivity to aromatics than the two conventional ZSM-5 catalysts. It should be understood that for the data of Table 2, $t_{0.5}$ refers to time until 50% of conversion, $t_{0.8}$ refers to time until 80% of conversion, R refers to the methanol conversion capacity calculated at $t_{0.5}$ (R=WHSV$_{MeOH}$*$t_{0.5}$), k refers to the rate constant derived from Janssens' model at $t_{0.8}$, and a refers to the deactivation coefficient where $a=\tau_0/t_{0.5}$ (contact time $\tau_0=2.84\ g_{cat}\ h\ mol_{MeOH}^{-1}$).

TABLE 2

| Catalyst | $t_{0.5}$ (h) | $t_{0.8}$ (h) | R (mol$_{MeOH}$ g$_{Cat}^{-1}$) | k (mol$_{MeOH}$ g$_{Cat}^{-1}$ h$^{-1}$) | a (g$_{Cat}$ mol$_{MeOH}^{-1}$) |
|---|---|---|---|---|---|
| Meso ZSM-5 | 13.8 | 12.7 | 0.65 | 6.1 | 0.205 |
| Nano ZSM-5 | 9.4 | 8.0 | 0.44 | 3.3 | 0.302 |
| Micro ZSM-5 | 1.6 | 1.3 | 0.075 | 2.6 | 1.775 |

Figure 23:
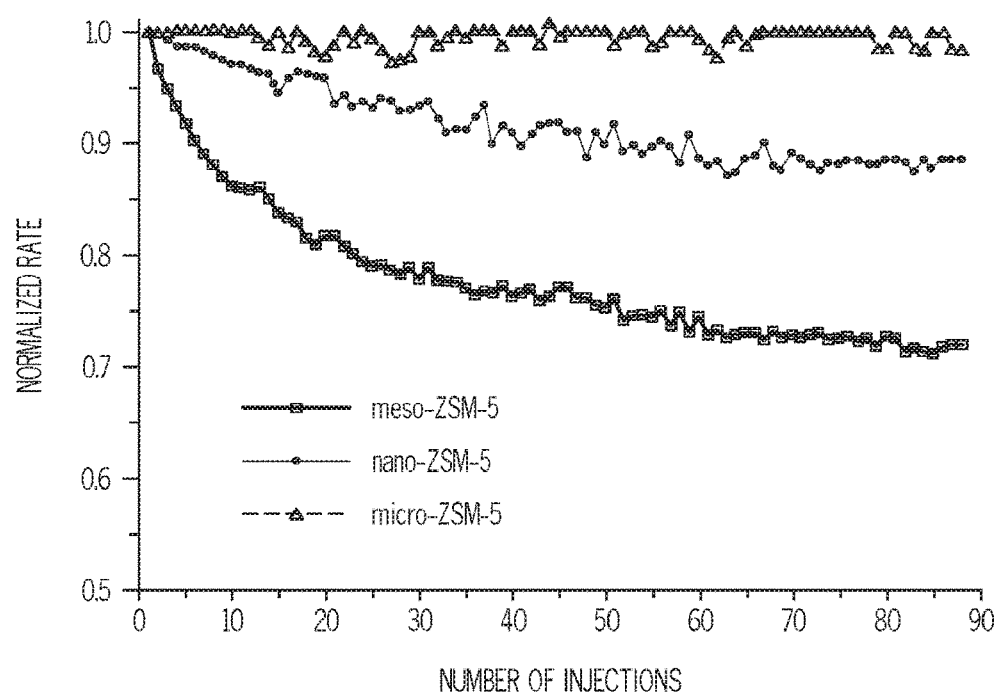
FIG. 23 depicts 2,6-di-tertbutylpyridine (DTBP) base titration of acid sites on the three zeolite catalysts, according to one or more embodiments described in this disclosure.

FIG. 23 depicts DTBP (2,6-di-tertbutylpyridine) base titration of acid sites on the three zeolite catalysts during ethanol dehydration reactions.

$$\text{Rate loss}(\%) = \frac{\text{initial rate of dehydration} - \text{residual rate of dehydration}}{\text{initial rate of dehydration}} * 100\% \quad \text{(Equation \#1)}$$

Figure 21A:
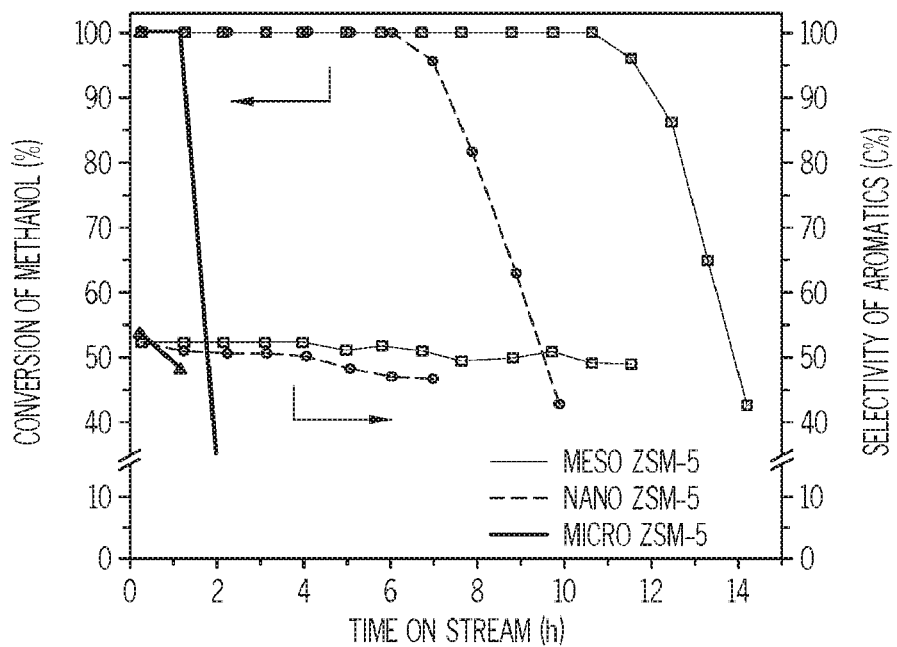
FIG. 21A shows the conversion percentage and selectivity of aromatics for various conventional and mesoporous zeolites utilized as catalysts for a methanol to aromatics reaction.

The MTA reaction was carried out using a fix-bed reactor at 550° C. with the weight hourly space velocity (WHSV) of 2 g$_{MeOH}$/(g$_{Cat}$·hour). The conversion of methanol and selectivity of aromatics for the zeolites is shown in FIG. 21A. Under this condition, the three catalysts could fully convert methanol at the beginning of the reaction. High aromatics selectivity (greater than 50%) was achieved by co-feeding MeOH with 2-methylfuran (25 wt. %) to promote the aromatic-based catalytic cycle. A side effect of this co-feeding strategy was the quick formation of coke and the consequent deactivation of catalyst. Results showed that the deactivation rate has a direct correlation to the diffusion length of the catalyst. Specifically, micro ZSM-5 conventional zeolite lost 90% of its activity during only 2 hours of reaction; over nano ZSM-5 conventional zeolite, the methanol conversion remained 100% up to 6 hours and then dropped to about 40% at 10 hours; and the best performance was given by mesoporous ZSM-5 zeolite, which maintained 100% conversion of methanol for 11 hours, and its lifetime before the conversion dropped to about 40% was 14 hours. From the lifetime plots of the three catalysts, the conversion capacity R, the rate constant k, and the deactivation coefficient a, were derived by using a model developed by Janssens in "Janssens, T. V. W., *J. Catal.* 264, 130-137 (2009)" in combination with the lifetime plots of each catalyst. Results are shown in Table 2. The results show that meso-ZSM-5 has a greater conversion capacity, a higher rate constant, and a lower deactivation coefficient, compared to nano ZSM-5 and micro ZSM-5 conventional zeolite catalysts. The superior catalytic properties of mesoporous The catalytic cracking of canola oil (Abu Dhabi Vegetable Oil Company, 100% pure) was carried out in a fixed-bed reactor at 550° C. Helium (25 mL/min) was used as the carrier gas and nitrogen (12 mL/min) was used as internal standard. Before reaction, the catalyst was crushed to 100-300 μm size particles and activated in situ at 550° C. under helium flow (37 mL/min) for 1 hour. A condenser was used to trap the water and liquid products. Gas phase products were analyzed using a Haixin 9200 GC system equipped with FID and TCD detectors and HP-AL/KCL and TDX-01 columns. HP-AL/KCL column and FID were used for separation and analysis of hydrocarbons, and TDX-01 column and TCD were used for separation and analysis of nitrogen, CO$_x$ and hydrogen. FID detector was maintained at 573 K, and TCD detector was maintained at 523 K. The following temperature ramp was used: hold at 323 K for 10 min, ramp to 473 K at 10 K/min and hold at 473 K for 20 minutes. Liquid products were analyzed by an Agilent 7890A GC equipped with a HP-5 capillary column.

Figure 21B:
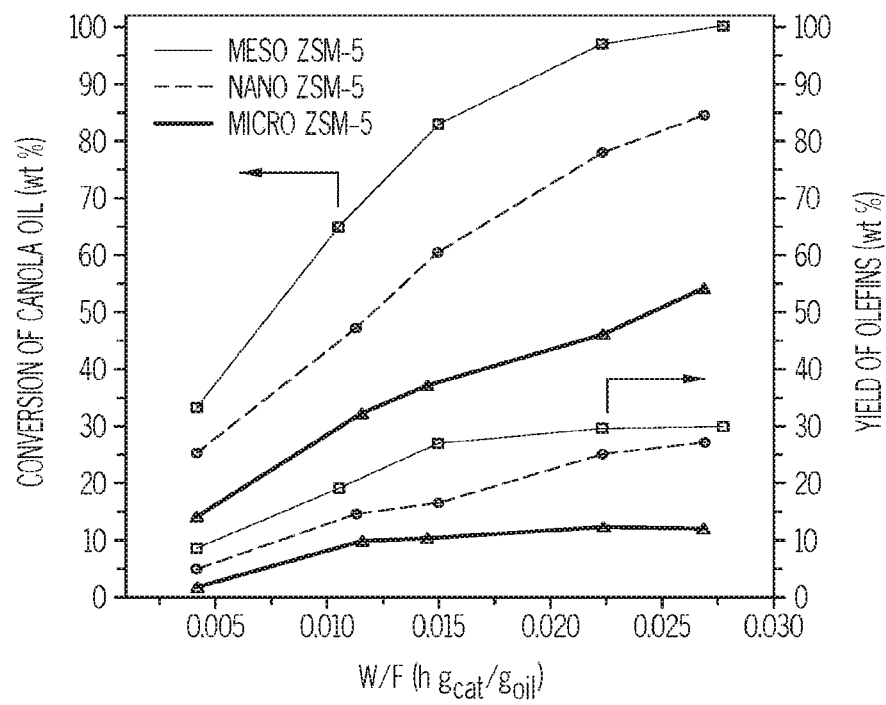
FIG. 21B shows the conversion percentage and yield of olefins for various conventional and mesoporous zeolites utilized as catalysts for a cracking reaction of canola oil, according to one or more embodiments described in this disclosure.

FIG. 21(b) presents the conversion of canola oil and the yield of light olefins versus contact time, from which it is shown that meso ZSM-5 zeolites was able to convert more canola oil than nano ZSM-5 conventional zeolite and micro ZSM-5 conventional zeolite at the same condition. At contact time of 0.015 hour·g$_{cat}$/g$_{oil}$, for example, the conversion of canola oil was 82.7 wt. % for mesoporous ZSM-5 zeolite, 60.2 wt. % for nano ZSM-5 conventional zeolite, and 37.0 wt. % for micro ZSM-5 conventional zeolite. The corresponding yields of light olefins were 26.9 wt. %, 16.4 wt. % and 10.1 wt. %, respectively. Detailed product distributions at different reaction conditions over the three catalysts are provided in Tables 3-5, where Table 3 shows results for mesoporous ZSM-5 zeolite, Table 4 shows results for nano ZSM-5 conventional zeolite, and Table 5 shows results for micro ZSM-5 conventional zeolite. The cracking of canola oil that mainly contains bulky saturated and unsaturated triglycerides is believed to begin with the protonation of the fatty acid chain followed by β-scission. Due to the large sizes of the reactant molecules, the protonation cannot take place in the micropores but only on the external surface of catalyst. Mesoporous ZSM-5 zeolite has the highest proportion of external acid sites among the three catalysts, and is therefore particularly advantageous for this reaction.

TABLE 3

| | W/F (h · $g_{cat}/g_{oil}$) | | | | |
|---|---|---|---|---|---|
| | 0.004 | 0.011 | 0.015 | 0.022 | 0.027 |
| Conversion (wt %) | 33.1 | 64.6 | 82.7 | 97 | 100 |
| Yield of products (wt %) | | | | | |
| $CH_4$ | 0.3 | 0.5 | 0.7 | 1.7 | 0.8 |
| $C_2H_6$ | 0.4 | 0.8 | 1 | 2.2 | 1.2 |
| $C_2H_4$ | 1.9 | 4.5 | 6 | 8.7 | 7.6 |
| $C_3H_8$ | 0.5 | 1.2 | 1.2 | 1.2 | 2.4 |
| $C_3H_6$ | 4.3 | 9.8 | 14 | 14.4 | 15.1 |
| $i-C_4H_{10}$ | 0.2 | 0.4 | 0.5 | 0.4 | 1 |
| $n-C_4H_{10}$ | 0.2 | 0.3 | 0.4 | 0.3 | 0.6 |
| $t-2-C_4H_8$ | 0.5 | 1.1 | 1.6 | 1.5 | 1.6 |
| $n-C_4H_8$ | 0.5 | 1 | 1.4 | 1.4 | 1.3 |
| $i-C_4H_8$ | 0.9 | 1.9 | 2.7 | 2.4 | 2.8 |
| $c-2-C_4H_8$ | 0.4 | 0.8 | 1.1 | 1.1 | 1.1 |
| $C_5$ | 0.9 | 1.7 | 2.4 | 2.2 | 2.2 |
| $C_{6+}$ and liquid products | 15.1 | 27.5 | 33.2 | 40 | 41.9 |
| Total olefins | 8.5 | 19.1 | 26.9 | 29.6 | 29.6 |
| Total olefins and liquid products | 23.6 | 46.7 | 60 | 69.6 | 71.5 |

TABLE 4

| | W/F (h · $g_{cat}/g_{oil}$) | | | | |
|---|---|---|---|---|---|
| | 0.004 | 0.011 | 0.015 | 0.022 | 0.027 |
| Conversion (wt %) | 25.2 | 46.9 | 60.3 | 77.8 | 84.4 |
| Yield of products (wt %) | | | | | |
| $CH_4$ | 0.4 | 0.8 | 1.1 | 0.9 | 0.6 |
| $C_2H_6$ | 0.7 | 1.2 | 1.4 | 1.2 | 0.9 |
| $C_2H_4$ | 1.9 | 4.4 | 4.8 | 5.7 | 6.5 |
| $C_3H_8$ | 0.3 | 0.7 | 0.5 | 1 | 1.1 |
| $C_3H_6$ | 1.9 | 6.9 | 7.8 | 12.9 | 14.1 |
| $i-C_4H_{10}$ | 0 | 0.2 | 0 | 0.3 | 0.3 |
| $n-C_4H_{10}$ | 0.1 | 0.2 | 0.2 | 0.3 | 0.3 |
| $t-2-C_4H_8$ | 0.2 | 0.7 | 1 | 1.5 | 1.5 |
| $n-C_4H_8$ | 0.4 | 0.8 | 1 | 1.4 | 1.4 |
| $i-C_4H_8$ | 0.2 | 1.1 | 1.3 | 2.5 | 2.5 |
| $c-2-C_4H_8$ | 0.1 | 0.5 | 0.7 | 1.1 | 1.1 |
| $C_5$ | 0.7 | 1.3 | 1.9 | 2.1 | 2.1 |
| $C_{6+}$ and liquid products | 13.9 | 18.4 | 27.7 | 29.1 | 35.2 |
| Total olefins | 4.7 | 14.4 | 16.4 | 25 | 27 |
| Total olefins and liquid products | 18.7 | 32.9 | 44.1 | 54.1 | 62.2 |

TABLE 5

| | W/F (h · $g_{cat}/g_{oil}$) | | | | |
|---|---|---|---|---|---|
| | 0.004 | 0.011 | 0.015 | 0.022 | 0.027 |
| Conversion (wt %) | 14 | 33 | 37.1 | 45.8 | 53.6 |
| Yield of products (wt %) | | | | | |
| $CH_4$ | 0.2 | 0.9 | 1.4 | 1.5 | 1.2 |
| $C_2H_6$ | 0.4 | 1.2 | 2 | 2.1 | 1.6 |
| $C_2H_4$ | 0.9 | 3.2 | 5 | 5.7 | 5.3 |
| $C_3H_8$ | 0.2 | 0.3 | 0.5 | 0.5 | 0.9 |

TABLE 5-continued

| | W/F (h · $g_{cat}/g_{oil}$) | | | | |
|---|---|---|---|---|---|
| | 0.004 | 0.011 | 0.015 | 0.022 | 0.027 |
| Conversion (wt %) | 14 | 33 | 37.1 | 45.8 | 53.6 |
| Yield of products (wt %) | | | | | |
| $C_3H_6$ | 0.5 | 1.9 | 3.2 | 4.4 | 4.8 |
| $i-C_4H_{10}$ | 0.1 | 0 | 0 | 0 | 0.1 |
| $n-C_4H_{10}$ | 0 | 0.1 | 0.2 | 0.1 | 0.2 |
| $t-2-C_4H_8$ | 0 | 0.1 | 0.2 | 0.4 | 0.4 |
| $n-C_4H_8$ | 0.2 | 0.5 | 1.1 | 1 | 0.7 |
| $i-C_4H_8$ | 0 | 0.1 | 0.1 | 0.3 | 0.5 |
| $c-2-C_4H_8$ | 0 | 0.1 | 0.1 | 0.3 | 0.3 |
| $C_5$ | 0.3 | 0.8 | 1.4 | 1.7 | 1.2 |
| $C_{6+}$ and liquid products | 8 | 12.4 | 14.1 | 18.8 | 20.5 |
| Total olefins | 1.6 | 6 | 9.7 | 12 | 11.9 |
| Total olefins and liquid products | 9.6 | 18.4 | 23.8 | 30.8 | 32.4 |

Example 15—Synthesis of Functionalized Zeolites

Figure 25A:
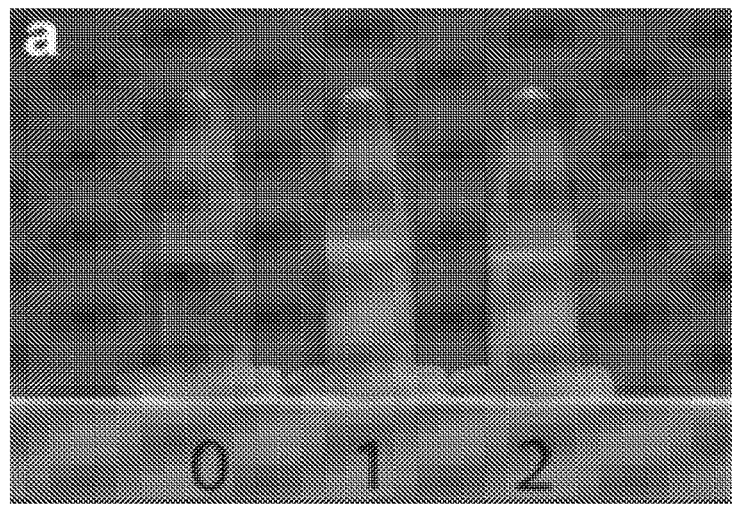
FIG. 25A depicts a photograph of mesoporous ZSM-5 zeolite and nano ZSM-5 conventional zeolite adsorption of $PtCl_4^{2-}$ before centrifugation.
Figure 25B:
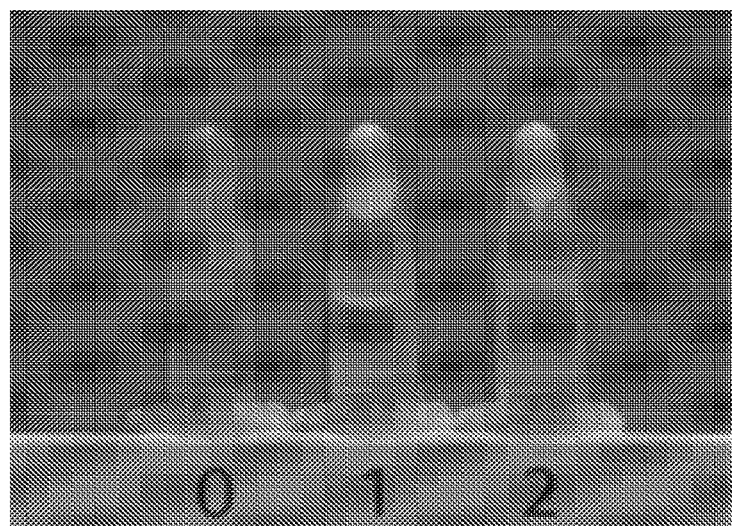
FIG. 25B depicts a photograph of mesoporous ZSM-5 zeolite and nano ZSM-5 conventional zeolite adsorption of $PtCl_4^{2-}$ following centrifugation, according to one or more embodiments described in this disclosure.

The adsorption capability of uncalcined mesoporous ZSM-5 zeolite (without removing the template polymer) in comparison with a conventional ZSM-5 was demonstrated, where 50 mg of zeolite powder was mixed with 1 mL of $K_2PtCl_4$ solution (0.013 M) for 5 minutes and then separated by centrifugation. The sharp contrast in color between the two supernatants implied that mesoporous ZSM-5 zeolite adsorbed $PtCl_4^{2-}$ anions from the solution more efficiently than conventional ZSM-5. FIGS. 25A and 25B show the adsorption of $PtCl_4^{2-}$ by uncalcined mesoporous ZSM-5 zeolite and by uncalcined nano ZSM-5 conventional zeolite. Specifically, FIGS. 25A and 25B show a photograph of 1 mL of 0.013-M $K_2PtCl_4$ aqueous solution alone (vial 0), mixed with 50 mg of mesoporous ZSM-5 (vial 1), or mixed with 50 mg of nano ZSM-5 conventional zeolite (vial 2), before (FIG. 25A) and after (FIG. 25B) centrifugation. The lighter color of the supernatant liquid in vial 1 compared to that in vial 2 indicates a higher adsorption capacity of mesoporous ZSM-5.

Figure 22:
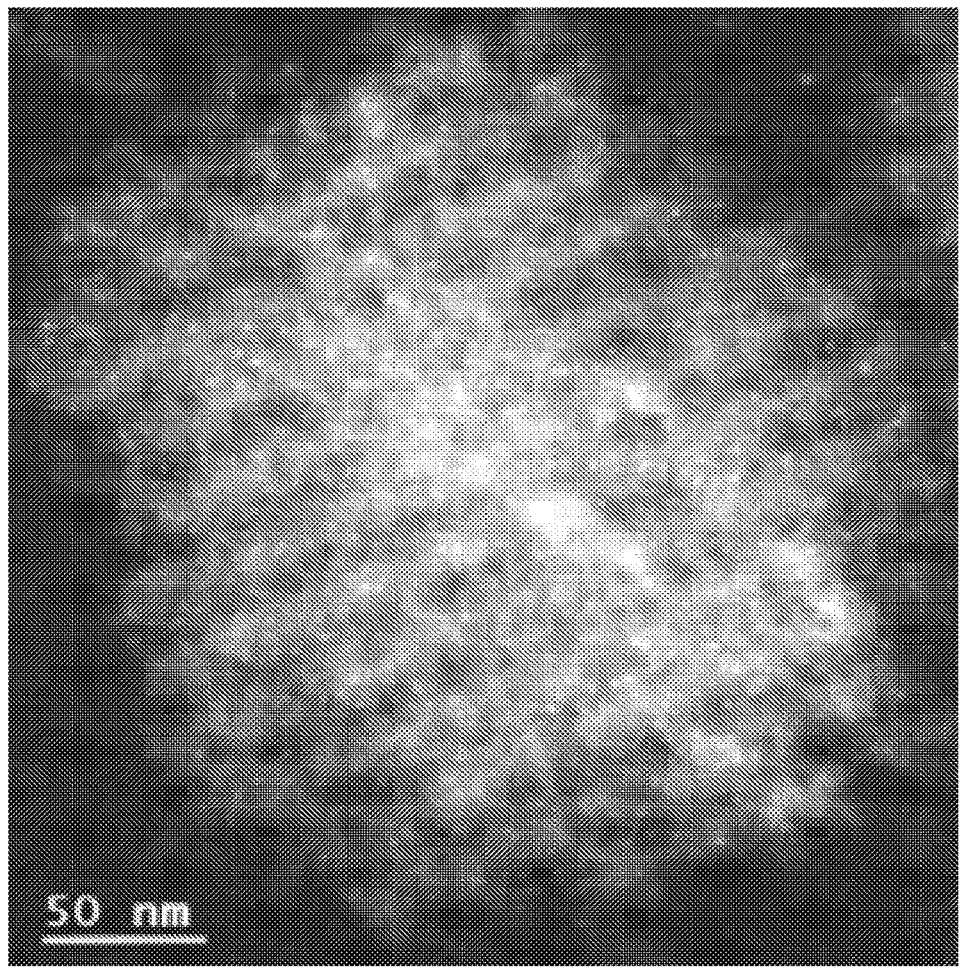
FIG. 22 shows a high-angle annular dark field scanning transmission electron microscopy image of mesoporous ZSM-5 zeolite-supported Pt nanocrystals, according to one or more embodiments described in this disclosure.

The adsorption capacities (based on Pt) were determined by inductively coupled plasma-optical emission spectroscopy (ICP-OES) to be 24.7 mg/g for meso-ZSM-5 and 0.64 mg/g for nano ZSM-5 conventional zeolite. The enhanced adsorption capacity of mesoporous ZSM-5 zeolite is attributed to the abundant ammonium groups in PDAMAB-TPHAB that can capture $PtCl_4^{2-}$ anions through electrostatic interactions. After adsorption of $PtCl_4^{2-}$, mesoporous ZSM-5 zeolite was calcined at 500° C. to remove the template, and meanwhile the Pt precursor was reduced to Pt metal. This process resulted in ultrafine Pt nanocrystals (1-2 nm) uniformly dispersed in mesoporous ZSM-5 zeolite were observed by high-angle annular dark-field scanning transmission electron microscopy (HAADF-STEM), confirming the adsorption of Pt ions by mesoporous ZSM-5 zeolite, as shown in FIG. 22. It is noted that by conventional wet impregnation methods, it is difficult to prepare such small and well-dispersed Pt nanocrystals on a zeolite support at such a loading level. It is believed that the specific interaction between ammonium groups and $PtCl_4^{2-}$ anions allows the latter uniformly distributed and protected by the polymer matrix residing in mesoporous ZSM-5 zeolite particles, eventually leading to highly dispersed ultrafine Pt nanocrystals upon calcination. The resulting composite material integrates mesoporosity, strong acidity, and noble metal sites, and is potentially a useful catalyst for hydrogenation or hydrodeoxygenation involving large molecules.

For the purposes of describing and defining the present disclosure it is noted that the term "about" is utilized in this disclosure to represent the inherent degree of uncertainty that may be attributed to any quantitative comparison, value, measurement, or other representation. The term "about" are also utilized in this disclosure to represent the degree by which a quantitative representation may vary from a stated reference without resulting in a change in the basic function of the subject matter at issue. Additionally, the term "consisting essentially of" is used in this disclosure to refer to quantitative values that do not materially affect the basic and novel characteristic(s) of the disclosure. For example, a chemical stream "consisting essentially" of a particular chemical constituent or group of chemical constituents should be understood to mean that the stream includes at least about 99.5% of a that particular chemical constituent or group of chemical constituents.

It is noted that one or more of the following claims utilize the term "where" as a transitional phrase. For the purposes of defining the present technology, it is noted that this term is introduced in the claims as an open-ended transitional phrase that is used to introduce a recitation of a series of characteristics of the structure and should be interpreted in like manner as the more commonly used open-ended preamble term "comprising."

It should be understood that any two quantitative values assigned to a property may constitute a range of that property, and all combinations of ranges formed from all stated quantitative values of a given property are contemplated in this disclosure.

According to a first aspect of the present disclosure, a cationic polymer may comprise the structure of Chemical Structure #3 or Chemical Structure #8, where A is nitrogen or phosphorus and B is nitrogen or phosphorus; where R5 is a branched or unbranched hydrocarbon chain having a carbon chain length of from 1 to 10,000 carbon atoms; where each of R6, R7, R8, R9, R10, R11, R12, and R13 are hydrogen atoms or hydrocarbons, and where each of the hydrocarbons optionally comprises one or more heteroatoms; and where n is from 10 to 10,000,000.

A second aspect of the present disclosure may include the first aspect, where A and B are nitrogen.

A third aspect of the present disclosure may includes the first or second aspects, further comprising one or more anions selected from $Cl^-$, $Br^-$, $F^-$, $I^-$, $OH^-$, ½ $SO_4^{2-}$, ⅓ $PO_4^{3-}$, ½ $S^{2-}$, $AlO_2^-$.

A fourth aspect of the present disclosure may include any of the first through third aspects, where R5 comprises a carbon chain length of from 3 to 30 carbon atoms.

A fifth aspect of the present disclosure may include any of the first through fourth aspects, where R5 comprises a carbon chain length of from 5 to 10 carbon atoms.

A sixth aspect of the present disclosure may include any of the first through fifth aspects, where R6, R7, R8, and R9 are hydrogen.

A seventh aspect of the present disclosure may include any of the first through sixth aspects, where R10 is an alkyl group.

An eighth aspect of the present disclosure may include any of the first through seventh aspects, where R10 is a methyl group.

A ninth aspect of the present disclosure may include any of the first through eighth aspects, where R11, R12 and R13 are alkyl groups.

A tenth aspect of the present disclosure may include any of the first through ninth aspects, where R11, R12 and R13 are methyl groups.

An eleventh aspect of the present disclosure may include any of the first through tenth aspects, where R11, R12 and R13 are ethyl groups.

A twelfth aspect of the present disclosure may include any of the first through eleventh aspects, where R11, R12 and R13 are propyl groups.

A thirteenth aspect of the present disclosure may include any of the first through twelfth aspects, where the cationic polymer is poly($N^1,N^1$-diallyl-$N^1$-alkyl-$N^6,N^6,N^6$-trialkylalkane-1,6-diamonium halide).

A fourteenth aspect of the present disclosure may include any of the first through thirteenth aspects, where the cationic polymer is poly($N^1,N^1$-diallyl-$N^1$-methyl-$N^6,N^6,N^6$-trimethylhexane-1,6-diamonium bromide).

A fifteenth aspect of the present disclosure may include any of the first through fourteenth aspects, where the cationic polymer is poly($N^1,N^1$-diallyl-$N^1$-methyl-$N^6,N^6,N^6$-triethylhexane-1,6-diamonium bromide).

A sixteenth aspect of the present disclosure may include any of the first through the fifteenth aspects, where the cationic polymer is poly($N^1,N^1$-diallyl-$N^1$-methyl-$N^6,N^6,N^6$-tripropylhexane-1,6-diamonium bromide).

A seventeenth aspect of the present disclosure may include any of the first through the sixteenth aspects, where the cationic polymer is a non-surfactant.

An eighteenth aspect of the present disclosure may include any of the first through the seventeenth aspects, where the cationic polymer is utilized as a structure-directing agent to form a mesoporous zeolite.

According to a nineteenth aspect of the present disclosure, a cationic polymer comprising H-NMR peaks at one or more of: from 0.65 ppm to 1.05 ppm; from 1.1 ppm to 1.5 ppm; from 1.4 ppm to 1.8 ppm; from 2.6 ppm to 3.0 ppm; and from 2.85 ppm to 3.25 ppm.

A twentieth aspect of the present disclosure may include the nineteenth aspect, where the cationic polymer comprises H-NMR peaks at: from 0.65 ppm to 1.05 ppm; from 1.1 ppm to 1.5 ppm; from 1.4 ppm to 1.8 ppm; from 2.6 ppm to 3.0 ppm; and from 2.85 ppm to 3.25 ppm.

According to a twenty-first aspect of the present disclosure, a method for producing the cationic polymer comprises: forming a diallyl methyl ammonium hydrochloride cation with a chloride anion from diallylamine; polymerizing the diallyl methyl ammonium hydrochloride to form a poly(diallyl methyl ammonium hydrochloride) (PDMAH); forming a poly(diallyl methyl amine) (PDMA) from the poly(diallyl methyl ammonium hydrochloride) (PDMAH); forming an ammonium halide cation with a halide anion by reacting a trialkyl amine with a dihaloalkane; and forming the cationic polymer of claim 1 by reacting the PDMA with the ammonium halide cation.

A twenty-second aspect of the present disclosure may include the twenty-first aspect, where the cationic polymer comprises the structure of Chemical Structure #3 or Chemical Structure #8, where A is nitrogen or phosphorus and B is nitrogen or phosphorus; where R5 is a branched or unbranched hydrocarbon chain having a carbon chain length of from 1 to 10,000 carbon atoms; where each of R6, R7, R8, R9, R10, R11, R12, and R13 are hydrogen atoms or hydrocarbons, and where each of the hydrocarbons optionally comprises one or more heteroatoms; and where n is from 10 to 10,000,000.

A twenty-third aspect of the present disclosure may include the twenty-first or twenty-second aspects, where the diallyl methyl ammonium hydrochloride cation with a chloride anion is formed by contacting the diallylamine with formic acid, formaldehyde, and HCl.

A twenty-fourth aspect of the present disclosure may include any of the twenty-first to twenty-third aspects, where the diallyl methyl ammonium hydrochloride is polymerized by contact with 2,2'-axobis(2-methylpropionamidine) dihydrochloride (AAPH).

A twenty-fifth aspect of the present disclosure may include any of the twenty-first to twenty-fourth aspects, where the poly(diallyl methyl amine) (PDMA) is formed by contacting the poly(diallyl methyl ammonium hydrochloride) (PDMAH) with methane and sodium methoxide.

According to a twenty-sixth aspect of the present disclosure, a catalyst may be produced by utilizing a cationic polymer as a structure-directing agent, where the cationic polymer utilized as the structure-directing agent comprises the structure of Chemical Structure #3 or Chemical Structure #8, where A is nitrogen or phosphorus and B is nitrogen or phosphorus; where R5 is a branched or unbranched hydrocarbon chain having a carbon chain length of from 1 to 10,000 carbon atoms; where each of R6, R7, R8, R9, R10, R11, R12, and R13 are hydrogen atoms or hydrocarbons, and where each of the hydrocarbons optionally comprises one or more heteroatoms; and where n is from 10 to 10,000,000.

A twenty-seventh aspect of the present disclosure may include the twenty-sixth aspect, where the catalyst is a mesoporous zeolite.

According to a twenty-eighth aspect of the present disclosure, a mesoporous zeolite may be produced by a method comprising: combining a cationic polymer and one or more precursor materials to form an intermediate material comprising micropores, where: the cationic polymer acts as a structure-directing agent for the formation of the micropores; and the cationic polymer comprises monomers that comprise two or more quaternary ammonium cations or quaternary phosphonium cations connected by a hydrocarbon chain; and calcining the intermediate structure form the mesoporous zeolite.

A twenty-ninth aspect of the present disclosure may include the twenty-eighth aspect, where the calcining removes the cationic polymer from the intermediate structure and forms mesopores.

A thirtieth aspect of the present disclosure may include any of the twenty-eighth or twenty-ninth aspects, where the cationic polymer comprises the structure of Chemical Structure #3 or Chemical Structure #8, where A is nitrogen or phosphorus and B is nitrogen or phosphorus; where R5 is a branched or unbranched hydrocarbon chain having a carbon chain length of from 1 to 10,000 carbon atoms; where each of R6, R7, R8, R9, R10, R11, R12, and R13 are hydrogen atoms or hydrocarbons, and where each of the hydrocarbons optionally comprises one or more heteroatoms; and where n is from 10 to 10,000,000.

A thirty-first aspect of the present disclosure may include any of the twenty-eighth to thirtieth aspects, where the precursor materials are selected from one or more of a silicon-containing material, a titanium-containing material, and an aluminum-containing material.

A thirty-second aspect of the present disclosure may include any of the twenty-eighth to thirty-first aspects, where the mesoporous zeolite comprises an aluminosilicate material, a titanosilicate material, or a pure silicate material.

A thirty-third aspect of the present disclosure may include any of the twenty-eighth to thirty-second aspects, where the mesoporous zeolite comprises a surface area of greater than 350 $m^2/g$.

A thirty-fourth aspect of the present disclosure may include any of the twenty-eighth to thirty-third aspects, where the mesoporous zeolite comprises a pore volume of greater than 0.3 $cm^3/g$.

A thirty-fifth aspect of the present disclosure may include any of the twenty-eighth to thirty-fourth aspects, where the mesoporous zeolite comprises a MFI framework type.

A thirty-sixth aspect of the present disclosure may include any of the twenty-eighth to thirty-fifth aspects, where the mesoporous zeolite is a ZSM-5 zeolite.

A thirty-seventh aspect of the present disclosure may include any of the twenty-eighth to thirty-sixth aspects, where the mesoporous zeolite is a TS-1 zeolite.

A thirty-eighth aspect of the present disclosure may include any of the twenty-eighth to thirty-seventh aspects, where the mesoporous zeolite is a silicalite-I zeolite.

A thirty-ninth aspect of the present disclosure may include any of the twenty-eighth to thirty-eighth aspects, where the mesoporous zeolite comprises a BEA framework type.

A fortieth aspect of the present disclosure may include any of the twenty-eighth to thirty-ninth aspects, where the mesoporous zeolite is a Beta zeolite.

According to a forty-first aspect of the present disclosure, a mesoporous zeolite may comprise: a microporous framework comprising a plurality of micropores having diameters of less than or equal to 2 nm; and a plurality of mesopores having diameters of greater than 2 nm and less than or equal to 50 nm; where the mesoporous zeolite comprises an aluminosilicate material, a titanosilicate material, or a pure silicate material; where the mesoporous zeolite comprises a surface area of greater than 350 $m^2/g$; and where the mesoporous zeolite comprises a pore volume of greater than 0.3 $cm^3/g$.

A forty-second aspect of the present disclosure may include the forty-first aspect, where the mesoporous zeolite comprises a MFI framework type.

A forty-third aspect of the present disclosure may include any of the forty-first to forty-second aspects, where the mesoporous zeolite is a ZSM-5 zeolite.

A forty-forth aspect of the present disclosure may include any of the forty-first through forty-third aspects, where the mesoporous zeolite is a TS-1 zeolite.

A forty-fifth aspect of the present disclosure may include any of the forty-first through forty-forth aspects, where the mesoporous zeolite is a silicalite-I zeolite.

A forty-sixth aspect of the present disclosure may include any of the forty-first through forty-fifth aspects, where the mesoporous zeolite comprises a BEA framework type.

A forty-seventh aspect of the present disclosure may include any of the forty-first through forty-sixth aspects, where the mesoporous zeolite is a Beta zeolite.

A forty-eighth aspect of the present disclosure may include any of the forty-first through forty-seventh aspects, where the mesoporous zeolite comprises an aluminosilicate material.

A forty-ninth aspect of the present disclosure may include any of the forty-first through forty-eighth aspects, where the mesoporous zeolite comprises a molar ratio of Si to Al of greater than or equal to 10.

A fiftieth aspect of the present disclosure may include any of the forty-first through forty-ninth aspects, where the mesoporous zeolite comprises a titanosilicate material.

A fifty-first aspect of the present disclosure may include any of the forty-first through fiftieth aspects, where the mesoporous zeolite comprises a molar ratio of Si to Ti of greater than or equal to 30.

A fifty-second aspect of the present disclosure may include any of the forty-first through fifty-first aspects, where the mesoporous zeolite comprises a pure silicate material.

A fifty-third aspect of the present disclosure may include any of the forty-first through fifty-second aspects, where the mesoporous zeolite comprises particles of from 25 nm to 500 nm in size.

According to a fifty-fourth aspect of the present disclosure, a porous material may comprise: a zeolite core portion comprising a microporous structure comprising a plurality of micropores having a diameter of less than or equal to 2 nm, where the core portion comprises an aluminosilicate material, a titanosilicate material, or a pure silicate material; a mesoporous zeolite shell portion that comprises an aluminosilicate material, a titanosilicate material, or a pure silicate material and surrounds the core portion, the shell portion comprising: a microporous framework comprising a plurality of micropores having diameters of less than or equal to 2 nm; and a plurality of mesopores having diameters of greater than 2 nm and less than or equal to 50 nm.

A fifty-fifth aspect of the present disclosure may include the fifty-fourth aspect, where the shell portion comprises a surface area of greater than 350 m²/g.

A fifty-sixth aspect of the present disclosure may include the fifty-fourth or fifty-fifth aspects, where the shell portion comprises a pore volume of greater than 0.3 cm³/g.

A fifty-seventh aspect of the present disclosure may include any of the fifty-fourth through fifty-sixth aspects, where the core portion does not comprise mesopores.

A fifty-eighth aspect of the present disclosure may include any of the fifty-fourth through fifty-seventh aspects, where the shell portion has a thickness of from 20 nm to 200 nm.

A fifty-ninth aspect of the present disclosure may include any of the fifty-fourth through fifty-eighth aspects, where the core portion has a length of from 25 nm to 500 nm.

A sixtieth aspect of the present disclosure may include any of the fifty-fourth through fifty-ninth aspects, where the shell portion comprises a MFI framework type.

A sixty-first aspect of the present disclosure may include any of the fifty-fourth through sixtieth aspects, where the shell portion is a ZSM-5 zeolite.

A sixty-second aspect of the present disclosure may include any of the fifty-fourth through sixty-first aspects, where the shell portion is a TS-1 zeolite.

A sixty-third aspect of the present disclosure may include any of the fifty-fourth through sixty-second aspects, where the shell portion is a silicalite-I zeolite.

A sixty-fourth aspect of the present disclosure may include any of the fifty-fourth through sixty-fourth aspects, where the shell portion comprises a BEA framework type.

A sixty-fifth aspect of the present disclosure may include any of the fifty-fourth through sixty-fourth aspects, where the shell portion is a Beta zeolite.

According to a sixty-sixth aspect of the present disclosure, a core/shell zeolite comprising a core portion and a shell portion may be produced by a method comprising: forming a mixture comprising a cationic polymer, precursor materials of the porous material, and one or more core seed materials, the core seed materials comprising a microporous structure; forming the shell portion intermediate material around the core seed material, the shell portion intermediate material comprising micropores, where: the cationic polymer acts as a structure-directing agent for the formation of the micropores of the shell portion intermediate; and the cationic polymer comprises monomers that comprise two or more quaternary ammonium cations or quaternary phosphonium cations separated by a hydrocarbon chain; and calcining the core/shell porous material to form a core/shell zeolite, where the shell portion comprises a mesoporous zeolite.

A sixty-seventh aspect of the present disclosure may include the sixty-sixth aspect, where the cationic polymer comprises the structure of Chemical Structure #3 or Chemical Structure #8, where A is nitrogen or phosphorus and B is nitrogen or phosphorus; where R5 is a branched or unbranched hydrocarbon chain having a carbon chain length of from 1 to 10,000 carbon atoms; where each of R6, R7, R8, R9, R10, R11, R12, and R13 are hydrogen atoms or hydrocarbons, and where each of the hydrocarbons optionally comprises one or more heteroatoms; and where n is from 10 to 10,000,000

A sixty-eighth aspect of the present disclosure may include the sixty-sixth or sixty seventh aspect, where the calcining removes the cationic polymer from the shell portion intermediate structure and forms mesopores in the shell structure.

A sixty-ninth aspect of the present disclosure includes a cationic polymer comprising the structure:

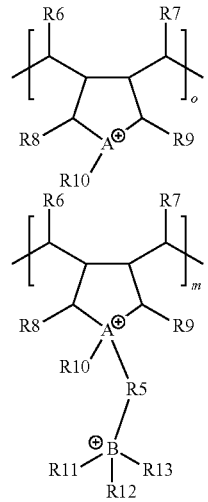

where A is nitrogen or phosphorus and B is nitrogen or phosphorus; where R5 is a branched or unbranched hydrocarbon chain having a carbon chain length of from 1 to 10,000 carbon atoms; where each of R6, R7, R8, R9, R10, R11, R12, and R13 are hydrogen atoms or hydrocarbons, and where each of the hydrocarbons optionally comprises one or more heteroatoms; and where o+m is from 10 to 10,000,000.

Having described the subject matter of the present disclosure in detail and by reference to specific embodiments, it is noted that the various details described in this disclosure should not be taken to imply that these details relate to elements that are essential components of the various embodiments described in this disclosure, even in cases where a particular element is illustrated in each of the drawings that accompany the present description. Rather, the claims appended hereto should be taken as the sole representation of the breadth of the present disclosure and the corresponding scope of the various embodiments described in this disclosure. Further, it will be apparent that modifications and variations are possible without departing from the scope of the appended claims.

What is claimed is:

1. A cationic polymer comprising the structure:

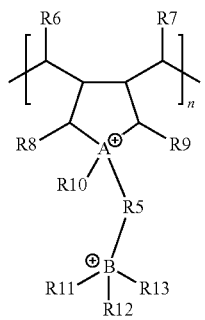

where A is nitrogen and B is nitrogen;
where R5 is a branched or unbranched hydrocarbon chain having a carbon chain length of from 1 to 10,000 carbon atoms;
where each of R6, R7, R8, R9, R10, R11, R12, and R13 are hydrogen atoms or hydrocarbons, and where each of the hydrocarbons optionally comprises one or more heteroatoms; and
where n is from 10 to 10,000,000.

2. The cationic polymer of claim 1, further comprising one or more anions selected from Cl$^-$, Br$^-$, F$^-$, I$^-$, OH$^-$, ½ SO$_4^{2-}$, ⅓ PO$_4^{3-}$, ½ S$^{2-}$, AlO$_2^-$.

3. The cationic polymer of claim 1, where R5 comprises a carbon chain length of from 3 to 30 carbon atoms.

4. The cationic polymer of claim 1, where R5 comprises a carbon chain length of from 5 to 10 carbon atoms.

5. The cationic polymer of claim 1, where R6, R7, R8, and R9 are hydrogen.

6. The cationic polymer of claim 1, where R10 is an alkyl group.

7. The cationic polymer of claim 1, where R10 is a methyl group.

8. The cationic polymer of claim 1, where R11, R12 and R13 are alkyl groups.

9. The cationic polymer of claim 1, where R11, R12 and R13 are methyl groups.

10. The cationic polymer of claim 1, where R11, R12 and R13 are ethyl groups.

11. The cationic polymer of claim 1, where R11, R12 and R13 are propyl groups.

12. The cationic polymer of claim 1, where the cationic polymer is poly($N^1,N^1$-diallyl-$N^1$-alkyl-$N^6,N^6,N^6$-trialkyl-alkane-1,6-diamonium halide).

13. The cationic polymer of claim 1, where the cationic polymer is poly($N^1,N^1$-diallyl-$N^1$-methyl-$N^6,N^6,N^6$-trimethylhexane-1,6-diamonium bromide).

14. The cationic polymer of claim 1, where the cationic polymer is poly($N^1,N^1$-diallyl-$N^1$-methyl-$N^6,N^6,N^6$-triethylhexane-1,6-diamonium bromide).

15. The cationic polymer of claim 1, where the cationic polymer is poly($N^1,N^1$-diallyl-$N^1$-methyl-$N^6,N^6,N^6$-tripropylhexane-1,6-diamonium bromide).

16. The cationic polymer of claim 1, where the cationic polymer is a non-surfactant.

17. The cationic polymer of claim 1, where the cationic polymer is utilized as a structure-directing agent to form a mesoporous zeolite.

18. A cationic polymer comprising H-NMR peaks at one or more of:
from 0.65 ppm to 1.05 ppm;
from 1.1 ppm to 1.5 ppm;
from 1.4 ppm to 1.8 ppm;
from 2.6 ppm to 3.0 ppm; and
from 2.85 ppm to 3.25 ppm.

19. The cationic polymer of claim 1, where the cationic polymer comprises H-NMR peaks at:
from 0.65 ppm to 1.05 ppm;
from 1.1 ppm to 1.5 ppm;
from 1.4 ppm to 1.8 ppm;
from 2.6 ppm to 3.0 ppm; and
from 2.85 ppm to 3.25 ppm.

* * * * *